United States Patent [19]

Ide

[11] Patent Number: 5,515,458
[45] Date of Patent: May 7, 1996

[54] HYDRODYNAMIC BEARINGS HAVING BEAM MOUNTED BEARING PADS AND SEALED BEARING ASSEMBLIES INCLUDING THE SAME

[76] Inventor: Russell D. Ide, P.O. Box 744, 641 Arnold Rd., Coventry, R.I. 02816

[21] Appl. No.: 772,831

[22] Filed: Oct. 8, 1991

Related U.S. Application Data

[60] Division of Ser. No. 516,781, Apr. 30, 1990, Pat. No. 5,054,938, which is a continuation-in-part of Ser. No. 309,081, Feb. 8, 1989, Pat. No. 5,137,373, which is a continuation-in-part of Ser. No. 283,529, Oct. 25, 1988, Pat. No. 5,112,143, which is a continuation-in-part of Ser. No. 55,340, May 29, 1987, abandoned.

[51] Int. Cl.[6] .................................................. F16C 17/06
[52] U.S. Cl. .................................................. 384/122
[58] Field of Search ........................... 384/1, 117, 119, 384/114, 107, 312, 309, 122, 124

[56] References Cited

U.S. PATENT DOCUMENTS

| | | | |
|---|---|---|---|
| 2,424,028 | 7/1947 | Haeberlein | 384/223 |
| 4,496,251 | 1/1985 | Ide | 384/117 |
| 4,668,106 | 5/1987 | Gu | 384/105 |
| 4,676,668 | 6/1987 | Ide | 384/117 |
| 5,066,144 | 11/1991 | Ide | 384/117 |

OTHER PUBLICATIONS

Kingsbury Machine Works, Inc., "Kingsbury Equalizing Bearings Three–Shoe and Six–Shoe Elements" Catalog EQ, pp. 1–25 (1972).

*Primary Examiner*—Lenard A. Footland
*Attorney, Agent, or Firm*—Michael D. Bednarek; Marks & Murase

[57] ABSTRACT

A hydrodynamic thrust, journal or combined radial and thrust bearing which may be mounted within a sealed housing assembly which can be, for example, be used to replace rolling element bearings. The bearing can be designed for mounting to either the shaft or housing. If mounted for rotation with the shaft, the bearing pads move relative to a smooth support surface. The bearing includes a bearing pad structure that may change shape and move in any direction (six degrees of freedom) to optimize formation of a converging wedge for hydrodynamic operation, equalization of load on the bearing pads in thrust bearings and to adjust for any shaft misalignment. The bearing pad may be formed so as to contact the shaft in the installed state and to deflect under fluid film pressure. The pad is separated from the support member by a support structure which includes one or more beam-like members. The support structure preferably includes a primary support portion, a secondary support portion and a tertiary support portion. The beams allow deflection of the pad by either deflecting or twisting in a torsional mode. The bearing pad support structure may include portions which are fluid dampened. Alternatively, discrete pads may be mounted to the static housing portion. The sealed housing assembly includes a static housing portion, a rotatable housing portion and a plurality of seals providing a seal between the static housing portion and the rotating housing portion. The housing assembly can be used as part of a modular sealed bearing construction. One or more piezoelectric elements may be mounted within the support structure or between the support structure and bearing pads to permit selective adjustments of the deflection characteristics of the bearing.

21 Claims, 28 Drawing Sheets

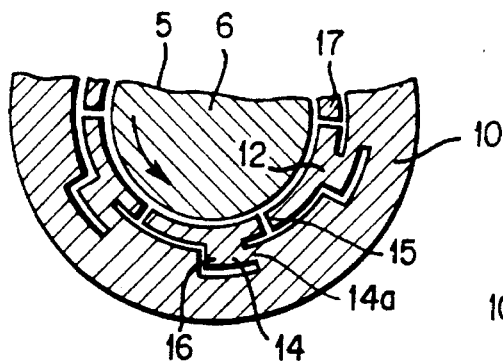
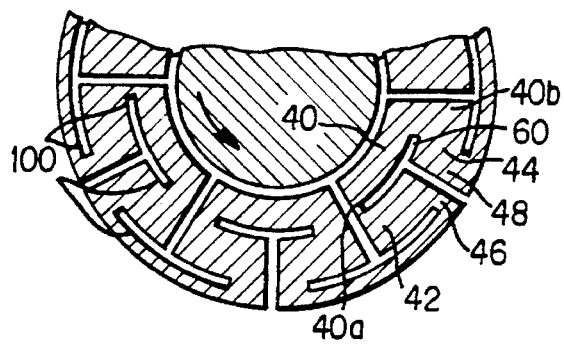
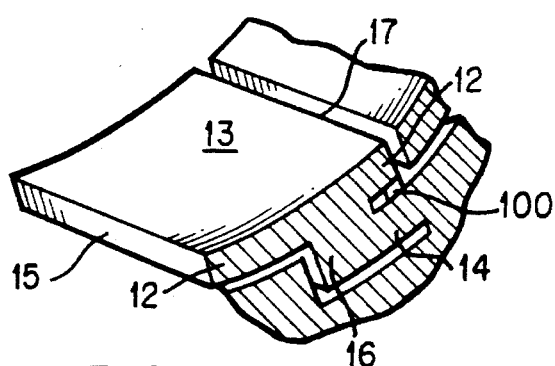
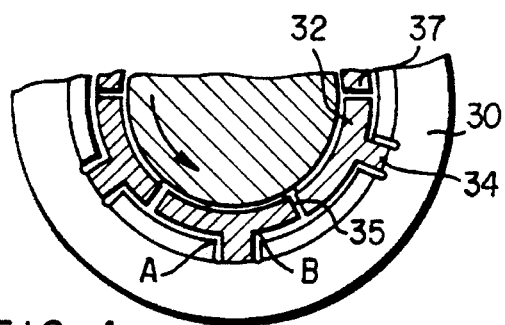
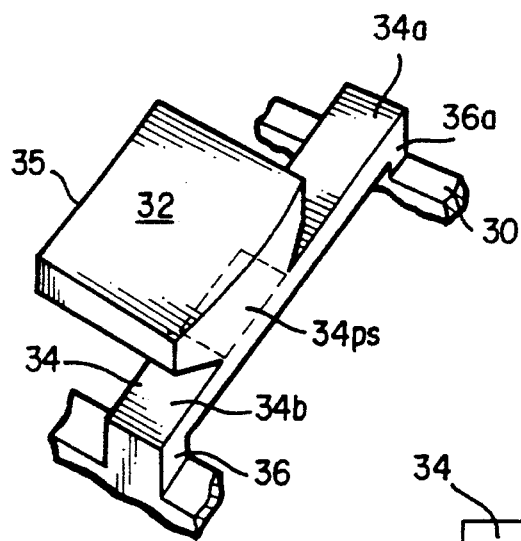
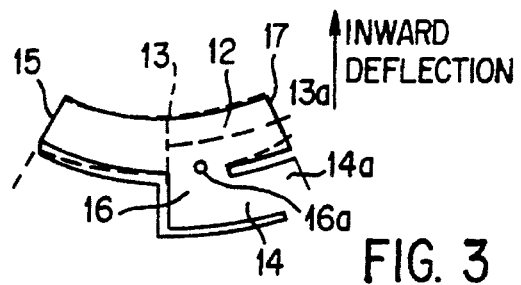
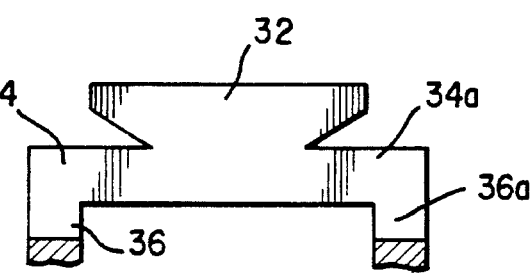

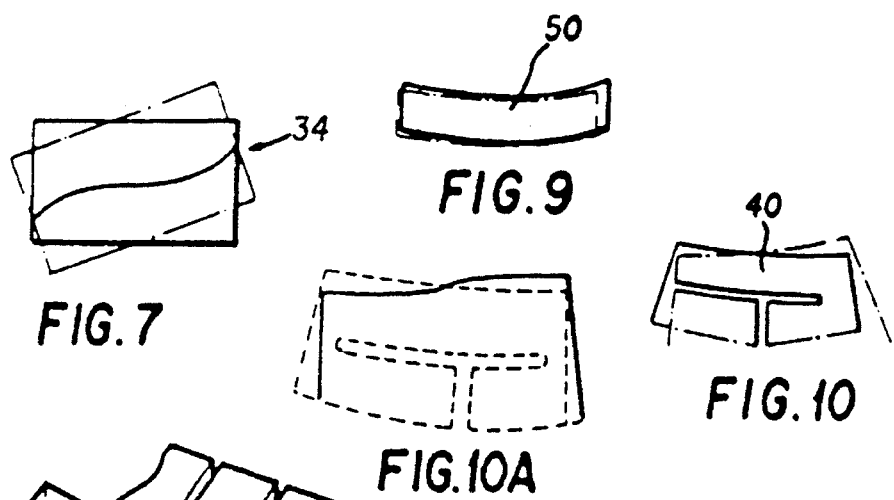
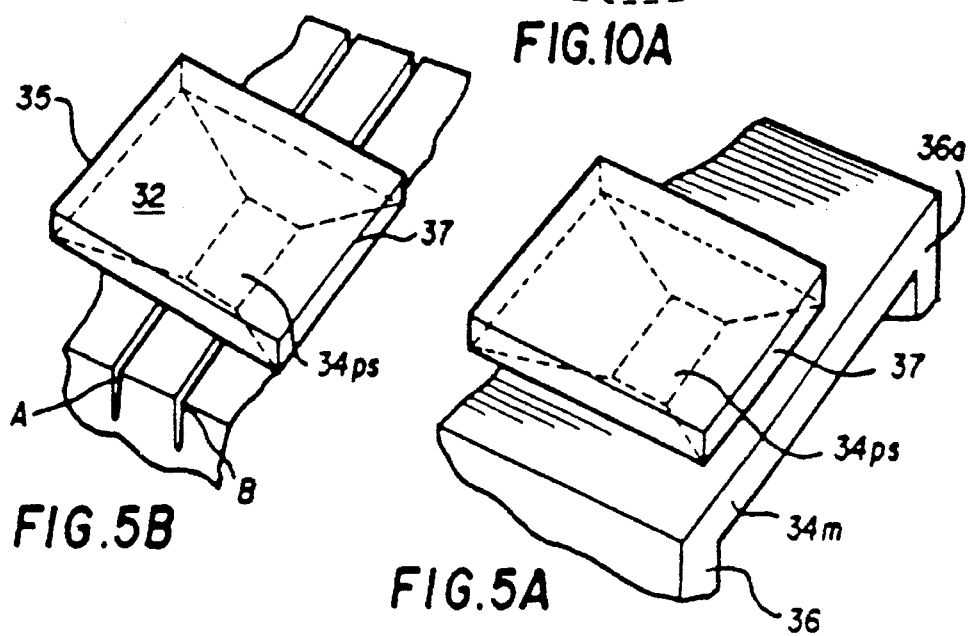
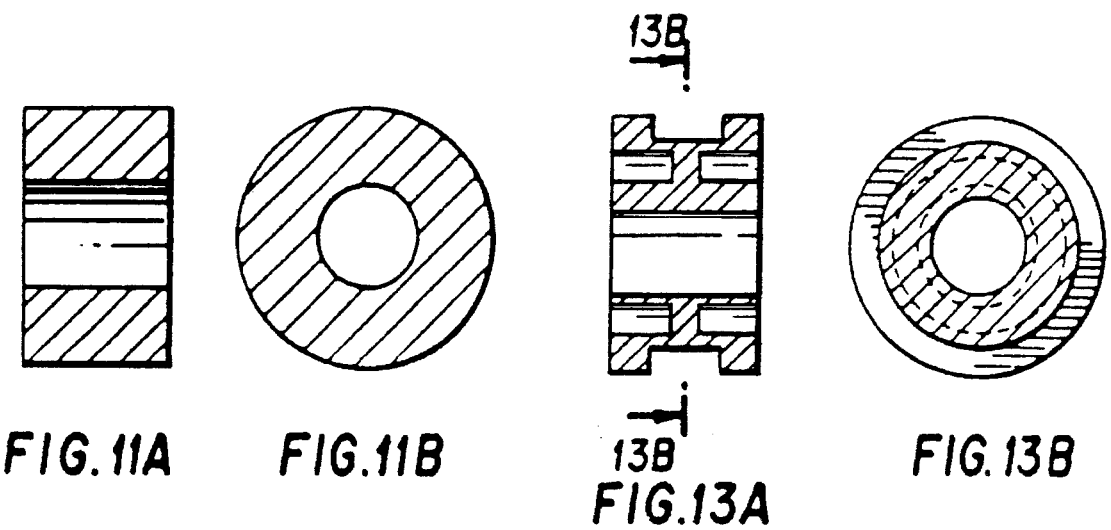

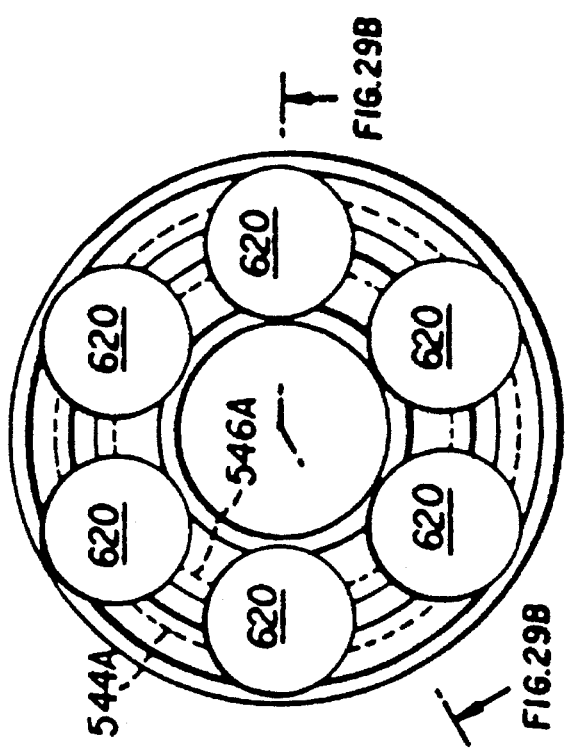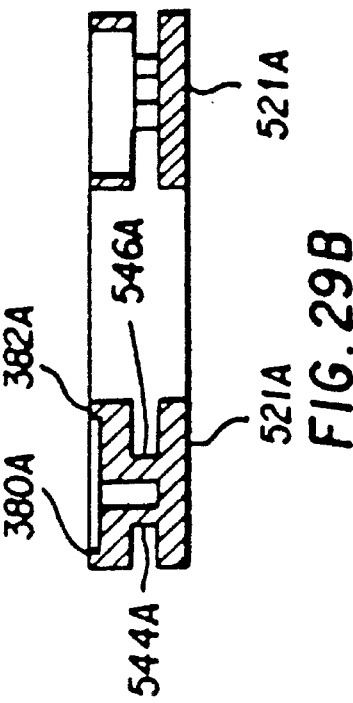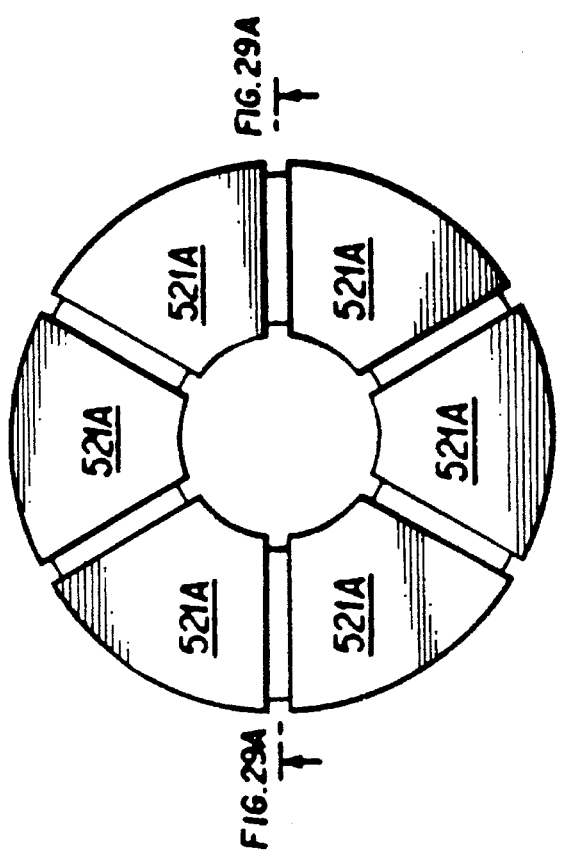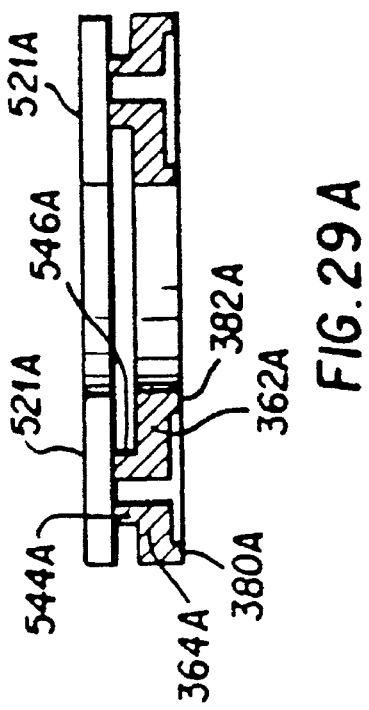

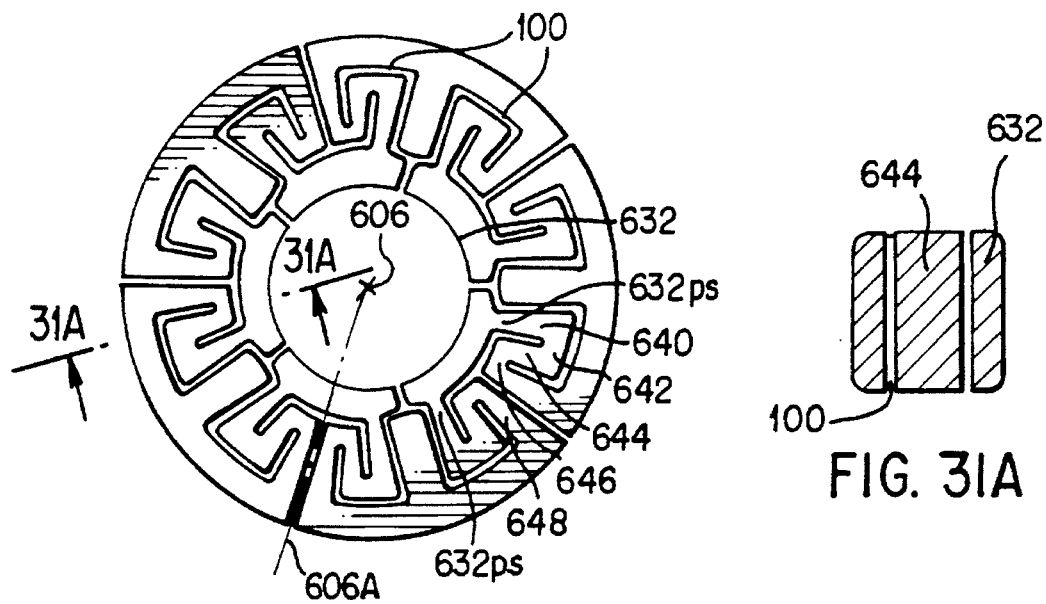
FIG. 31
FIG. 31A
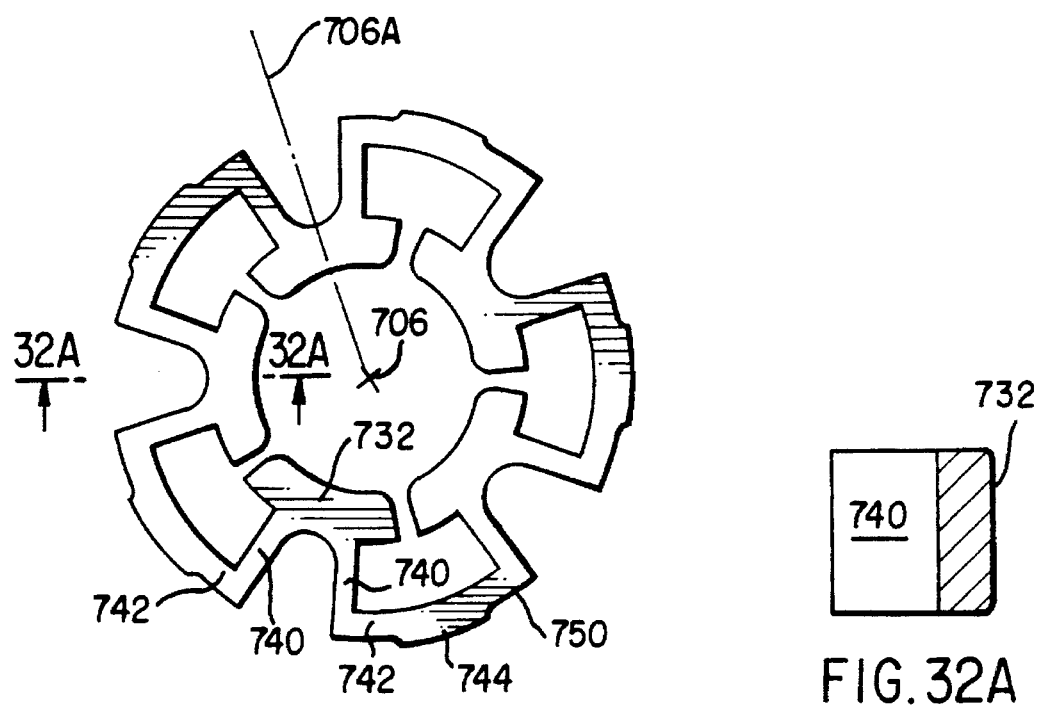
FIG. 32
FIG. 32A

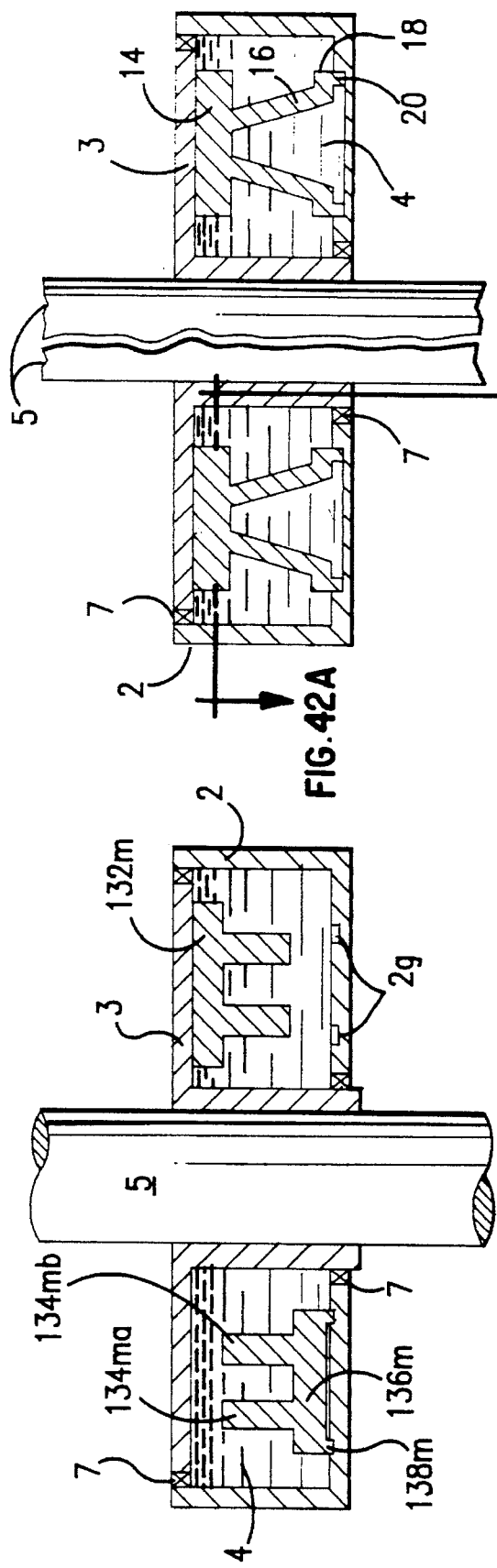
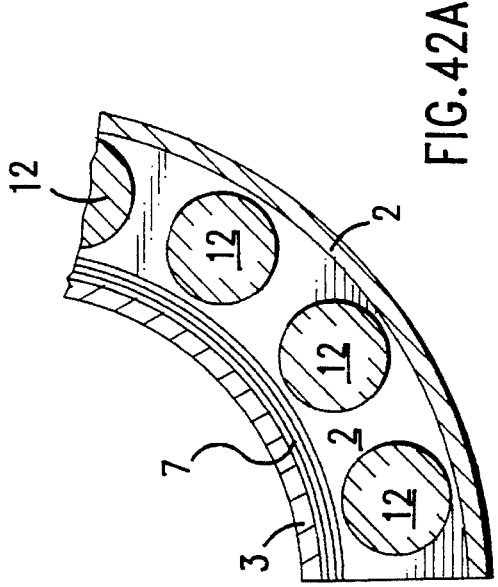
FIG. 42
FIG. 42A
FIG. 38E

HYDRODYNAMIC BEARINGS HAVING BEAM MOUNTED BEARING PADS AND SEALED BEARING ASSEMBLIES INCLUDING THE SAME

This application is a division of Ser. No. 07/516,781 filed Apr. 30, 1990, now U.S. Pat. No. 5,054,938 issued Oct. 8, 1991; which is a continuation-in-part of Ser. No. 07/309,081 filed Feb. 8, 1989, now U.S. Pat. No. 5,137,373; which is a continuation-in-part of Ser. No. 07/283,529 filed Oct. 25, 1988, now U.S. Pat. No. 5,112,143, as the national phase of PCT/US88/01841 filed May 27, 1988; which is a continuation-in-part of Ser. No. 07/055,340 filed May 29, 1987, now abandoned

BACKGROUND OF THE INVENTION

The present invention relates to hydrodynamic bearings. In such bearings, a rotating object such as a shaft is supported by a stationary bearing pad via a pressurized fluid such as oil, air or water. Hydrodynamic bearings take advantage of the fact that when the rotating object moves, it does not slide along the top of the fluid. Instead the fluid in contact with the rotating object adheres tightly to the rotating object, and motion is accompanied by slip or shear between the fluid particles through the entire height of the fluid film. Thus, if the rotating object and the contacting layer of fluid move at a velocity which is known, the velocity at intermediate heights of the fluid thickness decreases at a known rate until the fluid in contact with the stationary bearing pad adheres to the bearing pad and is motionless. When, by virtue of the load resulting from its support of the rotating object, the bearing pad is deflected at a small angle to the rotating member, the fluid will be drawn into the wedge-shaped opening, and sufficient pressure will be generated in the fluid film to support the load. This fact is utilized in thrust bearings for hydraulic turbines and propeller shafts of ships as well as in the conventional hydrodynamic journal bearing. At design speeds, hydrodynamic bearings operate indefinitely—in large part due to the absence of moving parts. However, the lubricating fluid breaks down quickly at slow speeds or when starting or stopping. The loss of fluid film results in bearing wear and eventual failure.

Another known bearing is the rolling element bearing. Rolling element bearings consist of an assembly of rollers (balls, cylindrical rollers, needle rollers and the like) that roll against an inner and outer race to allow rotating parts to move more easily. These bearings are costly to manufacture because they must be precisely machined and because they go through many fatigue cycles for every shaft rotation, they wear out quickly at high speeds and loads.

Hydrodynamic bearings are conceptually and structurally less complicated and less expensive than rolling element radial or thrust bearings such as ball, roller or needle bearings. Nevertheless, rolling element bearings are still commonly used in many applications. The failure of previously known hydrodynamic bearings to replace rolling element bearings in many applications is largely due to the poor design of previously known hydrodynamic bearings. Moreover, in most high load applications, hydrodynamic bearings must be in a liquid environment to operate properly. Consequently, if an area in which the bearing is to be located is not fluid tight, known hydrodynamic bearings are not readily substitutable for rolling element bearings.

Both thrust bearings and radial or journal bearings normally are characterized by shaft supporting pads spaced about an axis. The axis about which the pads are spaced generally corresponds to the longitudinal axis of the shaft to be supported for both thrust and journal bearings. This axis may be termed the major axis.

In an ideal hydrodynamic bearing, the hydrodynamic wedge extends across the entire bearing pad face, the fluid film is just thick enough to support the load, the major axis of the bearing and the axis of the shaft are aligned, leakage of fluid from the ends of the bearing pad surface which are adjacent the leading and trailing edges is minimized, the fluid film is developed as soon as the shaft begins to rotate, and, in the case of thrust bearings, the bearing pads are equally loaded. While an ideal hydrodynamic bearing has yet to be achieved, a bearing which substantially achieves each of these objectives is said to be designed so as to optimize hydrodynamic wedge formation.

The present invention relates to hydrodynamic bearings that are also sometimes known as movable pad bearings and methods of making the same. Generally these bearings are mounted in such a way that they can move to permit the formation of a wedge-shaped film of lubricant between the relatively moving parts. Since excess fluid causes undesirable friction and power losses, the fluid thickness is preferably just enough to support the maximum load. This is true when the formation of the wedge is optimized. Essentially the pad displaces with a pivoting or a swing-type motion about a center located in front of the pad surface, and bearing friction tends to open the wedge. When the formation of the wedge is optimized, the wedge extends across the entire pad face. Moreover, the wedge is formed at the lowest speed possible, ideally as soon as the shaft begins to rotate.

In known radial pad type bearings, it has heretofore been believed necessary to provide an accurately determined clearance between the bearing and the rotating object supported so as to allow the appropriate deflection of the bearing pads to form the hydrodynamic wedge. The requirement of close tolerances is particularly troublesome in the manufacture of gas lubricated bearings. Another problem with gas lubricated bearings is the breakdown of the fluid film at high speeds. These problems have limited the use of gas lubricated hydrodynamic bearings.

U.S. Pat. No. 3,107,955 to Trumpler discloses one example of a bearing having beam mounted bearing pads that displaces with a pivoting or swing-type motion about a center located in front of the pad surface. This bearing, like many prior art bearings, is based only on a two dimensional model of pad deflection. Consequently, optimum wedge formation is not achieved.

In the Hall patent, U.S. Pat. No. 2,137,487, there is shown a hydrodynamic moveable pad bearing that develops its hydrodynamic wedge by sliding of its pad along spherical surfaces. In many cases the pad sticks and the corresponding wedge cannot be developed. In the Greene Patent, U.S. Pat. No. 3,930,691, the rocking is provided by elastomers that are subject to contamination and deterioration.

U.S. Pat. No. 4,099,799 to Etsion discloses a non-unitary cantilever mounted resilient pad gas bearing. The disclosed bearing employs a pad mounted on a rectangular cantilever beam to produce a lubricating wedge between the pad face and the rotating shaft. Both thrust bearings and radial or journal bearings are disclosed.

There is shown in the Ide patent, U.S. Pat. No. 4,496,251 a pad which deflects with web-like ligaments so that a wedge shaped film of lubricant is formed between the relatively moving parts.

U.S. Pat. No. 4,515,486 discloses hydrodynamic thrust and journal bearings comprising a number of bearing pads, each having a face member and a support member that are separated and bonded together by an elastomeric material.

U.S. Pat. No. 4,526,482 discloses hydrodynamic bearings which are primarily intended for process lubricated applications, i.e., the bearing is designed to work in a fluid. The hydrodynamic bearings are formed with a central section of the load carrying surface that is more compliant than the remainder of the bearings such that they will deflect under load and form a pressure pocket of fluid to carry high loads.

It has also been noted in Ide U.S. Pat. No. 4,676,668, that bearing pads may be spaced from the support member by at least one leg which provides flexibility in three directions. To provide flexibility in the plane of motion, the legs are angled inward to form a conical shape with the apex of the cone or point of intersection in front of the pad surface. Each leg has a section modulus that is relatively small in the direction of desired motion to permit compensation for misalignment. These teachings are applicable to both journal and thrust bearings. While the disclosure of this patent represents a significant advance in the art, it has some shortcomings. One such shortcoming is the rigidity of the support structure and bearing pad which inhibits deformation of the pad surface. Further, the bearing construction is not unitary.

The last two patents are of particular interest because they demonstrate that despite the inherent and significant differences between thrust and journal bearings, there is some conceptual similarity between hydrodynamic journal bearings and hydrodynamic thrust bearings.

This application relates in part to hydrodynamic thrust bearings. When the hydrodynamic wedge in such bearings is optimized, the load on each of the circumferentially spaced bearings is substantially equal.

Presently, the most widely used hydrodynamic thrust bearing is the so-called Kingsbury shoe-type bearing. The shoe-type Kingsbury bearing is characterized by a complex structure which includes pivoted shoes, a thrust collar which rotates with the shaft and applies load to the shoes, a base ring for supporting the shoes, a housing or mounting which contains and supports the internal bearing elements, a lubricating system and a cooling system. As a result of this complex structure, Kingsbury shoe-type bearings are typically extraordinarily expensive.

An alternative to the complex Kingsbury shoe-type bearing is the unitary pedestal bearings shown in FIGS. 19–20. This bearing has been employed in, among other things, deep well pumps. This relatively simple structure is typically formed by sand casting or some other crude manufacturing technique because heretofore, the specific dimensions have not been deemed important. As shown in FIGS. 19 and 20, the bearing is structurally characterized by a flat base 36PA having a thick inner circumferential projection 38PA, a plurality of rigid pedestals 34PA extending transversely from the base and a thrust pad 32PA centered on each rigid pedestal.

FIG. 20(A) illustrates schematically, the deflection of the bearing of FIGS. 19–20 in response to movement of the opposing thrust runner in the direction of arrow L. In FIG. 20(A) the deflected position (greatly exaggerated) is illustrated in solid lines and the non-deflected position is illustrated in phantom. The curve PD in FIG. 20(A) illustrates the pressure distribution across the face of the pad. Under load, the thrust pads deflect around the rigid pedestals in an umbrella-like fashion as shown in FIG. 20(A). By virtue of this umbrella-like deflection, only a partial hydrodynamic wedge is formed. Consequently, there is an uneven distribution of pressure across the face of the pad as illustrated in FIG. 20(A). Thus, the bearing has proportionately less hydrodynamic advantage compared to a bearing in which a hydrodynamic wedge is formed across the entire thrust pad face. Moreover, the rigidity of the pedestals and flat inflexible base prevent the deflections necessary to optimize wedge formation. The foregoing may explain why bearings of the type shown in FIGS. 19–20, while far less expensive than Kingsbury bearings, have proved less efficient and capable and consequently less successful than the shoe type bearings.

The present inventor has also discovered that the center pivot nature of both the bearing shown in FIGS. 19–20 and the Kingsbury shoe-type bearing contributes to bearing inefficiency. It should also be noted that, because of their rigid center pivots, neither the Kingsbury shoe-type bearings nor the bearing shown in FIGS. 19–20 can deflect with six degrees of freedom to optimize wedge formation. Thus, while, in some instances, the prior art bearings are capable of movement with six degrees of freedom, because the bearings are not modeled based upon or designed for six degrees of freedom, the resulting performance capabilities of these bearings are limited.

Prior art hydrodynamic bearings often suffer from fluid leakage which causes breakdown of the fluid film. In radial bearings, the leakage primarily occurs at the axial ends of the bearing pad surface. In thrust bearings, the leakage primarily occurs at the outer circumferential periphery of the pad surface as a result of centrifugal forces action on the fluid. When wedge formation is optimized, fluid leakage is minimized.

In addition to the aforementioned drawbacks in previously known hydrodynamic bearings, another reason why hydrodynamic bearings have not replaced rolling element bearings to any large extent is the fact that a hydrodynamic bearing is designed to operate in a fluid filled environment. Heretofore, there has been no economical and practical way of providing such an environment in many devices which use rolling element bearings. Consequently, the use of hydrodynamic bearings has been limited to applications in which a fluid is readily available, e.g., oil lubricated motors or other moving equipment where liquid is available to the bearing. Further, the need to provide a fluid operating environment, particularly in high load applications, increases the cost of hydrodynamic bearings prohibitively.

SUMMARY OF THE INVENTION

The present invention discloses a pad type bearing and methods of making the same. The pad type bearing, which is preferably unitary, is preferably formed from a single piece of heavy walled tubing or a cylindrical journal that has been machined or formed with small grooves and slits, bores or cuts through or on the bearing wall to define a flexible journal or thrust pad and a support structure capable of supporting the pad for movement in the six degrees of freedom (i.e., translation or movement in the +x, −x, +y, −y, +z and −z directions) and rotation about the X, Y, and z axes so as to optimize formation of the hydrodynamic wedge.

The bearings of the present invention are designed in three dimensions to provide deflection with six degrees of freedom so as to ensure optimum wedge formation at all times. Specifically, it has been discovered that a hydrodynamic bearing operates most effectively when the hydrodynamic wedge has several characteristics. In particular, the wedge should extend across the entire pad surface; the wedge should have an appropriate thickness at all times; the wedge should be shaped so as to minimize fluid leakage; the wedge should accommodate misalignment such that the major axis of the bearing is colinear or substantially parallel to the axis of the shaft; and the wedge should be formed at the lowest speed possible to prevent damage to the wedge forming surface which generally occurs as a result of shaft to pad surface contact at low speeds. Moreover, with thrust bearings, the loading among the spaced bearing pads should be equal.

With regard to thickness of the fluid film, it should be understood that the optimum thickness varies with loading. Under high or heavy loading, a relatively thick fluid film is desirable to adequately support the load. However, thicker films increase friction and power loss. Thus, the bearings are preferably designed to provide the minimum thickness necessary to support the shaft at maximum load.

The support structure is preferably unitary and comprises support stubs, beams, and/or membranes connected to a housing which is sometimes defined by the radially outermost portion of the bearing in the case of a journal bearing or, in the case of thrust bearings, a housing into which the bearing is mounted.

The inventor has discovered that in many specific applications such as in high speed applications, it is necessary to examine and evaluate the dynamic flexibility of the entire system consisting of the shaft or rotor, the hydrodynamic lubricating film and the bearing. In computer analysis of this system using a finite element model, it has been determined that it is necessary to treat the entire bearing as a completely flexible member that changes shape under operating loads. By adding more or less flexibility via machining of the basic structure, bearing characteristics may be achieved that provide stable low friction operation over wide operating ranges. A number of variables have been found to substantially affect the bearing's performance characteristics. Among the most important variables are the shape, size, location and material characteristics (e.g. modulus of elasticity etc.) of the pad and support members defined by the bores, slits or cuts and grooves formed in the bearing. The shape of the support members has been found to be particularly important. Also by providing a fluid backing to the flexible members, a high degree of damping may be achieved that further adds to system stability. In some instances, this damping has replaced secondary squeeze film dampening that is present when the oil film is present between the casing of the bearing and the housing.

It has been found that, in some cases bearings which are designed based on simulated operating conditions do not operate optimally under actual operating conditions. Accordingly, there is a need for a bearing which can be adjusted in response to sensed operating conditions.

The present invention further relates to hydrodynamic bearings in which the support structure includes one or more piezoelectric elements in the interstices within the bearing support structure and between the support structure and the bearing pad. The provision of piezoelectric elements in this manner makes it possible to actively control or adjust pad shape and orientation and to affect the deflection characteristics of the support structure. This can be done by supplying a precise amount of current to appropriately located piezoelectric elements to change the wedge shape or pad surface to minimize friction, maximize load carrying ability, alter stiffness or damping of the support structure to eliminate resonance and shaft whirl, i.e., optimize bearing performance by fine tuning the pad and support structure in response to actual operating conditions.

In accordance with another aspect of the present invention, the current supplied to each piezoelectric element can be controlled by a central processing unit (CPU) in response to sensed conditions to optimize wedge formation. More specifically, the CPU can receive signals from sensors capable of sensing physical characteristics such as temperature, shaft to pad contact, noise, friction in terms of power consumption (i.e., amp draw). The wedge can be directed to carry maximum load or to provide minimum power loss, etc., which are indicative of wedge quality. The CPU processes these signals and controls the supply of current to each of the piezoelectric elements so as to improve wedge quality or maintain wedge quality if it is found to be in a satisfactory range. Alternatively, the CPU can provide current to the piezoelectric elements in response to manual input instructions for specific deformations or deflections. For example, an operator could input a command to "increase rigidity" or "lift trailing edge" and the CPU would supply current to the appropriate piezoelectric elements to achieve the desired result.

Wedge quality can also be varied mechanically by a jacking screw or hydraulic fluid for physically altering the deflection characteristics of the bearing support structure. Both of these systems could be electrically controlled in response to sensed conditions or manually input signals. However, it is believed that piezoelectric elements are the most effective way of altering bearing characteristics in response to sensed conditions or otherwise.

The inventor has also discovered that, with respect to gas or air lubricated deflection pad bearings, there are instances where loads or speeds exceed the capability of a gas film. In these cases, it is necessary to introduce a liquid type lubricant into the converging wedge without providing a liquid reservoir or bath. The present invention provides a bearing which solves this problem by providing liquid lubricant when necessary.

Specific applications of the bearings of the present invention include electric motors, fans, turbochargers, internal combustion engines, outboard motors, and compressors/expanders. Test speeds have exceeded 300,000 r.p.m. It is noted that the cuts, grooves and openings in addition to allowing the bearing pad to move to form a converging wedge for hydrodynamic lubrication, allow the pad itself to deflect and change shape by for example flattening. This improves operating performance by, among other things, changing the eccentricity of the bearing.

The bearings may be formed of metals, powdered metals, plastics, ceramics or composites. When manufactured in small quantities, the bearings are typically machined by facing, turning, and milling the blanks to form larger grooves or openings; smaller grooves are formed by waterjet cutting, electrical discharge or laser machining methods and allow total design flexibility to tune the bearing to provide desired characteristics. Tuning will essentially change the stiffness that in turn eliminates vibration. Manufacture of larger quantities of a single type bearing is preferably accomplished through injection molding, extrusion, powdered metal die casting, investment casting or some similar manufacturing technique. In accordance with one aspect of the present invention, intermediate quantities of bearings are manufactured according to a novel method combining machining and investment casting techniques. The present invention also contemplates easily moldable bearings which include no hidden openings such that they can be molded in a simple two-piece mold. In general, the bearings of the present invention can be manufactured at a fraction of the cost of competitive bearings.

Unlike prior pad type bearings which have a support structure that is essentially oriented in the direction of load, the present invention provides an orientation that allows for comparable deflections within a smaller envelope (i.e., the difference between the radially inner journal surface and the radially outer journal surface in journal bearings) especially in journal bearings; allows for movement of the bearing pad in any direction (i.e., six degrees of freedom) to form a converging wedge shape; allows for the pad itself to change shape (e g., flatten) to improve performance; allows for development of a membrane damping system for improved stability; and allows the bearings to compensate for misalignment of the supported part or shaft and to equalize loading among the bearing pads in a thrust bearing. All of these characteristics contribute to formation of an optimum hydrodynamic wedge.

While there are numerous arrangements of bores, grooves, cuts, or slits there are primarily two modes of deflections, namely one or more ligaments or membranes which deflect in the general direction of load in a bending mode and secondly by torsional deflection in a beam or membrane in a direction extending away from the pad along the longitudinal axis of the shaft in journal bearings. The degree of deflection in the bending mode is, in part, a function of the stiffness of the support structure in the radial direction. The pad itself may be made to deflect under a load to form a different shape by providing internal cuts beneath the pad or by undercutting the edges of the pad. In either case the cuts are specifically made to result in a predetermined shape under load. By surrounding or backing certain ligaments or membranes with lubricating fluid, a damping element nay be added to the design.

Similar cuts are used for journal bearings and thrust bearings. The primary determinant is the deflections desired for optimum performance. However, since journal and thrust bearings perform significantly differently functions there are inherent differences in desired performance requiring different desired deflections. Consequently, despite the general conceptual similarity between the journal bearings and thrust bearings of the present invention there are also significant conceptual differences and plainly evident structural dissimilarities.

The bearing of the present invention includes a pad that may change shape and move in any direction (i.e., is supported for movement with six degrees of freedom) The bearing also may have a built-in damping system and is preferably of unitary or single piece construction for high volume economical manufacture. The journal bearings of the present invention also fits in a relatively small envelope (i.e., spacing between the housing outer diameter and the pad inner diameter).

In accordance with the present invention, the need for close tolerances between the bearing pad and the shaft portion to be supported can be obviated by dimensioning the bearing so as to eliminate the spacing between the bearing pad and the shaft portion to be supported while at the same time dimensioning the support structure such that the radial (in the case of a journal bearing) or axial (in the case of a thrust bearing) stiffness of the bearing is less that the corresponding fluid-film stiffness of the supporting fluid. Either the entire pad or only a portion thereof can be pre-biased into contact with the shaft. For instance, with extremely flexible bearings it may be desirable to pre-torque the entire bearing pad into contact with the shaft. On the other hand, in some instances it is advantageous to pre-torque only the trailing edge of the bearing pad into contact with the shaft so as define a hydrodynamic wedge. Thus, the bearings of the present invention can be designed to have an interference fit when installed on the shaft. In one embodiment, as the bearing is forced onto the shaft, the pad support structure deflects slightly to form a converging wedge shape while in the installed, static position with contact between the bearing pad and the shaft at the trailing edge. In such an instance where the bearing is designed to provide a statically loaded wedge, an appropriate spacing between the pad and the shaft will be established instantaneously upon rotation of the shaft by virtue of the stiffness of the fluid-film. This is because the fluid film enters the wedge and builds up fluid pressure causing separation of the shaft and pad. Specifically, the relatively stiff fluid causes the relatively flexible beam support structure to deflect until the stiffness of the support structure is equal to the fluid film stiffness. The instantaneous formation of the fluid film protects the surface of the bearing pad from damage which occurs at low start-up speeds when there is direct contact between the shaft.

Interference fit bearings of the aforementioned type allow a much larger variation in machining tolerances. For example, a relatively large (e.g. 0.003 inch) variation in the interference fit can be designed to have an insignificant impact on the wedge. This is particularly critical for gas lubricated bearings where alternate bearing forms require extraordinarily precise machining for proper operation. The present invention relaxes machining requirements.

Similarly the thrust bearings of the present invention can be designed to provide a statically loaded wedge. Specifically, the thrust bearings of the present invention can be designed such that the bearing pads are biased so that the inner circumferential edge of the bearing pad extends away from the shaft and so that the trailing edge extends toward the shaft. With this arrangement, in the static loaded condition, the bearing pad slopes toward the shaft in the radial direction (when moving outwardly from the axis). Further, the bearing pad slopes toward the shaft from the leading edge to the trailing edge. In this way a statically loaded wedge approximating the optimum wedge is formed and appropriate spacing between the pads and shafts is established instantaneously upon rotation of the shaft.

In the bearings of the present invention, the pad movement may be directed toward the shaft to hold shaft location and to give the pad the ability to adjust for misalignment of the shaft and unequal loading among pads. Of course, the present invention may apply to any radial, thrust or combined radial and thrust form of bearings and may be one or two directional in nature, depending on the configuration of the bearing. More specifically, if the bearing support structure is symmetrical about the bearing's pad circumferential center line, the bearing will be bidirectional, i.e., capable of supporting a shaft for rotation in two directions in an identical fashion. However, if the bearing support structure is non-symmetrical about the bearing's pad circumferential center line the bearing will deflect differently when supporting a shaft for rotation in a first direction as compared to rotation in the opposite direction. For both journal or radial bearings and thrust bearings, the major axis is the central axis of the cylindrical blank from which the bearing is formed.

In accordance with another important aspect of the bearings of the present invention, the bearing pads can be supported for deflection so as to retain the hydrodynamic fluid, thus obviating the problem of fluid leakage. With respect to radial or journal bearings, the support structure is designed such that, under load, the bearing pad deflects to form a fluid retaining pocket. Generally, such a support is achieved when the primary support portion is connected to the bearing pad proximate the axial edges of the bearing pad and the center of the bearing pad is not directly supported, i.e., is free to deflect radially outward. Alternatively or additionally, one or more piezoelectric elements may be placed within the support structure or between the support structure and the pad to make it possible to forcibly deform the pad to create or assist in the creation of a fluid retaining pocket.

With respect to thrust bearings, the pad is supported so as to tilt toward the bearing's inner diameter under load so as to prevent centrifugal leakage. Generally, this is achieved when the pad support surface at which the primary support structure supports the bearing pad is located closer to the bearing outer diameter than to the bearing inner diameter. When the primary support structure includes two or more radially spaced beams, the overall support structure must be designed to cause deflection of the bearing pad at the inner end. Further, when the bearing pad is supported by a plurality of radially spaced beams and the region between the beams is not directly supported, the pad will tend to deflect so as to form a concave fluid retaining channel. Again, piezoelectric elements can be placed within the support structure to allow selective creation or selective assistance in the creation of a hydrodynamic wedge.

In accordance with another aspect of the present invention, the hydrodynamic bearings of the present invention may be secured to the rotating shaft for movement with the shaft relative to a static support surface in the housing. The general configuration of bearings adapted to be mounted to the rotating shaft is similar to that of bearings intended to be mounted to the static housing, but with a radially inverted construction. Of course, there are differences owing to the inverse orientation of the supports. The running pad portions which correspond to the pad portions are supported on a radially inward support structure. The support structure supports the bearing pads for deflection radially inward and outward to establish a hydrodynamic wedge with respect to the smooth portion of the housing. In addition, as the bearing rotates with the shaft, centrifugal force acts on the bearing pads tending to force the bearing pads outward toward the smooth surface of the housing. Such a construction is generally most suitable for light load applications.

The present invention also relates to sealed bearing housing assemblies or packs which include one or more hydrodynamic bearings, preferably of the type disclosed herein or in the present inventors' previous applications. Generally, the sealed bearing packs include a sealed housing having a static housing portion, a rotatable housing portion and a seal extending between the static housing portion and the rotatable housing portion to preserve the fluid tightness of the housing when the rotatable housing portion moves relative to the static housing portion.

The rotatable housing portion is mounted on the shaft and rotates with the shaft. The mounting of the rotatable housing portion on the shaft can be done in any way such as splining, threading, keying, gluing, welding, heat shrinking or the like. The static housing portion is secured to the housing and non-rotatable therewith. The static portion may also be secured to the housing in any known way such as splining, keying, gluing, welding, or the like.

Generally either the static housing portion or the rotable housing portion (usually the static portion) is formed in two or more pieces. This makes assembly of the bearing unit easier, particularly when more than one bearing is sealed within the housing unit.

The seal may be any type of known seal including an O-ring, a base seal, a packing seal, a lip seal, a compression packing seal, a U-cup packing seal, a flange or hat packing seal, a V-ring packing seal, an O-ring packing seal, a T-ring packing seal, a cup packing seal and a confined packing seal. The particular seal structure depends on the balance of the need to maintain a tight seal and the need to obtain a low friction seal.

The seals, static housing and rotating housing are formed together to form a ring-like or annular chamber. One or more hydrodynamic bearings, preferably of the type disclosed herein, are located within the chamber. The chamber is filled with hydrodynamic fluid. The hydrodynamic bearing is integral with or fixedly mounted to either the rotatable housing part or the static housing part for movement relative to the other part. A smooth support surface is provided on the other part adjacent the bearing pad surface. The bearing is designed such that, upon rotation of the shaft, a hydrodynamic wedge is formed between the bearing pads and the support surface. In this way, the shaft is supported by the fluid within the film.

Any type of hydrodynamic bearing can be mounted within the chamber. These bearings may include radial bearings, thrust bearings, combined radial and thrust bearings or any combination of these three types of bearings. Moreover, in accordance with an important aspect of the present invention, individual thrust pads may be substituted for the thrust bearings of the present invention. The thrust pads can be of the type disclosed in the present inventor's previous U.S. Pat. No. 4,676,668. The various bearings situated in the housing should be packed, particularly in the axial direction, into a tight relationship to insure proper operation.

In accordance with another aspect of the present invention, the sealed hydrodynamic bearing units of the present invention may have a modular construction in which a standard housing can be used with various standard bearings to accommodate different requirements. The basic components of this modular construction are the housing components, i.e., the static housing portion, the seals and the rotatable housing, an assortment of radial, thrust and combined radial and thrust bearings and an assortment of clips and/or spacers for axially packing the housing to insure proper performance. This modular construction enables the use of standardized parts to achieve a wide variety of results and provides the opportunity for economies of scale in the manufacture of hydrodynamic bearings. Thus, the modular construction offers potential savings in terms of cost of manufacture.

In accordance with the present invention, a number of methods of manufacturing the bearings of the present invention are also contemplated. The selection of a particular method of manufacturing depends largely on the volume of the particular bearing to be manufactured and the materials used. In low volume applications, or when it is desired to produce prototypes for testing and/or production of molds or the like, the bearings are preferably manufactured from metallic cylindrical blanks such as heavy wall tubing or other journals which are machined to provided radial and/or facing bores or grooves and formed with radial cuts or slits through either numerically controlled electrical discharge manufacturing techniques, numerically controlled laser cutting techniques, or numerically controlled water-jet cutting. In intermediate volumes, the bearings of the present invention are preferably manufactured using an investment casting method in accordance with the present invention. In high volume applications, the bearings of the present invention can be manufactured using a wide variety of materials such as plastics, ceramics, powdered and non-powdered metals, and composites. In high volume applications, a number of manufacturing methods including injection molding, casting, powdered metal, die casting, and extrusion can be economically employed. The bearings of the present invention can be formed in a shape which is easily moldable.

In short, the present invention relates to radial, thrust and compound radial and thrust hydrodynamic bearings which perform significantly better than known bearings and can be manufactured at a fraction of the cost of competitive bearings. Further, the present invention relates to a sealed bearing assembly which allows easy use of such bearings in applications heretofore reserved for rolling element bearings.

BRIEF DESCRIPTION OF THE DRAWINGS

The details of the invention will be described in connection with the accompanying drawing, in which:

FIG. 2 is a sectional view of a journal bearing illustrating a sector thereof embodying one form of the invention;

FIG. 2A is a schematic view of a single pad made in accordance with the example illustrated in FIG. 2;

FIG. 3 is an edge view of the pad of FIG. 2 illustrating the pad orientation with the support structure in the loaded state;

FIG. 4 is a sectional view of a sector of a second example of a journal bearing made in accordance with the present invention;

FIG. 5 is a view partly in section of a single pad of FIG. 4;

FIG. 5A is a perspective view of a section a modified form of the bearing of FIG. 4;

FIG. 5B is a perspective view of a modified form of the bearing shown in FIG. 4;

FIG. 6 is an end view of the bearing of FIG. 4;

FIG. 7 is a diagrammatic view of the torsional deflection of a beam, greatly enlarged;

FIG. 8 is a sectional view of a journal bearing illustrating an example of a bearing incorporating the features of the present invention which includes two beams;

FIG. 9 is an edge view of the pad of FIG. 1 illustrating local deflection of the pad surface without support structure deflection, greatly exaggerated;

FIG. 10 is an edge view of the pad of FIG. 8 illustrating the pad orientation with the support structure in the loaded state.

FIG. 10A is an edge view of the pad of FIG. 8 illustrating local deflection of the pad surface greatly exaggerated.

FIGS. 11A and 11B are cross sectional views of a cylindrical journal or blank prior to machining;

FIGS. 13A and 13B are cross-sectional views of a further machined journal or blank;

FIG. 29A is a cross-section of another thrust bearing construction according to the present invention;

FIG. 29B is another cross-section of the bearing of FIG. 29A;

FIG. 30A is a top view of the bearing of FIG. 29A;

FIG. 30B is a bottom view of the bearing of FIG. 29A;

FIG. 31 is a side view of another journal bearing construction in accordance with the present invention;

FIG. 31A is a radial cross-section of a portion of the bearing illustrated in FIG. 31;

FIG. 32 is a side view of another journal bearing construction in accordance with the present invention;

FIG. 32A is a radial cross-section of the bearing of FIG. 32;

FIG. 35B is a bottom view of the bearing of FIG. 38A;

FIG. 42 is a cross-section of a sealed bearing assembly in which separate bearing pads are secured to the static housing portion;

DETAILED DESCRIPTION

Figure 1A:
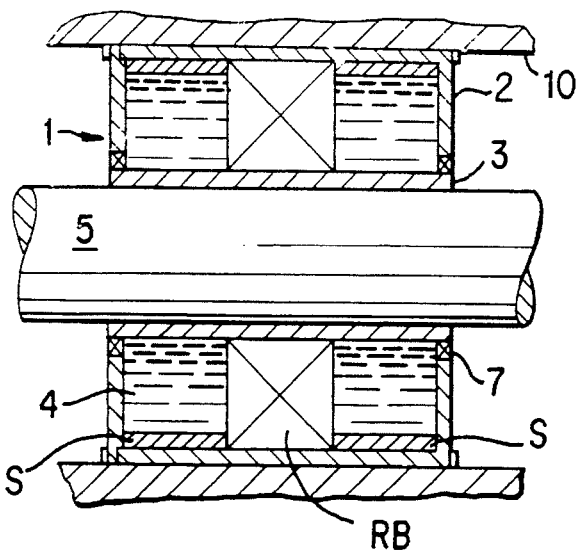
FIG. 1A is a cross-sectional schematic illustration of a radial bearing enclosed in a modular sealed housing assembly.
Figure 1B:
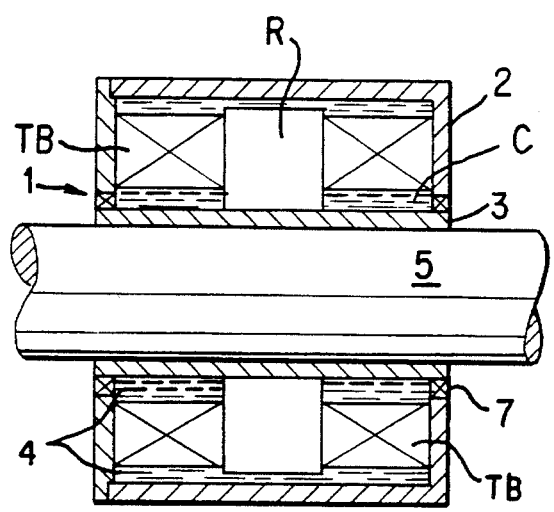
FIG. 1B is a schematic cross-sectional illustration of the housing assembly of FIG. 1A having a thrust bearing assembly enclosed therein.
Figure 1C:
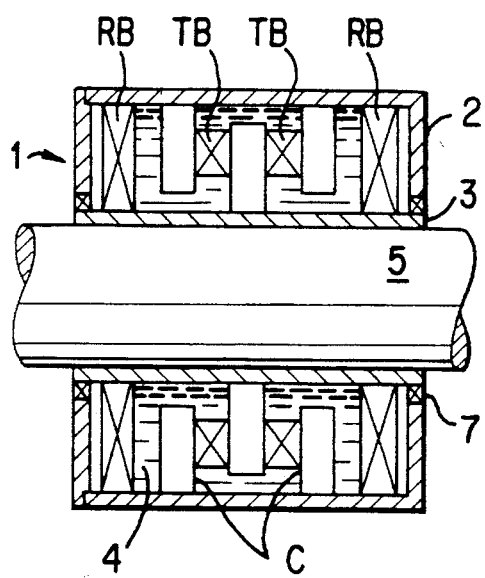
FIG. 1C is a schematic cross-sectional illustration of the housing assembly of FIG. 1A having thrust bearings and radial bearings enclosed therein.
Figure 1D:
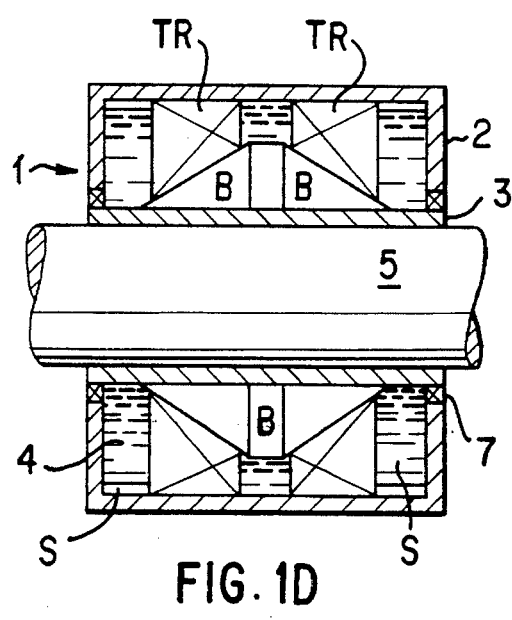
FIG. 1D is a schematic cross-sectional illustration of the housing assembly of FIG. 1A having a pair of combined radial and thrust bearings enclosed therein.

In describing the bearings of the present invention in an understandable way, it is helpful to describe the bearing structures as being formed from a cylindrical blank by providing grooves, slits, bores and other openings in the cylindrical blank. As noted below, this is sometimes a useful technique for manufacturing a prototype bearing. However, the reference to the cylindrical blank is primarily intended to assist understanding of the present invention. It should be noted that although many of the bearings of the present invention could be manufactured from a cylindrical blank, it is not necessary that any of them be so manufactured. Indeed the bearings can be manufactured in numerous ways, some of which are discussed hereinafter.

Referring first to FIG. 2, the structure therein illustrated is a sector of a journal bearing assembly having grooves and slits formed therein so as to define a housing 10 and a plurality of circumferentially arranged bearing pads 12 each of which is supported by a support structure which includes the housing, a beam 14 and a stub section 126. The bearing defined by the pad circumferential center line 13a (in FIG. 3). Accordingly, the bearing illustrated is a radial unidirectional bearing, i.e., it is adapted for radially supporting a shaft for rotation in only one direction. In the illustrated embodiment, the bearing supports the shaft 5 only for rotation in the counter-clockwise direction illustrated by the arrow. On the other hand, if the bearing were symmetrical about the center line of the pad, it would be capable of supporting the shaft 5 for either clockwise or counter clockwise rotation, i.e., the bearing would be bidirectional.

Each bearing pad 12 includes a leading edge 15 and a trailing edge 17. The leading edge is defined as the edge first approached by a point on the circumference of the shaft as it continues to rotate. Similarly, the trailing edge is defined as the edge approached circumferentially later by the same point on the shaft as it continues to rotate. When the shaft 5 is rotating in the proper direction, it moves, on a fluid film, from the leading edge across the bearing pad and off the trailing edge. Optimum performance is obtained when the stub-section 16 supports the bearing pad 12 and hence any load, at a point 16a (FIG. 3) between the circumferential center line 13a of the pad 12 and the trailing edge 17 preferably, closer to the center line 13a. The beam 14 should also pivot about a point 14a which is located angularly between the leading edge and the trailing edge so that as a result of deflection of the beam 14, the trailing edge 17 deflects inwardly. Of course, the degree of deflection depends on, among other things, the shape of the beam and the length of the cuts or slits formed in the bearing.

Although specific reference is made to either journal bearings or thrust bearings to facilitate an understanding of this invention, some of the same principles of bearing design apply regardless of the specific form of bearing being designed. For example, both types of bearings operate on the principle of formation of a hydrodynamic wedge. Further, the major axis of both journal bearings and thrust bearings is the central axis of the cylindrical blank from which the bearing is formed. The circumferential pad center line is the radially extending line passing through the geometric center of the pad and the major axis of the bearing. Accordingly, if either a thrust bearing or a journal bearing is symmetrical about this center line axis, i.e., the major axis, the bearing will be bidirectional.

There are significant differences between thrust bearings and journal or radial bearings. The most prominent difference is, of course, the portion of the shaft supported and consequently the orientation and/or attitude of the bearing pad supports. For instance, while journal bearings support circumferential portions of shafts, thrust bearings support shoulder or axial end portions of shafts. Other differences follow from this fundamental difference. For example, in a radial or journal bearing the pads in the direction of the load take or support the load; whereas, in a thrust bearing, all pads normally share load. Moreover, a journal bearing generally has a built-in wedge due to differences in the shaft and bearing diameters; conversely, there is no such built-in wedge in thrust bearings. Additionally, while a journal or radial bearing controls rotational stability as well as load; a thrust bearing typically only carries load. It should also be understood that the design of journal bearings, particularly hydrodynamic journal bearings, is significantly more complicated than the design of thrust bearings. In part, this is because of the constraints imposed by the need to limit the radial envelope of the journal bearings. In order to accommodate these differences the configuration of the thrust bearings is naturally somewhat different than that of journal bearings. Nevertheless, as is evident from this disclosure, many of the principles discussed herein are applicable to either thrust or journal bearings.

FIGS. 1A–1D schematically illustrate the sealed bearing unit construction of the present invention. As illustrated in these Figures, the sealed housing assembly 1 includes a static housing portion 2 secured to the housing, a rotatable housing portion 3 secured to the shaft 5 by splines, threads, keys, welding, gluing, heat shrinking or the like, seals 7 providing a seal between the rotating housing portion 3 and the static housing portion 2, a hydrodynamic fluid 4 located within the sealed housing 1 and one or more hydrodynamic bearings providing radial and/or thrust support between the rotating housing portion 3 and the static housing portion 2.

Generally, at least one of the two housing portions, 2,3 is separable. Usually the static housing portion 2 will be axially split or have a removable end cap as shown in FIGS. 1A–1D. The separability of the housing makes it easier to assemble the bearing components within the sealed housing. As can be appreciated from the drawings, in some cases it would be impossible to assemble the bearing within the housing without separable housing portions. On the other hand, it is sometimes possible to use a two part interlocking housing as shown in FIGS. 6A, 26A, 29C, 31B, 32C, 33D and 37A.

FIGS. 1A–1D illustrate various combinations of hydrodynamic bearings within a standard bearing housing construction. The bearings are illustrated schematically and labelled TB to indicate thrust bearings, RB to indicate radial bearings, and TR to indicate combined radial and thrust bearings. As illustrated in these drawings, many possible combinations of bearings can be provided to accommodate different support needs. Better operation of the bearing unit, particularly the thrust aspects thereof occurs if there is no axial play within the housing. Accordingly, spacers can be provided to take up any axial play. In these schematic illustrations, the bearing assemblies also include spacers S and clips C to retain the bearings in position with respect to the housing. The housing portions 2 and 3 can also have threads, splines or the like to fixedly locate the component parts. The spacers S can also function as thrust, radial or combined thrust-radial runners if they have a surface against which the pad can ride.

FIGS. 1A–D also show that the sealed bearing unit can have a modular construction. Specifically, a standard housing such as that shown in FIGS. 1A–1D can accommodate a wide variety of bearing arrangements. By using a standard housing, an assortment of standard hydrodynamic thrust, radial and combined radial and thrust bearings and clips and spacers for removing axial play and retaining the bearings in position, various bearing characteristics can be achieved. The spacers are provided with a smooth surface against which the thrust member can ride.

Of course, the sealed bearing unit may be designed for a specific bearing. Examples of specific sealed bearings constructions are illustrated below. In such a case, the housing can be dimensioned as required to optimally support the bearing for which it encases. Thus, normally the need for spacers and clips would be eliminated.

Various types of seals may be used at the locations for seals located at 7 in the drawings. The seals may include any known packing seals, lip seals, face seals, leaf seals and the like.

It should be recognized that the specific shape of the housing illustrated in FIGS. 1A–1D is not necessary. For example, when the housing is intended to support only a radial bearing, it is likely to have a radially elongated rectangular cross-section. Generally, an axially housing such as that shown in FIGS. 1A–1D would be used when the bearing housing is to encase a plurality of bearings or a bearing assembly. When individual bearings are involved, the housing would be shorter in the axial direction. As noted above, the housing segments may be subdivided into portions, if necessary, to allow assembly of a desired bearing configuration. The rotatable housing portion could simply be a cylindrical sleeve and the static housing portion could be a cylindrical member with one or more end walls as shown in FIG. 1A–1D. The static housing 2 has a removable end wall to allow assembly. Another housing construction, this one having an interlocking cylinder configuration shown in FIG. 6A, among others.

Alternatively, the static housing portion could be a cylindrical sleeve and the rotating housing portion could be an inner sleeve with outwardly projecting flanges or end walls sealed to the inner periphery of the cylindrical sleeve. Moreover, though not shown, either the static housing portion or the rotating housing portion could have a centrally projecting flange; this is particularly helpful to provide a thrust runner surface. Of course, the thrust runner surface can be provided by spacers clipped or wedged into engagement with either the rotating surface or the static housing portion or screwed onto one of the surfaces.

Thus, it can be seen that there are many ways to provide a sealed housing enclosing a generally cylindrical space and having two portions which are rotatable with respect to one another in a way which allows assembly of one or more hydrodynamic bearings within the cylindrical space. The choice of any specific housing configuration depends on the nature of the bearing assembly sealed within the housing and on the environment in which the bearing is to be used.

The choice of a hydrodynamic fluid depends on the particular application. However, generally motor/spindle oil or transmission fluid would be an appropriate fluid.

The selection of specific bearings also depends on the particular application. Naturally, known hydrodynamic bearings can be used. However, the present invention provides bearings which offer improved results.

Referring now to FIGS. 2, 2A and 3, it will be seen that the pad 12 is provided with an arcuate face 13 which corresponds essentially to the radius or arc of the outer diameter of the shaft which the pad will be supporting (via the fluid film) and each pad is defined by axially extending and radially extending edges. The axially extending edges comprise the leading and trailing edges. The beam is shown both in a static position (solid lines) and in a deflected position (phantom lines) in FIG. 3. The basic construction of the support structure as illustrated in FIG. 1, is created by the use of small slits or cuts through the wall. Typically these slits or radial cuts are between 0.002 to 0.125" wide. The degree of deflection can be varied by varying, among other things, the length of the cuts. Longer cuts provide a longer moment arm which yields greater deflection. Shorter cuts yield beams having less flexibility and higher load carrying ability. In selecting a length of cut or slit, care must be taken to avoid resonance. Also, a piezoelectric element 100 or some other means for forcibly altering the deflection characteristics of the bearing may be located between the pad and support structure (as shown) as within the support structure. If a piezoelectric element is provided, wires, metal strips or some other means for supplying current to the piezoelectric element must be provided.

By locating the end of beam 14 as shown, the deflection downward about the connection point 16a will result in inward movement of the trailing edge 17 of the pad 12 outward movement of the leading edge 15 and a slight flattening of the pad 12, as seen in the dotted lines of FIG. 9. As a result of this deflection, the gap between the pad face 13 and the outer surface of the shaft 5, through which fluid flows, becomes wedge shaped to yield the well-known hydrodynamic support effect. Ideally the ratio of the spacing between the trailing edge and the shaft versus the spacing between the leading edge and shaft is between 1:2 to 1:5. In other words, the spacing between the leading edge and shaft should be between 2 to 5 times greater than the spacing between the trailing edge and the shaft. In order to attain this ideal spacing or wedge ratio for any specific application, appropriate deflection variables including number, size, location, shape and material characteristics of the unitary element must be selected. A computer aided finite element analysis has proven to be the most efficacious means of optimizing these variables. It should also be noted that the "ideal wedge" depends on desired performance characteristics. For example, the ideal wedge for maximizing load carrying ability is not the same as the ideal wedge for minimizing friction associated power consumption. Computer aided analysis is particularly useful in a bearing such as the type described above which permits movement in all six directions (six degrees of freedom).

While this technique has provided superior results, it has been observed that, in some cases, a bearing designed for optimal performance under simulated operating conditions does not perform optimally under actual operating conditions. The bearings of the present invention can be adjusted in response to sensed operating conditions to correct any operating deficiencies. More specifically, the bearings of the present invention can include separate elements for physically altering the wedge shape, pad surface and/or deflection characteristics of the support structure. The separate elements can be controlled by a central processing unit (CPU) which in turn receives signals indicative of wedge quality. For example, the sensors can sense physical characteristics such as temperature, shaft to pad contact, torque, noise, power consumption, etc. The signals from the sensors are transmitted to the CPU and compared with conditions indicative of optimum wedge formation. When there is a substantial deviation between the actual sensed conditions and the conditions indicative of optimum wedge quality, the CPU transmits a signal to the means for physically adjusting the wedge shape, pad surface and/or deflection characteristics of the support structure to forcibly adjust the wedge to achieve optimum wedge formation. Alternatively, or in addition, the CPU can be responsive to direct, manually input, commands such as "INCREASE RIGIDITY" or "RAISE TRAILING EDGE". When such a command is received, the CPU undergoes a routine predetermined to achieve the desired result.

Various means can be used to physically alter wedge quality. For example, wedge quality can be physically altered by forcing hydraulic fluid into damping chambers (discussed below) to alter the damping characteristics of the bearing support structure. Alternatively, a mechanical rod or jack screw can be brought into contact with the support structure to physically alter the deflection characteristics of the support screw. Either of these means could be electrically controlled.

Although many means could be used to physically adjust the wedge in response to sensed operating conditions, it is presently believed that the best such means is to provide one or more piezoelectric elements in the interstices within the bearing support structure or between the support structure and the bearing pad. The provision of piezoelectric elements in this matter makes it possible to actively control or adjust pad shape and orientation and to affect the deflection characteristics of the support structure. More specifically, it is known that the application of an electric current to certain crystals and ceramics materials can produce mechanical expansion forces. When an altering voltage is applied, the crystal or ceramic material undergoes thickness oscillations. However, when a direct current is constantly applied the change in thickness does not vary. Thus, it is known that certain materials can change dimensions when subjected to voltage. Notable among these materials are quartz, rochelle salt (potassium, sodium tartarade), properly polarized barium titanade, ammonium dihydrogen phosphate, ordinary sugar and certain ceramics. Of all the materials that exhibit the piezoelectric effect, none possesses all the desirable properties such as stability, high output, insensitivity to temperature extremes and humidity, and the ability to be formed into any desired shape. Rochelle salt provides the highest output, but requires protection from moisture and air and cannot be used above 45° C. (115° F.). Quartz is undoubtedly the most stable, yet its output is low. Because of its stability, quartz is quite commonly used for a stabilizing in electronic oscillators Often the quartz is shaped into a thin disc with each phase silvered for attachment of electrodes. The thickness of the plate is ground to the dimension that provides a mechanically resonant frequency corresponding to the desired electrical frequency. This crystal may then be incorporated in an appropriate electronic circuit with frequency controls.

Rather than existing as a single crystal, as are many piezoelectric materials, barium titanade is polycrystalline; thus it may be formed into a variety of sizes and shapes. The piezoelectric effect is not present until the element is subjected to polarizing treatment.

The piezoelectric elements could be located in the interstices of any of the hydrodynamic bearings of the present invention. However, the convenience of placing a piezoelectric element within the support structure or between the support structure and the bearing pad naturally depends on the spacing between the support structure and the bearing pad or within the support structure. Since the bearings described hereinafter have a wide variety of intersticial spacing and because the actual size of the spacing depends on the size of the bearing, the selection of a bearing form from the varieties described hereinafter for use in a piezoelectrically controlled bearing depends on, among other things, the diameter of the bearing to be used.

For a relatively large bearing in which the openings in the support structure are proportionately larger, a bearing constructed along the lines of the bearings illustrated in FIGS. 2, 8, 25, 31 and 37 would be appropriate. On the other hand, for very small bearings in which the interstices or spaces are proportionately much smaller a bearing of the type shown in FIG. 32 or FIG. 38 would be more appropriate. It should be kept in mind that when the size of the piezoelectric element becomes close to the size of the support structure elements themselves, the effect of the piezoelectric element on the overall bearing construction becomes proportionately greater. Under normal circumstances, the piezoelectric elements are intended only to provide small modifications to the bearing performance, since the bearings even without the piezoelectric element function, close to optimally. Thus, the provision of a piezoelectric element filling the space within the support structure of the bearing at FIG. 32 would alter the essential character of the bearing from a hydrodynamic bearing to a piezoelectrically controlled bearing. In some cases this may be desired.

For example, the bearing shown in FIGS. 2 and 2A can include piezoelectric elements 100 disposed within the support structure and between support structure and the bearing pads. Electrical leads (not shown) are connected to each of the piezoelectrical elements. The supply of current to the electrical leads is controlled by a control system. Preferably, the control system includes a central processing unit (CPU) which controls all of the piezoelectric elements in response to signals obtained from sensors monitoring the condition of the hydrodynamic wedge or in response to manually input signals.

One example of a control system controlling the piezoelectric elements 18 in the bearings of the present invention includes a CPU which receives input signals from various sensors which monitor conditions indicative of the quality of the hydrodynamic wedge. For example, the CPU could receive signals from a temperature sensor, a noise sensor, a shaft to pad contact sensor, power consumption sensor, torque sensors and/or strain sensors. The signals received from each of these sensors can then be sequentially compared to values stored in a read-only memory (ROM) which are indicative of proper wedge formation. The ROM could include stored values for one or more desired wedge formations such as "MAXIMUM LOAD CARRYING ABILITY" or "LOW FRICTION/LOW POWER". When it is determined that the sensed conditions fall outside of the appropriate range, a diagnostic analysis could be performed to determine the appropriate corrective measure. As a result of this diagnostic analysis, a determination of which, if any, of the piezoelectric elements are to be charged and the extent to which they are to be charged can be made.

The bearing of FIG. 8 can include piezoelectric elements 100 provided in selected areas to allow fine tuning of the hydrodynamic wedge. Again, there are leads (not shown) connected to each piezoelectric element and the control of the current to the piezoelectric elements is controlled by a control system processing unit of the type described above.

Figure 25:
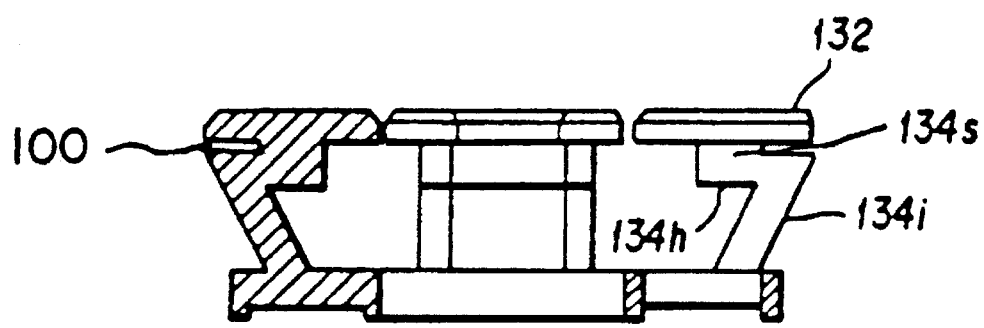
FIG. 25 is a cross-section of another bearing according to the present invention.

The bearing of FIG. 25 can include piezoelectric elements 100 located between the support structure and the bearing pad 132 to allow selective precise control of the amount of downward deflection of the bearing pad 132. In this particular instance, the piezoelectric elements 100 are provided in a common location for each of the bearing pads so that the piezoelectric elements have a single function, i.e., controlling the downward deflection of the bearing pads. Naturally, additional piezoelectric elements 100 could be provided in other locations for other purposes if desired. Again, the piezoelectric elements 100 have leads (not shown) connected thereto and the flow of current to the leads is controlled by a central processing unit of the type described above.

The bearing of FIG. 31 can include piezoelectric elements 18 located in selected areas to allow selective adjustment of the wedge according to sensed operating conditions. Once again, the leads are connected to the piezoelectric elements 18 and the flow of current to the piezoelectric elements through the electrical leads is controlled by a control system which may be of the type described above. It should also be noted that the flow of current to the piezoelectric elements can be controlled by a manually operated electrical control system. It is believed however that better results are obtained through the use of a central processing unit.

Figure 37A:
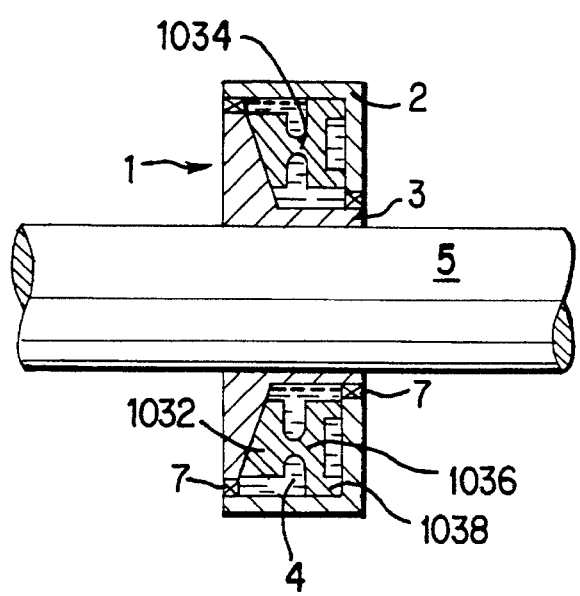
FIG. 37A is a cross-section of the bearing of FIG. 37 in a sealed housing assembly.
Figure 19:
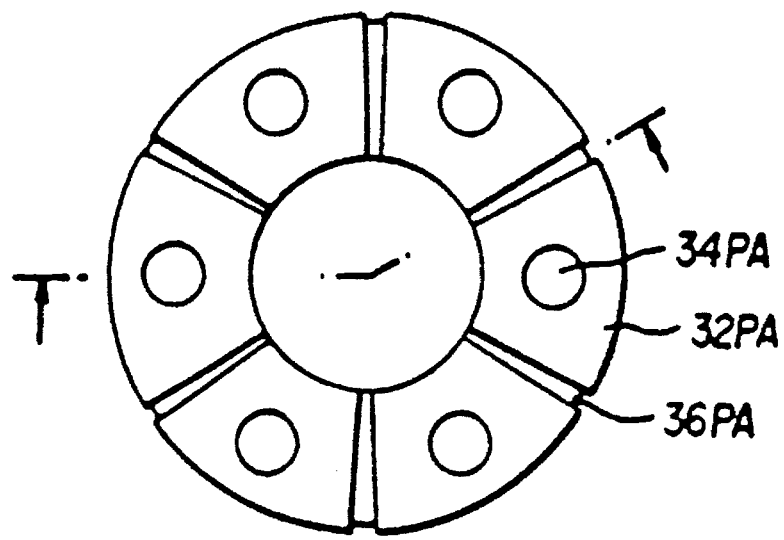
FIG. 19 is a top view of a prior art thrust bearing.
Figure 20:
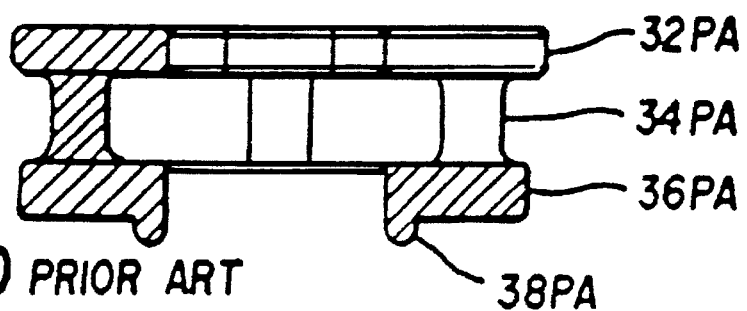
FIG. 20 is a cross-section of the prior art thrust bearing of FIG. 19.
Figure 20A:
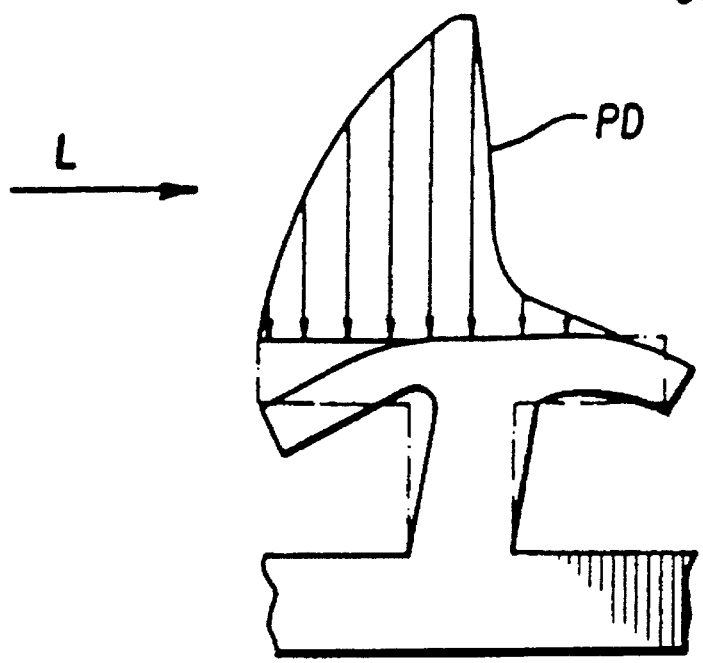
FIG. 20(a) is a schematic representation of a segment of the prior art thrust bearing of FIGS. 19 and 20 showing the pressure distribution across the surface of a bearing pad.
Figure 37:
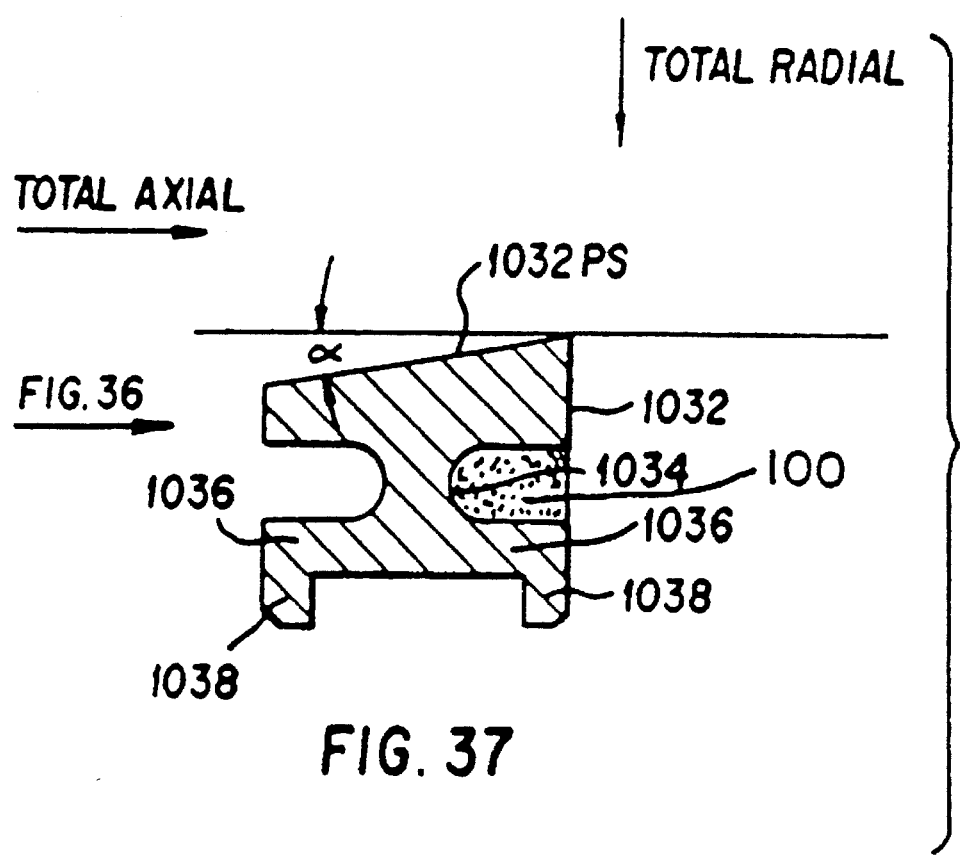
FIG. 37 is a diagrammatic cross-section of the bearing of FIG. 36 illustrating the forces acting on the bearing pad.

The combined radial and thrust bearing of FIG. 37 can include piezoelectric material 100 loaded into a space between the support structure and the bearing pad. Electrical leads connected to the piezoelectric material 100 apply current selectively to the piezoelectric material to cause a change in the dimension of the piezoelectric materials such that the deflection characteristics of the bearing are controlled. The flow of current to the leads and hence the flow of current to the piezoelectric material is preferably controlled by a central processing unit.

In a similar fashion, any of the bearings of the present invention can include one or more piezoelectric elements to allow adjustment of the deflection characteristic of the bearing.

Referring to FIGS. 4 and 5, there is shown a second illustrative example of a bearing incorporating features of the present invention in which the bearing is formed with slits or cuts and grooves to define a bearing housing 30 with a bearing pad 32 that is supported from the housing by a support structure which includes a beam having a pair of beam portions 34a, 34b which extend substantially in a single line away from the pad. Moreover, the pad may be undercut so that it is supported by the beams only on a pad support surface 34ps. Referring to FIG. 5, it will be seen that the beams 34, 34a have a convenient stub beam end as is 36, 36a which acts as a cantilever support for the beam.

As is evident from FIG. 4, the perspective view of FIG. 5 shows only a portion of the pad 32. The complete pad is illustrated in FIGS. 5A and 50 which show possible modifications of the bearings illustrated in FIG. 4. As is clear from the drawings, the pad support surface 34ps is located closer to the trailing edge 37 than the leading edge 35. With this construction, twisting of the beam, as illustrated in FIG. 7, will take place intermediate the beam and create the torsional deflection illustrated. Again the primary flexibility is developed by small cuts or slits through the bearing housing wall. These cuts provide the bearing pad with six degrees of freedom (i.e., the pad can translate in the +x,−x, +y,−y, +z and −z directions as well rotate about the x, y and z axes) and are designed to optimize hydrodynamic wedge formation. If the cuts or slits were terminated before breaking through to form beam portions 34a and 34b, the pad 32 would be supported by a continuous cylindrical membrane 34m as shown in FIG. 5A. The membrane acts as a fluid damper upon which the pad 32 is supported. The termination of the cuts would occur at Point A and Point B of FIG. 4. The flexibility of the membrane combined with the fluid lubricant, provides a means to vary the damping action and to isolate the pad from the housing. The damping takes the form of a dash pot that exhibits high damping characteristics. As with the bearing illustrated in FIGS. 1–3, the bearing illustrated in FIGS. 4–7 is nonsymmetrical about its pad center line and is therefore a unidirectional bearing. Accordingly, the bearing has a leading edge 35 which deflects outward and a trailing edge 37 which deflects inward to form a wedge. Again, the wedge ratio of spacing between the trailing edge and the shaft to the spacing between the leading edge and the shaft) should be between 1:2 to 1:5. Moreover, the location of the center of action of the load which is primarily determined by the location of pad support portion 34ps of the beam 34 with respect to the pad should, again, be between the circumferential center of the pad face and the trailing edge, preferably closer to the circumferential center of the pad face.

As shown in FIG. 5B, the beam may be defined more simply than shown in FIG. 5 by simply extending the cuts or slits downward from points A and B.

Figure 6A:
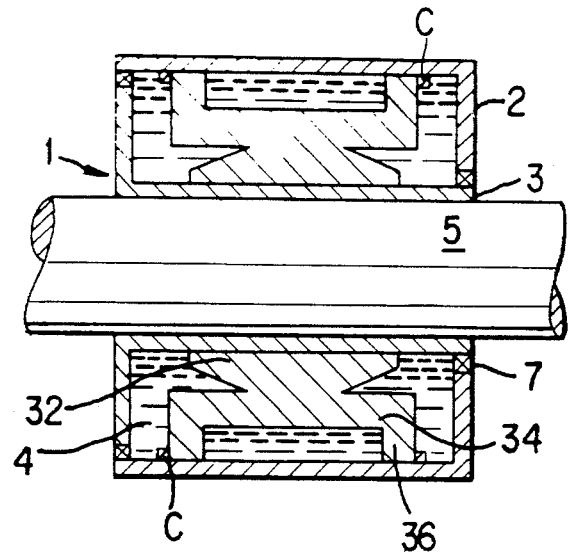
FIG. 6A is a cross section of the bearing of FIG. 6 in a sealed housing assembly.

FIG. 6A illustrates a bearing of the type shown in FIG. 6 in a sealed bearing unit. As shown therein, the bearing is secured to a static housing portion 2 in a known manner, e.g., splines, threads, clips, adhesive welding or any combination thereof. The bearing pads 32 are adapted to support a rotating surface of the rotating housing portion 3. The rotating housing portion 3 is rotatably secured to the shaft by splines threads heat shrinking or the like. The bearing is surrounded by hydrodynamic fluid 4 and seals 7 seal the static 2 and rotating 3 housing portions with respect to one another. As described above, the static housing portion 2 is secured to and functions as a portion of the static shaft housing and the rotatable housing portion 3 is secured to the shaft 5 and functions as an extension of the shaft 5. Thus, when the shaft 5 rotates, the housing portion 3 rotates relative to the housing portion 2 and the bearing connected thereto. In this way, the shaft is supported by the bearing through the rotatable housing portion.

Referring to FIG. 8, there is shown a third illustrative example of a bearing incorporating features of the present invention. In this example, internal slits or cuts are provided to create a beam on beam support structure. Specifically, the bearing is formed with grooves and slits or cuts to define a pad 40 which is supported from a housing by beams 42 and 44. The pad is connected to the beams at support stubs 40a and 40b. Beam attachment to the housing is at support stubs 46 and 48. Again the bearing consists of the thin cuts or slits shown cut through the bearing wall. The cut or slit 60 below the pad surface introduces additional flexibility such that under load the pad changes shape to form an airfoil for the introduction of lubricant. Thus, as a result of the beam on beam two point support, the pad acts as a spring like membrane.

An example of a bearing of the type shown in FIG. 8 used in a combined radial-thrust unit is described below in connection with FIGS. 43 and 43A.

FIG. 10A shows the deflected shape of the pad 40 under load. As shown in the drawings (exaggerated) the pad can be formed and supported so as to deflect to an airfoil shape under load. The airfoil dramatically improves performance. As is evident from the drawings, the pad is capable of displacement in the x, y, and z directions as well as rotation about the x, y, and z axes, that is, the pad has six degrees of freedom. Again, the structure allows optimal hydrodynamic wedge formation.

Referring to FIG. 9, there is shown the local inherent deflection of the face pad 50 where the pad flattens under load. These deflections are combined with the support structure deflection shown in FIGS. 3 and 10 but are of a lower magnitude. The net result is the shape shown in FIGS. 3 and 10 but with a face curvature that has been minutely flattened.

FIGS. 31 and 31A illustrate another example of a journal bearing in accordance with the present invention. The bearing construction illustrated in FIGS. 31 and 31A differs from the previously described journal bearing constructions in that the bearing is bidirectional, i.e., the bearing is capable of supporting a shaft for either clockwise or counterclockwise rotation as viewed in FIG. 31. The bearing is bidirectional because the pads are symmetrical about their center line, which are defined is the radial extending line passing thru the bearing major axis (606) and the geometric center of the pad. Like the previously described journal bearings, the bearing of FIGS. 31 and 31A is formed with a plurality of thin radial and circumferential slits to define a plurality of circumferentially spaced bearing pads 632.

The support structure for each of the bearings pads 632 is somewhat similar to the support structure for the journal bearing illustrated in FIG. 8. In particular, each bearing pad 632 is supported by a beam support structure at two pad support surfaces 632ps. The beam network connected to the bearing pads at each pad support surface 632ps is identical yielding the symmetrical construction of the bearing which makes the bearing bidirectional. For purposes of simplifying this description, only the network of beams which supports the bearing at one pad support surface will be described since the other pad support surface is supported in an identical fashion. Thus, as shown in FIG. 31, a first, generally radially extending, beam 640 is connected to the bearing pad 632 at the pad support surface 632ps. A second, generally circumferential, beam 642 is connected to the radially outermost end of beam 640. A third, generally radial, beam 644 extends radially inward from the beam 642. A fourth, generally circumferential, beam 646 extends from the radially innermost portion of the beam 644. A fifth, generally radial beam 648 extends radially outwardly from a beam 644 to the housing portion of the support structure. In summary, each bearing pad 632 and the bearing illustrated in FIG. 31 is supported by ten beams and the bearing housing. Further, as discussed below, by forming radially extending circumferentially spaced grooves or continuously extending circumferential grooves in the housing portion of the support structure, the housing portion of the support structure can be designed to act as a plurality of beams or membranes. It should also be noted that, like the bearing in FIG. 8, the cut or slit formed below the pad's surface introduces additional flexibility such that under load the pad changes shape to form an air foil for the introduction of lubricant. Thus, as a result of the beam on beam two point support, the pad acts like a spring-like membrane.

FIG. 31A is a radial cross-section of FIG. 31 showing the third beam 644, the bearing pad 632 and the housing.

Figure 31B:
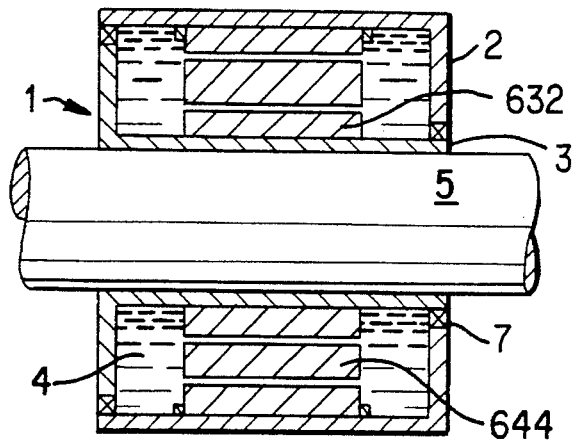
FIG. 31B is a cross-section of the bearing of FIG. 31 in a sealed housing assembly.

FIG. 31B illustrates a bearing of the type shown in FIGS. 31 and 31A in a sealed bearing unit. As shown therein, the outer periphery of the bearing is rotatably secured to the static housing portion 2. The bearing pads 632 are adapted to support a rotating surface of the rotating housing portion 3. The bearing is surrounded by hydrodynamic fluid 4 and seals 7 seal the static 2 and rotating 3 housing portions with respect to one another. As described above, the static housing portion 2 is secured to and functions as a portion of the static shaft housing and the rotatable housing portion 3 is secured to the shaft 5 and functions as an extension of the shaft 5. Thus when the shaft 5 rotates, the housing portion 3 rotates relative to the housing portion 2 and the bearing connected thereto. In this way, the bearing supports the rotating shaft through the rotating housing portion.

Figure 32C:
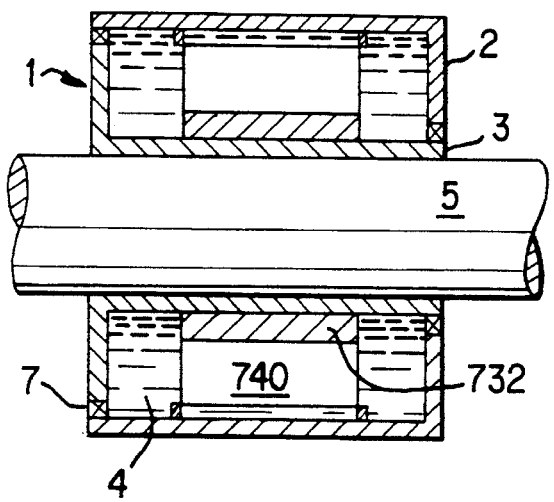
FIG. 32C is a cross-section of the bearing of FIG. 32 in a sealed housing assembly.
Figure 32B:
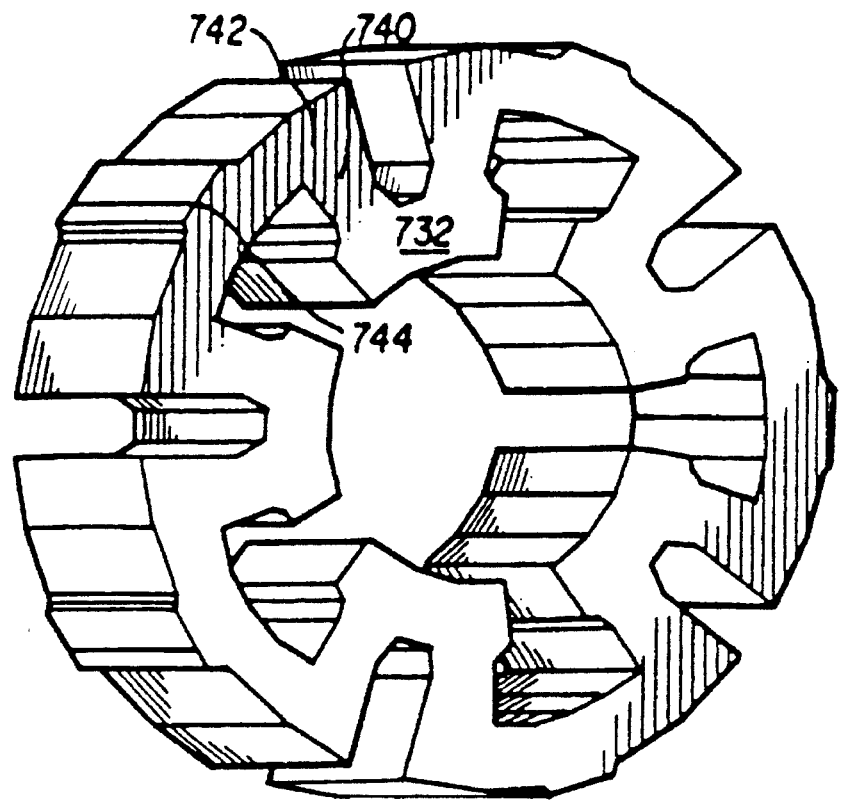
FIG. 32B is a perspective view of the bearing of FIG. 32.

FIGS. 32, 32A and 32B illustrate another journal bearing construction in accordance with the present invention. This bearing construction differs from the previously described bearing constructions in that the bearing pads and support structure are defined by relatively large grooves and openings formed in a cylindrical blank. Normally, this type of construction would be formed by milling the blank rather than electrical discharge machining or some other similar technique for farming small grooves as with the previously described embodiments. An advantage of the bearing construction illustrated in FIG. 32 is that in applications requiring extremely small bearings it is easier to form precisely the proportionately larger cuts and openings required to form a bearing of the type illustrated in FIGS. 32, 32A and 32B as compared to the proportionately smaller cuts and openings required by the construction of, for example, FIGS. I, and 8. Moreover, the large grooves or openings are generally easier to mold or extrude Bearings formed by larger cuts also find use in applications requiring extremely large bearings with stiff bearing pad support structures.

The bearing pads shown in FIG. 32 are symmetrical about their pad center line, 706A. Hence, the bearing is bidirectional. Moreover, as best shown in the perspective view of FIG. 32B the bearing has a continuous cross-section with no hidden openings. Hence, it is easily extrudable and easily moldable. Naturally, the support structure can be altered by providing discontinuities in the cross-section, e.g., by providing radially extending circumferential grooves or non-symmetrically disposed radially extending openings to alter the support structure and thereby alter the performance characteristics. The bearings major axis is 706.

As shown in FIG. 32, the bearing includes a plurality of circumferentially spaced bearing pads 732. Each bearing pad 732 is supported by a support structure which includes a pair of generally radial beams 740 connected to the bearing pad 732 at a pad support surface. A second, generally circumferentially extending, beam 742 supports each of the beams 740. Beams 742 are connected to the housing or support stubs 744 in a cantilever type fashion. In this bearing, the beams 740 can be regarded as a primary support structure; the beams 742 can be regarded as a secondary support structure; and the beams 744 can be regarded as a tertiary support structure.

The second beams 742 shown in FIG. 32 are defined by forming a plurality of axially extending circumferential grooves 750 in the housing of the support structure. In order to maintain the symmetry of the bidirectional bearing, these grooves are circumferentially space about pad center lines 706A in a manner identical to the circumferential spacing of the bearing pads 732. Naturally, similar circumferentially spaced radial grooves could be provided in any of the previous bearing constructions. For instance, as noted above, such grooves could be formed in the periphery of the bearing construction illustrated in FIGS. 31 and 31A to provide a further beam-like support.

FIG. 32A is a radial cross-section of a portion of the bearing illustrated in FIG. 32. In this cross-section, the bearing pad 732 and first beam 740 are visible.

FIG. 32B is a perspective view of the bearing of FIG. 32. It should be noted that although the peripheral, circumferential and cylindrical portions of the bearing are depicted in a somewhat segmented fashion to emphasize the curvature, these curved surfaces are in fact continuously curved.

FIG. 32C illustrates a bearing of the type shown in FIGS. 32, 32A and 32B in a sealed bearing unit. As shown therein, the support stubs 74 of the bearing are rotatably secured to the static housing portion 2. The bearing pads 732 are adapted to support a rotating surface of the rotating housing portion 3. The bearing is surrounded by hydrodynamic fluid 4 and seals 7 seal the static 2 and rotating 3 housing portions with respect to one another. As described above, the static housing portion 2 is secured to and functions as a portion of the static shaft housing, and the rotatable housing portion 3 is secured to the shaft 5 and functions as an extension of the shaft 5. Thus, when the shaft 5 rotates, the housing portion 3 rotates relative to the housing portion 2 and the bearing connected thereto.

Figure 33D:
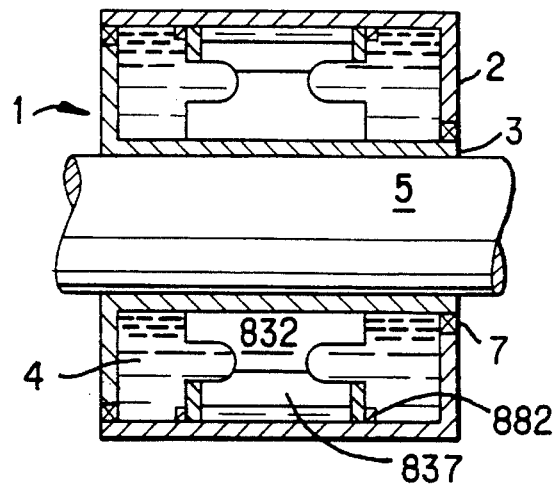
FIG. 33D is a cross-section of the bearing of FIG. 33 in a sealed housing assembly.
Figure 33:
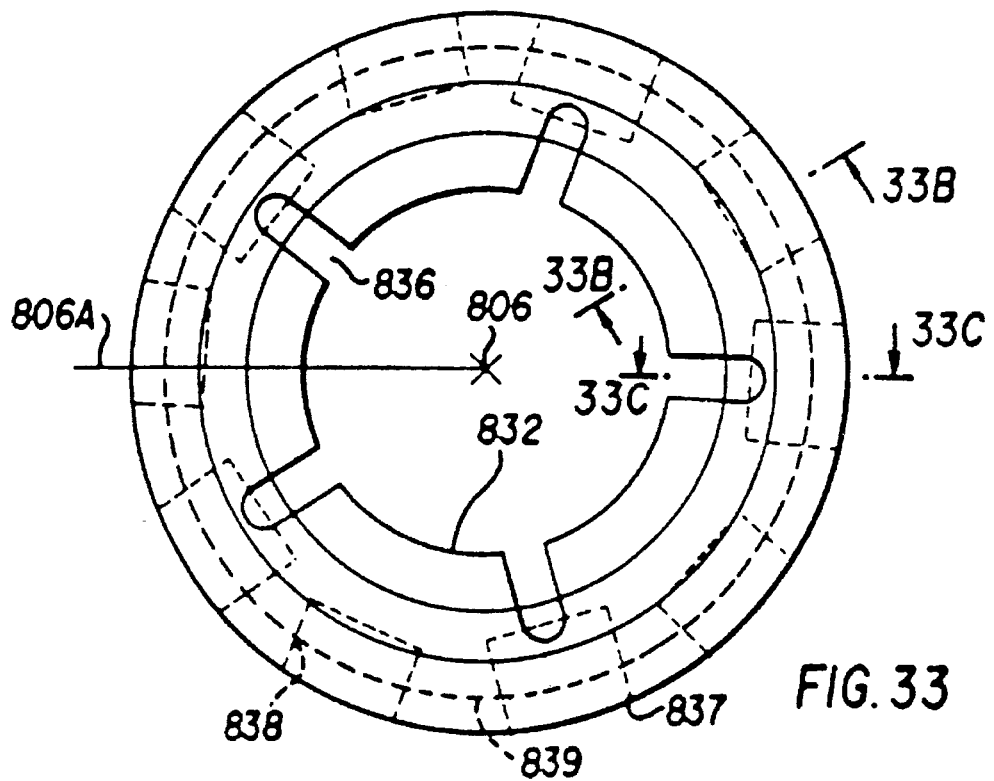
FIG. 33 is a side view of another journal bearing construction in accordance with the present invention.

FIG. 33 illustrates a journal bearing construction according to the present invention. Like the bearing of FIG. 32, the bearing of FIG. 33 is formed by proportionately large grooves and bores. In particular, a plurality of equally spaced radially extending circumferential grooves define a plurality of circumferentially spaced bearing pads 832. The bearing pads 032 are further defined by a pair of axially extending circumferential grooves which extend symmetrically from the planar faces of the cylindrical blank and are best seen in FIGS. 33B and 33G in which the grooves are indicated by the reference numerals 834 and 835. The bearing support structure is defined by the aforementioned structural features and by a plurality of Circumferentially spaced symmetrically disposed shallow bores 838 and a plurality of circumferentially spaced symmetrically disposed deep bores 837. Because of the presence of the "hidden" bores 837, 838, the bearing construction of FIG. 33 is not extrudable and not moldable in a simple two-piece mold, i.e., easily moldable.

Figure 33A:
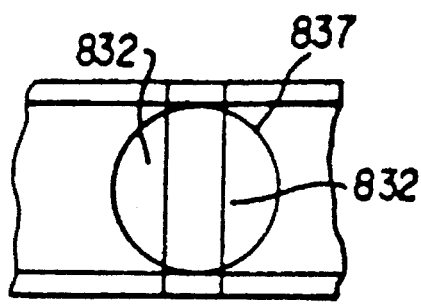
FIG. 33A is a detail view of a portion of the outer periphery of the bearing of FIG. 33.
Figure 33B:
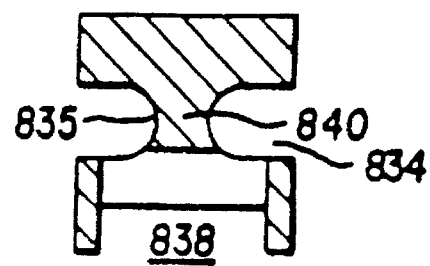
FIG. 33B is a cross-section of the bearing of FIG. 33.

As best shown in FIG. 33A, the deep bores 837 intersect the axial grooves 836 so as to define support structures for each bearing pad. The support structure is further defined by a circumferential groove 839 extending from the outer periphery of the cylindrical blank.

Figure 33C:
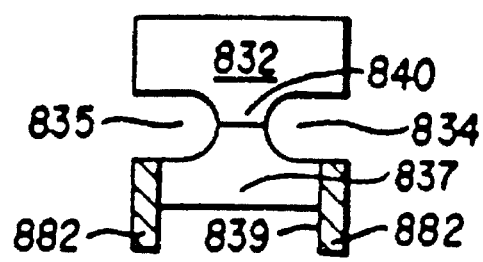
FIG. 33C is another cross section of the bearing of FIG. 33.

With reference to FIGS. 33–33C, it will be understood that the provision of the structural members as discussed above provides a support structure for the bearing pad 832 which includes a beam 840 directly supporting the pad, i.e. a primary support structure. Two continuous beams 882, i.e. a tertiary support structure and a secondary support structure comprising a plurality of beams defined in part by bores 837 and 838 connecting the beam 840 to the continuous beams 882.

Because the support structure of the bearing illustrated in FIGS. 33–33C is nonsymmetrical about the pad center line 806A extending from the major axis 806, it is unidirectional. Further, like the bearing of FIG. 32, this bearing is particularly well suited to applications requiring extremely small bearings since the proportionately larger grooves and bores which define this bearing and its support structure are more easily manufactured.

FIG. 33D illustrates a bearing of the type shown in FIGS. 33 and 33C in a sealed bearing unit. As shown therein, the continuous beams 882 of the bearing are secured to the static housing portion 2. The bearing pads 832 are adapted to support a rotating surface of the rotating housing portion 3. The bearing is surrounded by hydrodynamic fluid 4 and seals 7 seal the static 2 and rotating 3 housing portions with respect to one another. As described above, the static housing portion 2 is secured to and functions as a portion of the static shaft housing and the rotatable housing portion 3 is secured to the shaft 5 and functions as an extension of the shaft 5. Thus, when the shaft 5 rotates, the housing portion 3 rotates relative to the housing portion 2 and the bearing connected thereto. In this way, the shaft is supported for rotation by the bearing through the rotatable housing portion 3.

Figure 34:
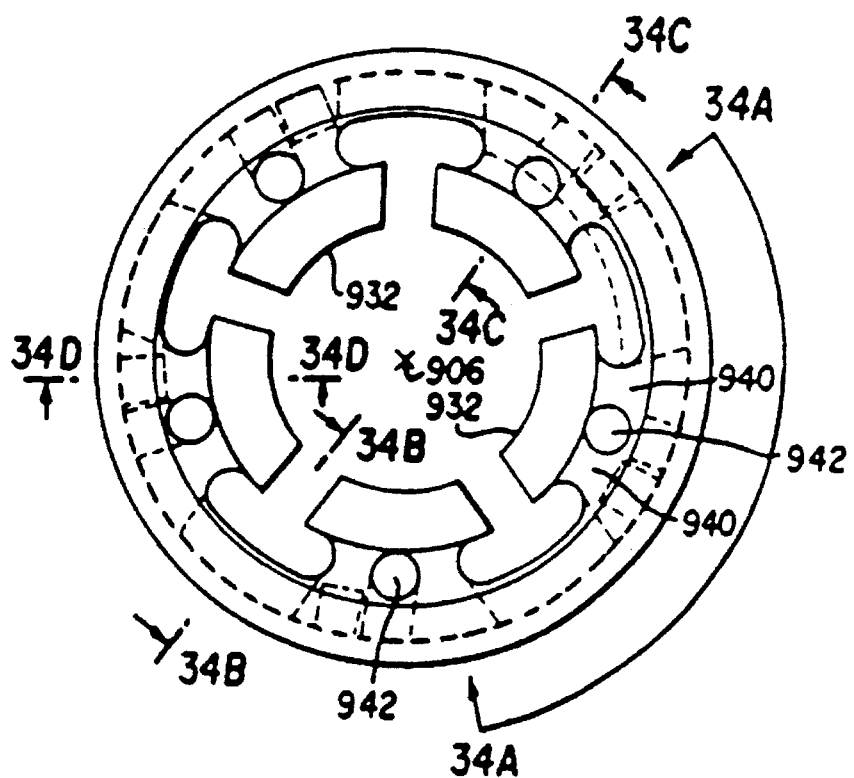
FIG. 34 is a side view of another journal bearing according to the present invention.
Figure 34A:
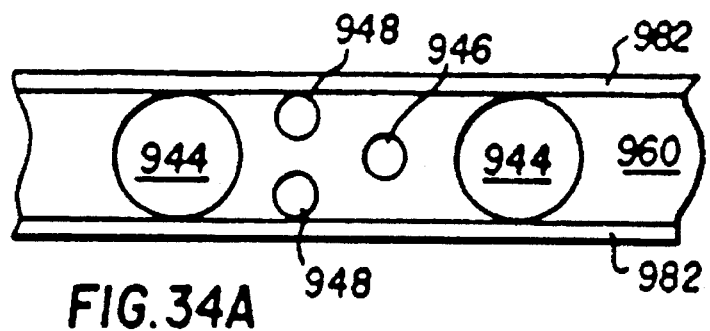
FIG. 34A is a detail view of a portion of the outer periphery of the bearing of FIG. 34.
Figure 34B:
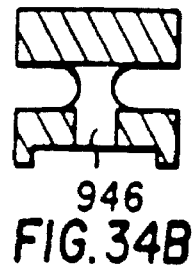
FIG. 34B is a cross-section of the bearing of FIG. 34.
Figure 34C:
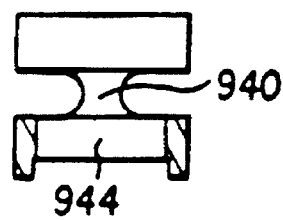
FIG. 34C is another cross-section of the bearing of FIG. 34.
Figure 34D:
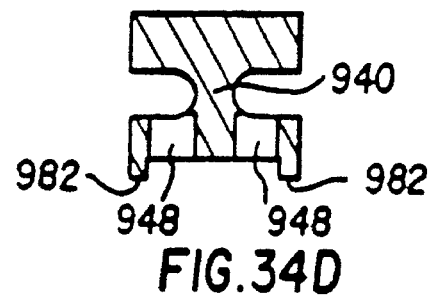
FIG. 34D is another cross-section of the bearing of FIG. 34.

FIGS. 34 and 34A–34D illustrate another journal bearing construction in accordance with the present invention. The bearing construction of FIG. 34 is similar to that of FIG. 33 insofar as the bearing pads and their support structures are defined by proportionately large grooves and bores as shown in the drawings. The support structure for the bearing pads 932 is like the support structure for the bearing pads 832. In particular, while the support structure for each of the bearing pads 932 is identical, the support structure is not symmetrical with respect to each bearing pad. Hence, the bearing Illustrated in FIG. 34 is unidirectional. Moreover, because the support structure includes "hidden" openings, the bearing is neither extrudable or moldable in a simple two-piece mold.

As shown in the drawings, the bearing support structure includes a primary support structure comprising a pair of beam-like members 940 which are connected to the bearing pads 932 and defined in part by symmetrically disposed openings 942. A shallow circumferential groove formed on the outer periphery of the bearing defines a tertiary support structure comprising a pair of continuous beam-like elements 982. A secondary support structure comprising a beam and membrane network 960 for connecting the beams 940 to the continuous beams 982 is defined by the provision of a plurality of large symmetrically disposed bores 944, the provision of smaller symmetrically disposed bores 946 and the provision of small non-symmetrically disposed bores 948. By virtue of the provision of the non-symmetrically disposed bores 948, the support structure is more flexible, and thus biased, in the direction of those bores.

Figure 16:
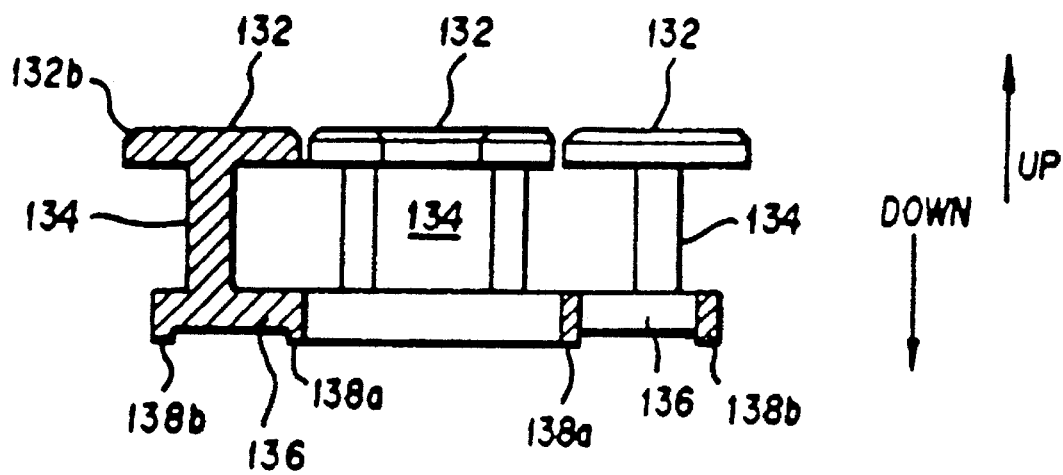
FIG. 16 is a side cross section of the thrust bearing of FIG. 15.
Figure 17:
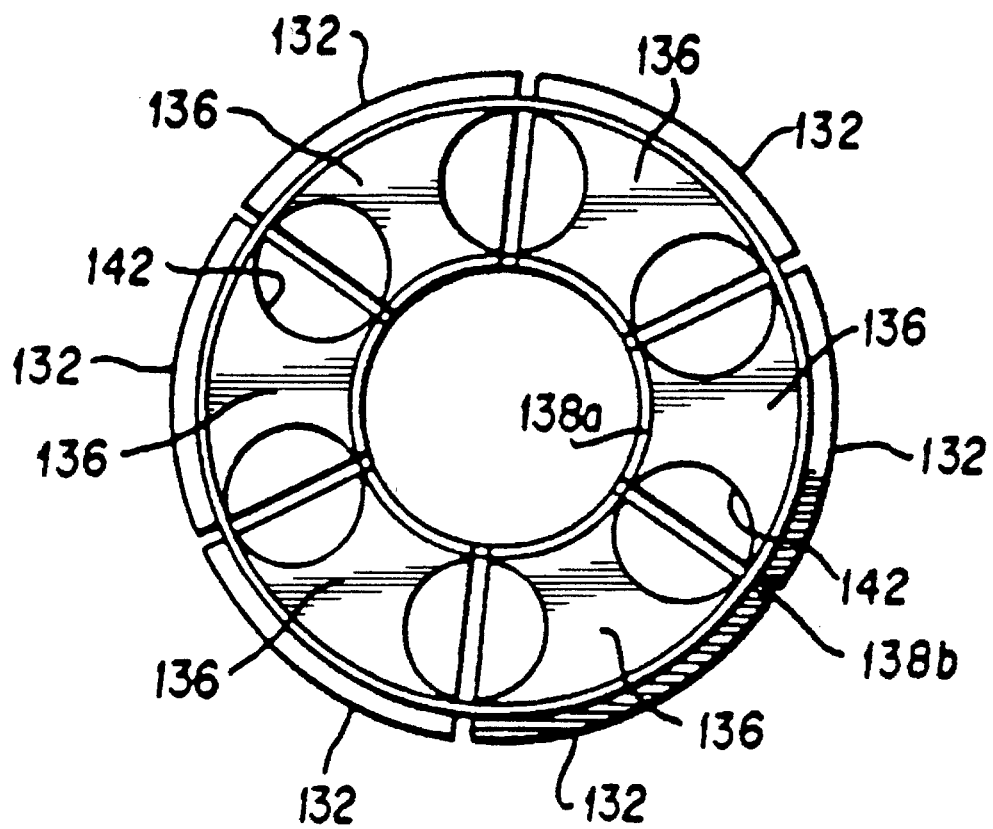
FIG. 17 is a bottom view of the thrust bearing of FIG. 15.
Figure 18:
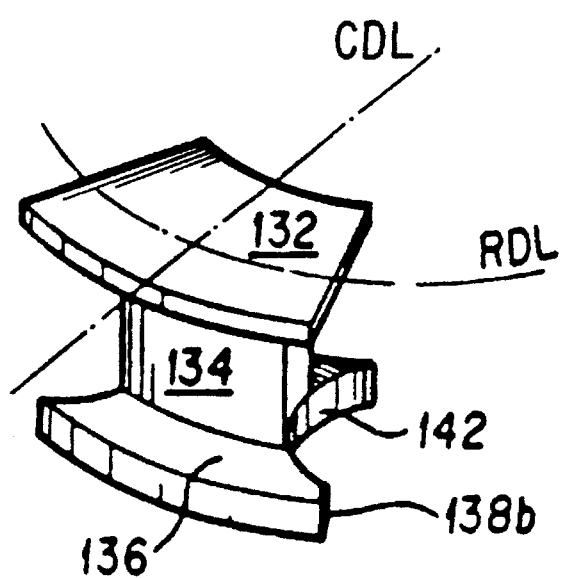
FIG. 18 is a perspective view of a portion of the thrust bearing of FIG. 15.

FIGS. 15–18 illustrate a unitary hydrodynamic thrust bearing in accordance with the present invention. As noted earlier, thrust bearings in accordance with the present invention incorporate some of the same features as journal bearings in accordance with the invention. For instance, like journal bearings, the thrust bearings of the present invention have a major axis defined as the central axis of the blank from which the bearing is formed. Also the bearing pads have a circumferential center line extending radially from the major axis through the geometric center of the pad. When the thrust bearing is symmetrical about its circumferential center line it is bidirectional; when the bearing is non-symmetrical about its circumferential center lines, it is unidirectional. However, by nature of their different function, the thrust bearings have a slightly different configuration. For example, the thrust bearing shown in FIGS. 15–18 includes a plurality of bearing pads 132 of substantially identical configuration. FIG. 18 shows the circumferential dividing line CDL and radial dividing line RDL of the bearing pad 132. The bearing pad surfaces of the bearing pads 132 lie in a plane which is essentially transverse to the axis of the shaft to be supported and the bearing's major axis. Of course, when the pad surfaces are deflected under load, or if it is desired that the bearing be skewed slightly so as to contact the shaft in the installed or static state, the surface of the bearing pads may be somewhat nonplanar and somewhat skewed with respect to the major axis or the axis of the shaft to be supported.

A particularly important consideration in the design of thrust bearings of the present invention is the prevention of fluid leakage. To a large extent this objective is achieved by designing the support structures such that under load the inner edge of the bearing pads deflect downward (as viewed in FIG. 16) and the outer edge deflects upwardly. All of the thrust bearings described herein are designed in this manner. For instance, in the bearing shown in FIG. 16, the beam 134 is connected to the pad 132 at a pad support surface 134*ps* which is closer to the outer edge of the bearing pad than it is to the inner edge of the bearing pad. Thus, the pad support surface 134*ps* is located radially outward of the radial dividing line RDL shown in FIG. 18. Hence, the bearing is designed such that, under load, the inner edge of the bearing deflects downward.

As noted above, the pad shape and/or deflection characteristics can be forcibly altered. For example, the piezoelectric elements can be used to forcibly alter the shape or deflection characteristics of the bearing. In the case of a thrust bearing, piezoelectric elements can be used to cause downward deflection of the bearing pads. If desired, a piezoelectric element support (not shown) could be provided within the support structure.

In operation, the downward deflection of the inner edge of the bearing pad corresponds to deflection away from the shaft supported and the upward deflection of the outer edge of the bearing pad corresponds to deflection toward the shaft. The deflected orientation of the bearing pad significantly inhibits the loss of fluid which otherwise occurs as a result of centrifugal forces acting on the fluid.

The loss of hydrodynamic fluid can be further reduced by supporting the bearing pad such that, under load, the bearing pad deforms to form a lubricant retaining pocket. Generally, such support is achieved when the bearing pad is supported by a plurality of radially or circumferentially spaced beams and the region between the beams is not directly supported such that the unsupported central region of the pad will tend to deform outwardly so as to form a fluid retaining channel. FIG. 29, which is discussed below, illustrates an example of a bearing having the requisite radially spaced beams therein. A greater pocket is obtained when beams are spaced further apart. In a similar manner, a channel can be formed in a journal bearing by providing axially or circumferentially spaced beam supports and an unsupported region between the beams. Also, piezoelectric elements or other separate means can be used to form or assist in forming fluid retaining pockets.

Figure 15:
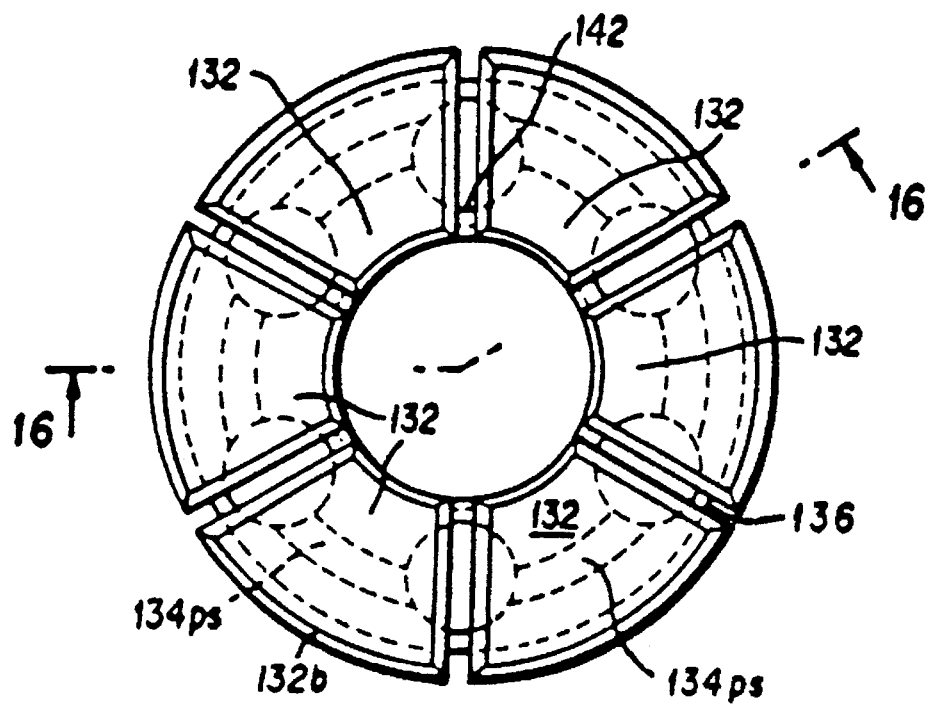
FIG. 15 is top view of a thrust bearing having beam mounted bearing pads.

As best shown in FIGS. 15 and 16, each bearing pad has a chamfer or bevelled edge 132*b* around its entire periphery. The purpose of the chamfer is reduce entrance and exit lubricant losses.

Each of the bearing pads 132 is supported by primary support portion, which in the illustrated embodiment comprise a beam-like support member 134 supporting the pad at a bearing pad support surface 134*ps*. Each beam 134 is in turn supported by a secondary support portion such as a beam supported beam or membrane 136. The beam or membrane 136 is in turn supported by a tertiary support member such as pair of beam-like legs 138*a*, 138*b*.

By providing holes or openings 142 in the beam or membrane portion 136, the continuous membrane 136 becomes a set of beams 136. Naturally, if holes or openings 142 are not provided in the membrane 136, the membrane functions as a continuous membrane Alternatively, the inner beam-like leg 138*a* could be replaced with short stub-like beams or even eliminated to define a tertiary support such that the secondary support is supported in a cantilever fashion. Finally, because the holes and openings are symmetrically disposed with respect to the major axis, the bearing is symmetrical about the major axis and is therefore bidirectional.

As shown in FIGS. 15, 17 and 18 the holes or openings 142 which divide the continuous membrane into separate beams are round. The use of round openings facilitates manufacture of the bearing prototype because circular openings can easily be drilled into the bearing material. This is true of all the bearings described herein. Once such circular openings are provided, it may also be advantageous to extend the openings past the beam or membrane member 136 to the lower portion of the bearing pads 132 so as to define the beam-like members 134. This is why in FIG. 15, the cross-section of the pad support surface 134ps and consequently the side walls of the beam 134 have an arcuate appearance.

Although the shape of the beam members may be dictated by manufacturing convenience, the shape also affects the performance of the individual bearings. Thus, although the specific shape of the bearings described herein, including the thrust bearing shown in FIGS. 15–18, is primarily attributable to the ease of manufacturing a prototype, it is also has been found to yield excellent results for a specific application. Any changes in the shape would, of course, influence the performance characteristics of the bearing by, for example, altering the bending or twisting characteristics of the beams which support the bearing pad. Thus, while other shapes of beams, pads and membranes are certainly contemplated, both the ease of manufacturing and the effect of the beam pad or membrane's shape on bearing performance must be considered.

Figure 15A:
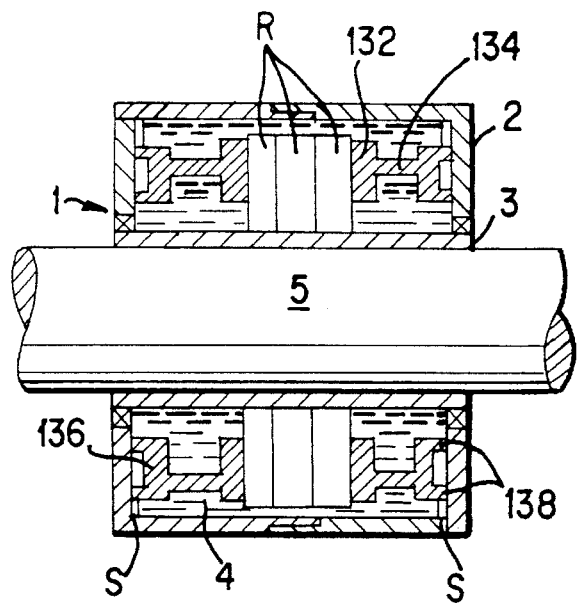
FIG. 15A is a cross section of two bearings of the type shown in FIG. 15 in a sealed housing assembly.

FIG. 15A illustrates two bearings of the type shown in FIGS. 15–18 in a sealed bearing unit. As shown therein, the beam like legs 138 of the bearings are secured to a static housing portion 2. The rotating housing portion 3 includes a thrust runner 3R formed integrally therewith or rotatably connected thereto by splines, threads or the like. The bearing pads are adapted to support opposite surfaces of the rotating thrust runner 3R of the housing portion 3. The bearings are surrounded by hydrodynamic fluid 4 and seals 7 seal the static 2 and rotating 3 housing portions with respect to one another. As described above, the static housing portion 2 is secured to and functions as a portion of the static shaft housing and the rotatable housing portion 3 is secured to the shaft 5 and functions as an extension of the shaft 5. Thus, when the shaft 5 rotates, the housing portion 3 rotates relative to the housing portion 2 and the bearings connected thereto. In this way, the bearings absorb thrust loads acting on the shaft through the shaft runner. Of course, it is possible to enclose a single thrust bearing within the housing, if thrust support in one direction is sufficient.

Examples of other thrust bearing shapes are shown in an FIGS. 21–30 and 38–39. The difference between these bearings and the bearing construction shown in FIGS. 15–18 primarily resides in different constructions of the primary support portion, the secondary support portion and the tertiary support portion.

Figure 21:
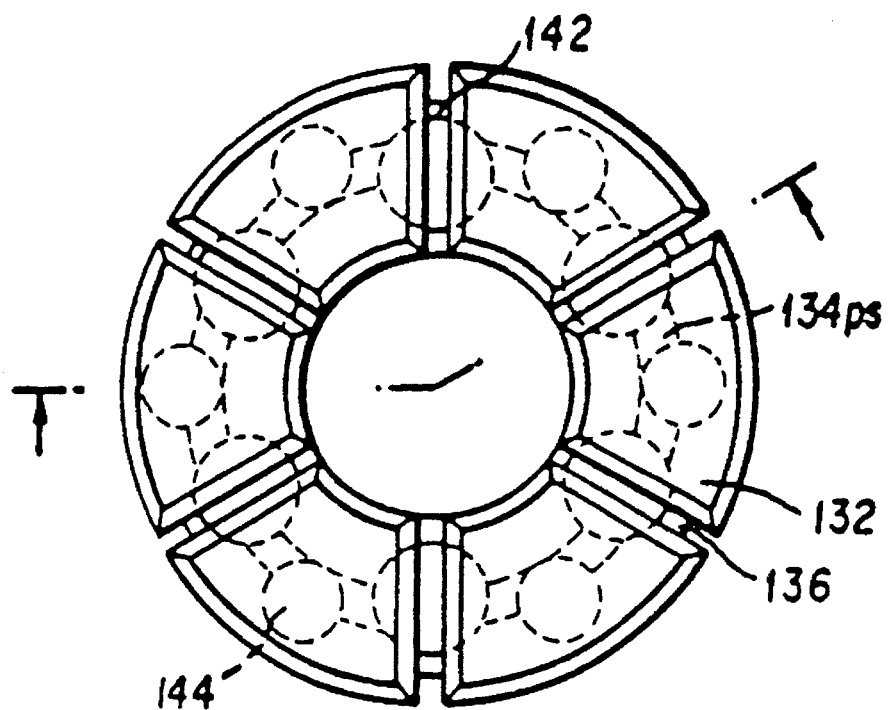
FIG. 21 is a top view of a thrust bearing according to the present invention having a two legged support.
Figure 22:
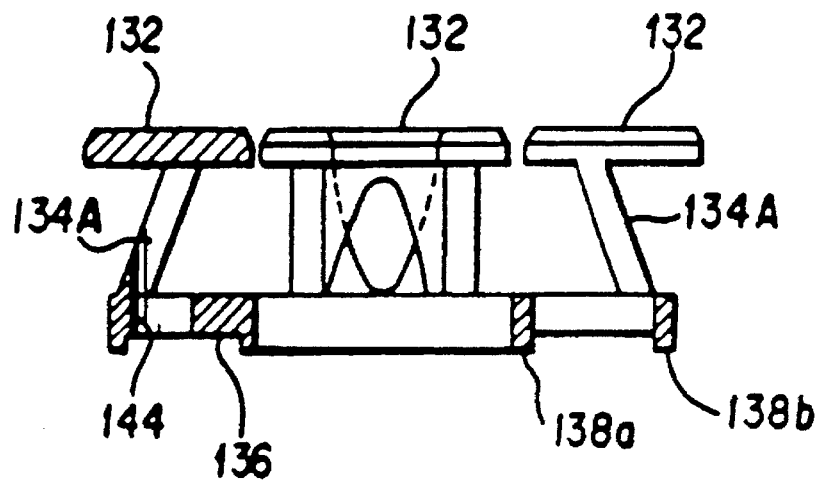
FIG. 22 is a side cross-section of the thrust bearing of FIG. 21.
Figure 23:
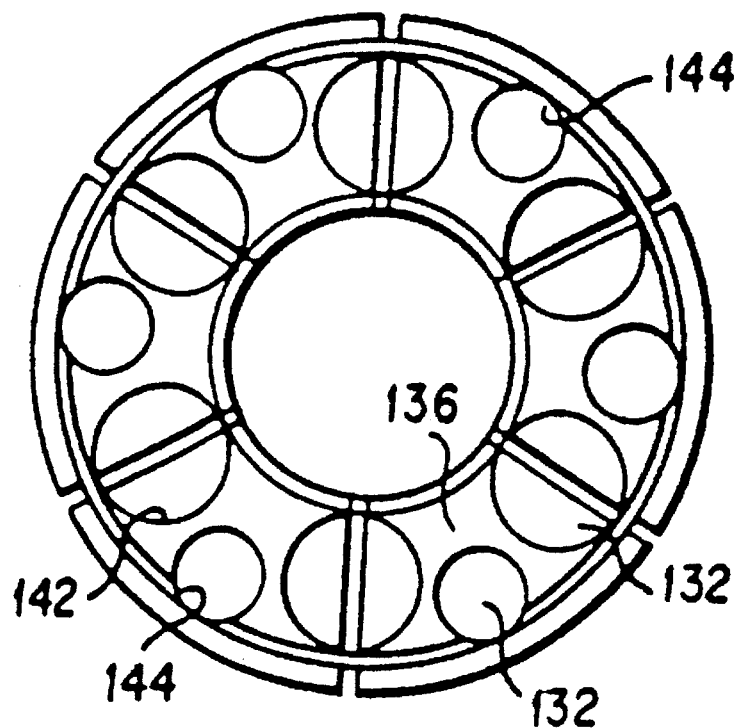
FIG. 23 is a bottom view of the bearing of FIG. 21.
Figure 24:
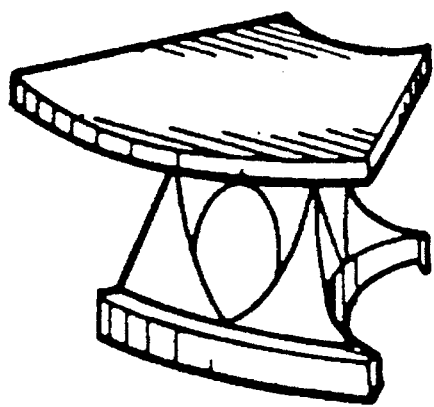
FIG. 24 is a perspective view of a segment of the bearing of FIG. 21.

One such other bearing shape is illustrated in FIGS. 21–24. A top view of the bearing is shown in FIG. 21; a cross-section of the bearing is shown in FIG. 22; a bottom view of the bearing is shown in FIG. 23 and a perspective view of the bearing is shown in FIG. 24. The bearing shown in FIGS. 21–24 is similar to the bearing of FIGS. 15–18 with two notable exceptions. First, the bearing of FIGS. 21–24 includes an angled or slanted support beam 134A rather than a vertical support beam as in FIG. 15. Second, the bearing includes additional holes 144 which extend through the support beam 136 to form a cylindrical opening through the slanted or angled beam 134 so as to form elliptical openings in the support beam. The elliptical openings divide the beam into a pair of complex ligaments, the shape of which can be appreciated with reference to the perspective view of FIG. 24. The provision of the openings 144 and consequent division of the slanted or angled beams 134A into complex ligaments significantly increases the flexibility of the support structure of the bearing shown in FIGS. 21–24 as compared to the bearings shown in FIGS. 15–18. Thus, the pads 132 of the bearing of FIGS. 21–24 deflect to form a hydrodynamic wedge in response to a lighter load than do the pads 132 of the bearing shown in FIGS. 15–18. It follows that the bearing shown in FIGS. 21–24 is more well suited for supporting light loads and the bearing shown in FIGS. 15–18 is more well suited for carrying heavier loads. Further, the provision of angled or slanted support beams such as beam 134A, with or without openings to divide the beam into complex ligaments, increases the flexibility of the pad in the vertical direction since a vertically applied load creates a moment which tends to cause the beam to deflect toward the center or inner diameter of the bearing and thereby eliminate centrifugal leakage of the lubricating fluid.

Figure 23A:
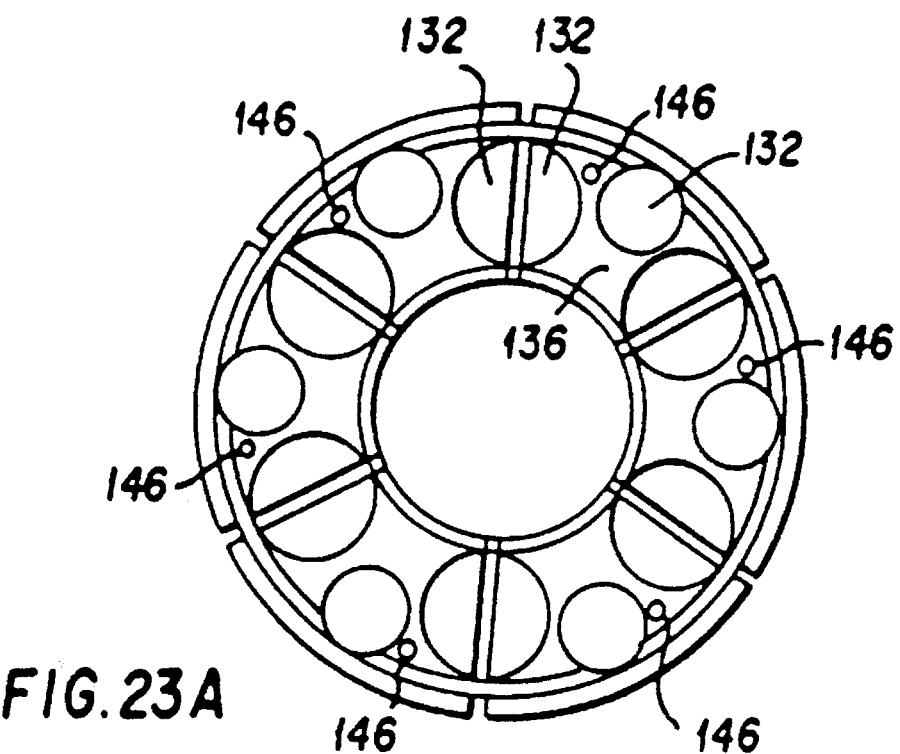
FIG. 23(A) is a bottom view of a modified version of the bearing of FIG. 21.

FIG. 23A shows a bottom view of a bearing of the type shown in FIGS. 21–24 in which additional holes 146 are formed in the membrane or support beam 136 to enhance the flexibility of the beam or membrane 136 even further. As illustrated in FIG. 23A, the holes 146 are formed nonsymmetrically with respect to each bearing segment. The provision of these holes in such a nonsymmetrical fashion results in a bearing in which the pads tend to deflect more easily in one direction than in the other direction. In other words, the bearing pads are biased in one direction by the provision of nonsymmetrical openings in the support structure. Naturally, such nonsymmetrically disposed openings can be provided in any of the bearing constructions of the present invention in which it is desired to bias the bearing pads in one direction. It may even be desirable to provide the nonsymmetrically disposed openings or holes such that only selected ones of the bearing pads are biased.

FIG. 25 is a cross-sectional view of another bearing according to the present invention. In accordance with this construction, the bearing pad 132 is supported on a pad support stub 134S which is in turn supported on a horizontally oriented beam portion 134H which is in turn supported on an inversely angled beam portion 134I. In other respects, the construction is similar to that of the previously described bearings. By virtue of this construction, the bearing has a great deal of flexibility in one direction but it is extremely rigid in the opposite direction. A piezoelectric element 100 may be located between the horizontal beam portion and the pad as shown.

Figure 26A:
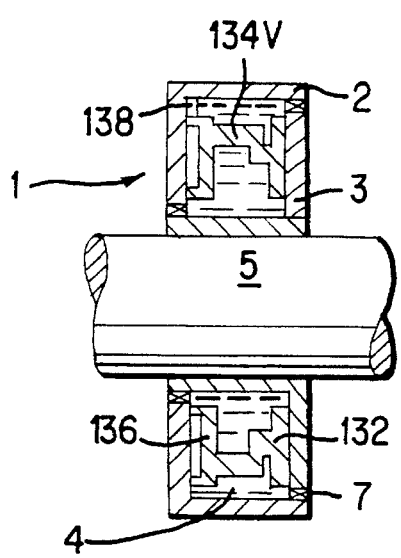
FIG. 26A is a cross-section of the bearing of FIG. 26 in a sealed housing assembly.
Figure 26:
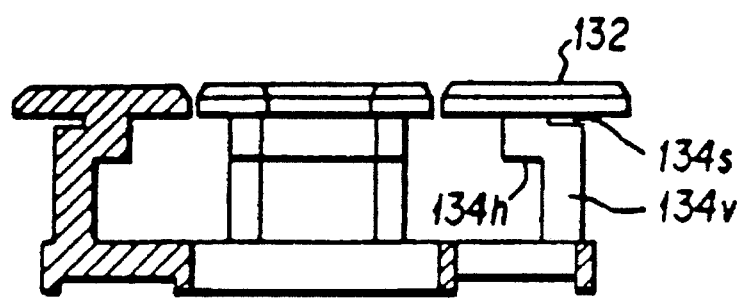
FIG. 26 is a cross-section of another bearing according to the present invention.

A similar construction is illustrated in FIG. 26. The difference between the bearing illustrated in FIG. 26 and the bearing illustrated in FIG. 25 is that the bearing illustrated in FIG. 26 uses a vertical beam portion 134V rather than an inversely angled beam portion 134I. The bearings are similar in all other respects. The absence of an angled beam in the bearing of FIG. 26 tends to give the bearing more rigidity in the vertical direction.

FIG. 26A illustrates a bearing of the type shown in FIG. 26 in a sealed bearing unit. As shown therein, the circumferential legs or beams of the bearing are secured to a static housing portion 2. The bearing pads are adapted to support a rotating surface of the rotating housing portion 3. The bearing is surrounded by hydrodynamic fluid 4 and seals 7 seal the static 2 and rotating 3 housing portions with respect to one another. As described above, the static housing portion 2 is secured to and functions as a portion of the static shaft housing and the rotatable housing portion 3 is secured to the shaft 5 and functions as an extension of the shaft 5. Thus, when the shaft 5 rotates, the housing portion 3 rotates relative to the housing portion 2 and the bearing connected thereto. In this way, the bearing provides thrust support for the shaft through the rotating housing portion 3.

Figure 27:
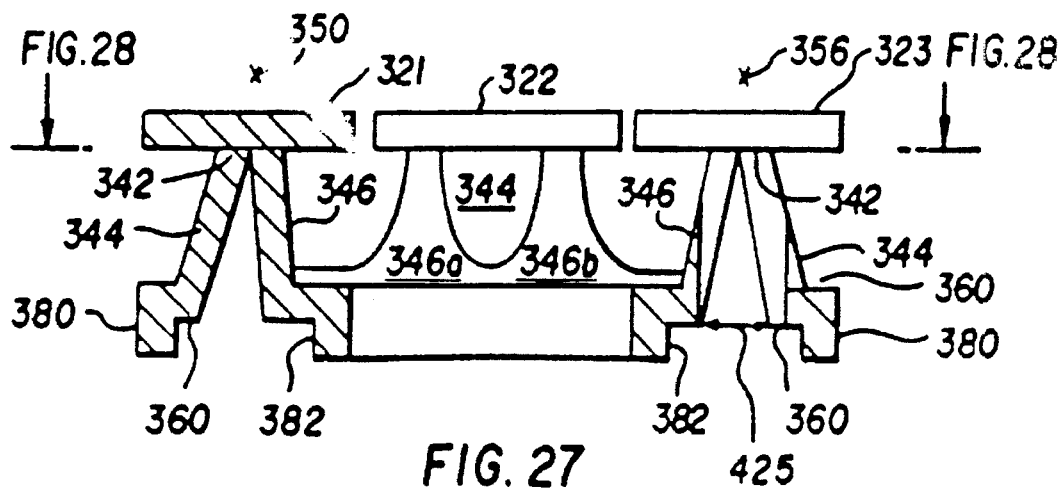
FIG. 27 is a side cross-section of another bearing construction according to the present invention.
Figure 28:
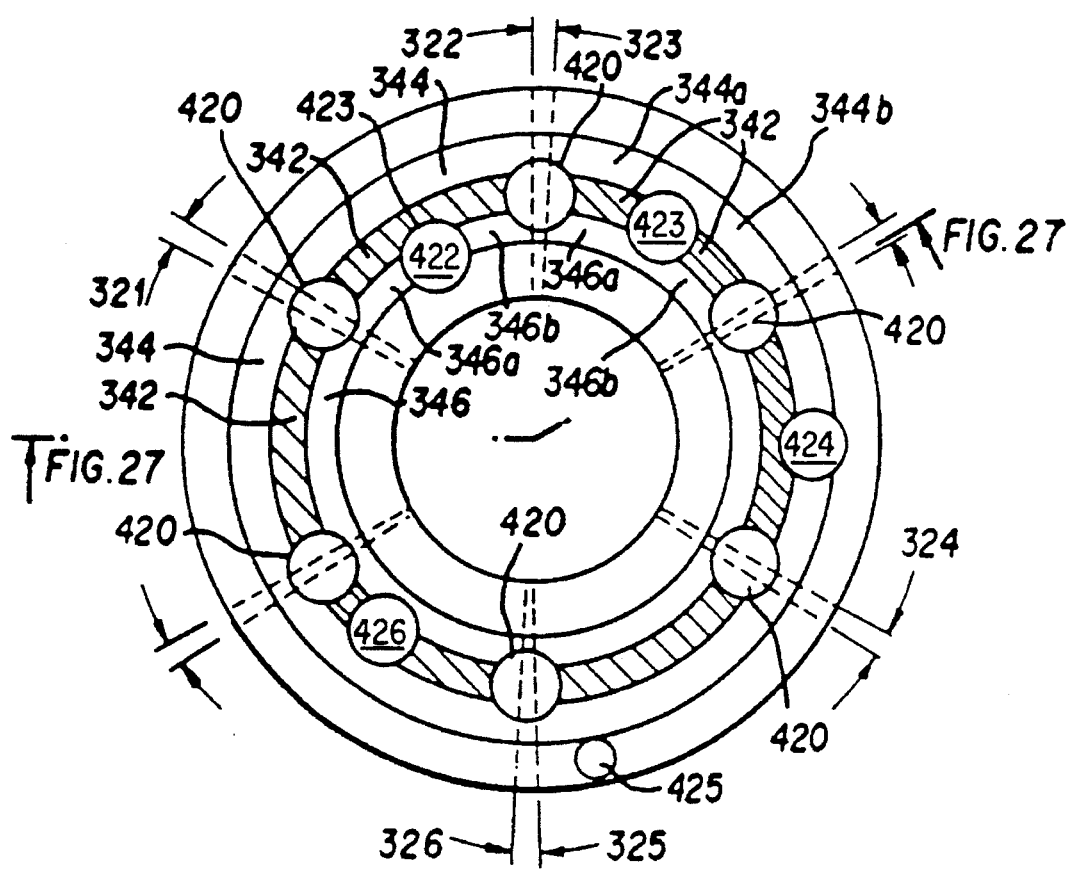
FIG. 28 is a top cross-section of the bearing construction of FIG. 27.

FIGS. 27–28 illustrate another embodiment of the bearing construction of the present invention.

As shown in the drawings, this bearing includes a plurality of bearing pads 321–326 (shown in phantom in FIG. 28). Each of the bearing pads 321–326 are supported on a pad support surface 342 of a bearing support structure. The bearing support structure includes a primary support portion composed of a pair of nested frustums supported on a secondary support portion which includes a split peripheral membrane 360 which is supported on a tertiary support portion which includes a pair of peripheral beams 382. The peripheral beams 380 and 382 are similar to those of the previously described constructions. The membrane 360 differs from the membrane in previously described constructions since the membrane 360 is radially split by the groove formed in the bottom of the bearing support structure which forms the nested frustums. The inner frustum is inverted with respect to the outer frustum such that the mean center lines of the frustums merge at a point 350 above the pad support surface 342 and have a cross-section which appears similar to an inverted V. Since the center lines of the frustums intersect at point 350 above the pad surface, the primary support structure supports the bearing pad for pivoting about a point above the pad surface. This ensures proper deflection.

The beams 346 and 344 which support the bearing pad can be angled toward one another at the same angle, angled toward one another at different angles, one beam angled and one beam not angled, and angled in the same direction. Of course, variations in the degree of angling of the beams in the primary support structure impacts the deflection characteristics of the bearing.

A plurality of holes or openings 420 disposed symmetrically about the bearing support structure divide the nested frustum or inverted V structure into a plurality of support beams 344, 346 and divide the apex of the nested frustums so as to define the pad support surfaces 342. Thus, for example, the bearing pad 321 is supported on a pad support surface 342 by a pair of complex support beams 344 and 346 which are tapered toward one another and have a complex geometrical configuration defined by the cylindrical extending openings passing through the nested frustum section. As best shown in FIG. 27, the center lines of the beams 344 and 346 intersect at a point 350 above the pad surface to ensure proper pivoting support. The individual beams 344 and 346 are supported on a peripheral membrane 360 which is split by the groove which defines the frustums. The membrane is supported by peripheral beams 380, 382. As discussed above, the peripheral beams 380, 382 and the peripheral membrane 360 can be circumferentially split to define individual beam supports.

Numerous modifications to the bearing support structure are possible. For example, deflection of the support structure can be modified by changing the angle of the beams, changing the location of the holes or openings which define the legs, varying the length of any of the beams or membranes, and changing the width or thickness of any of the beams or membranes. In order to illustrate a number of these possibilities, FIGS. 27 and 28 depict a different support structure for each of the bearing pads 321–326. It should be understood that these various support structures are shown in a single bearing for purposes of illustrating the present invention. In normal use, each of the bearing pads 321–326 would have a similar, though not necessarily identical, support structure to assure uniform performance.

The support structure for bearing pad 322 differs from that of bearing pad 321 by virtue of the provision of a hole or opening 422 which extends through the beam 346 so as to divide the beam 346 into a plurality of beams or sub-beams 346(*a*) and 346(*b*). If, like the opening 422, the diameter and positioning of the opening is such that the beam is completely separated, the beam is divided into separate beams. On the other hand, if the opening only partially separates the beam (e.g. opening 423) the beam is divided into sub-beams. As shown in FIG. 27, the opening 422 forms an elliptical opening in the side of the beam 346 such that as viewed in FIG. 27, radially outer beam 344 is visible. By virtue of this construction, the pad 322 is supported by three angled ligaments or beams, 344, 346(A) and 346(B).

Bearing pad 323 is supported by four angled beams or ligaments 344(*a*), 344(*b*), 346(*a*) and 346(*b*). This structure is achieved by providing a hole or opening 423 which extends through both beam 344 and beam 346 and divides the pad support surface 342 into two sections.

It should be noted that with respect to all of the modifications discussed herein, the size of the openings should be selected based upon the degree to which the beams 344 and 346 are to be divided into-separate beams. In some instances, it may be desirable to completely separate the beam sections in which case a larger opening would be used. In other instances, such as that illustrated with respect to the support of bearing pad 323, it is desirable to subdivide the beam at some point along the sidewall of the beam. It should also be noted that although the drawings only show the provision of one opening for bearing pad support structure to divide the beams 344 and 346. It is possible that two or more openings similar to that of the openings 422–426 shown in FIG. 28 could be provided so as to divide the beams 344, 346 into three or more beams or sub-beams. As always, a determination of the type of support to be employed depends on the desired performance characteristics. Generally, dividing the beams into separate beams or sub-beams makes the support structure more flexible. By making the support structure more flexible in one direction as with the support structure for bearing pads 322, 324 and 326 the bearing pads are biased in a predetermined direction.

The support structure for bearing pad 324 is similar to that for bearing pad 322 except that the opening 424 extends through the outer support beam 344 rather than the inner support beam 346. Thus, like the bearing pad 322, the bearing pad 324 is supported by three angled legs.

The support structure for bearing pad 325 is similar to that for bearing pad 321 except that an opening 425 is provided through the outer peripheral beam 380 and peripheral membrane 360 in a nonsymmetrical position. Thus, the bearing pad 325 is biased in a predetermined direction, i.e., the direction of greatest flexibility caused by the provision of the opening 425.

The support structure for the bearing pad 326 is similar to that of bearing pad 322 except that the opening 426 which divides the beam 346 is provided in a nonsymmetrical fashion so as to bias a bearing pad 326 in the direction of greater flexibility, i.e., the direction of the smaller, more flexible beam.

Naturally, any combination of the support structures illustrated in FIGS. 27, 28 could be employed to achieve desired performance characteristics.

Figure 29C:
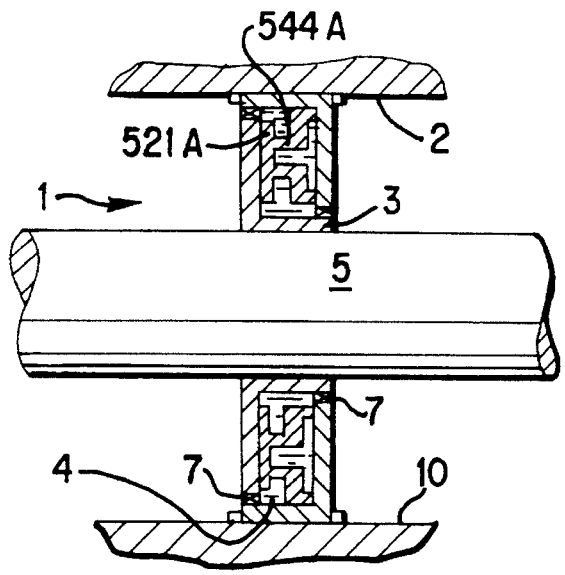
FIG. 29C is a cross-section of the bearing of FIG. 29A in a sealed housing assembly.
Figure 29:
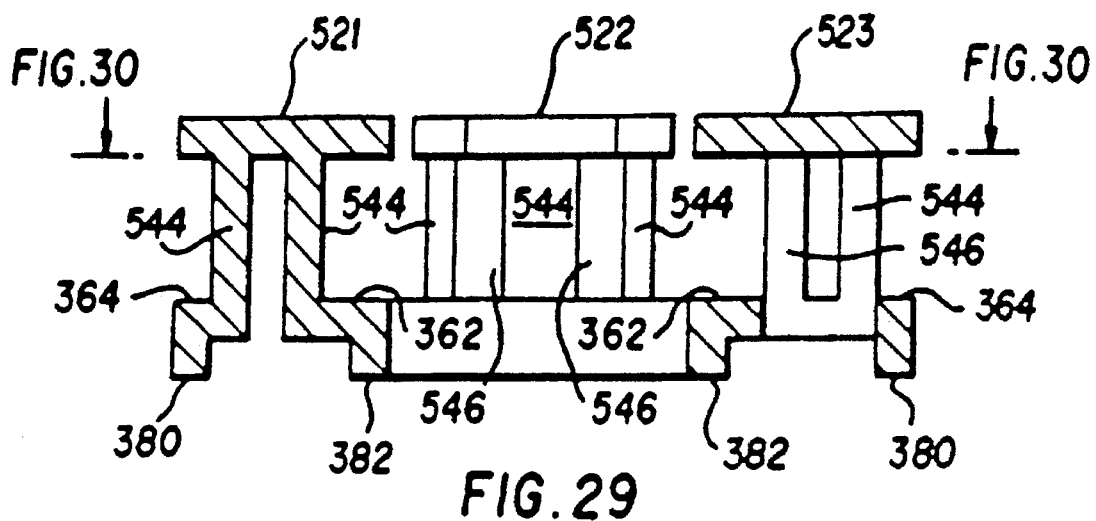
FIG. 29 is a side cross-section of another bearing construction according to the present invention.
Figure 30:
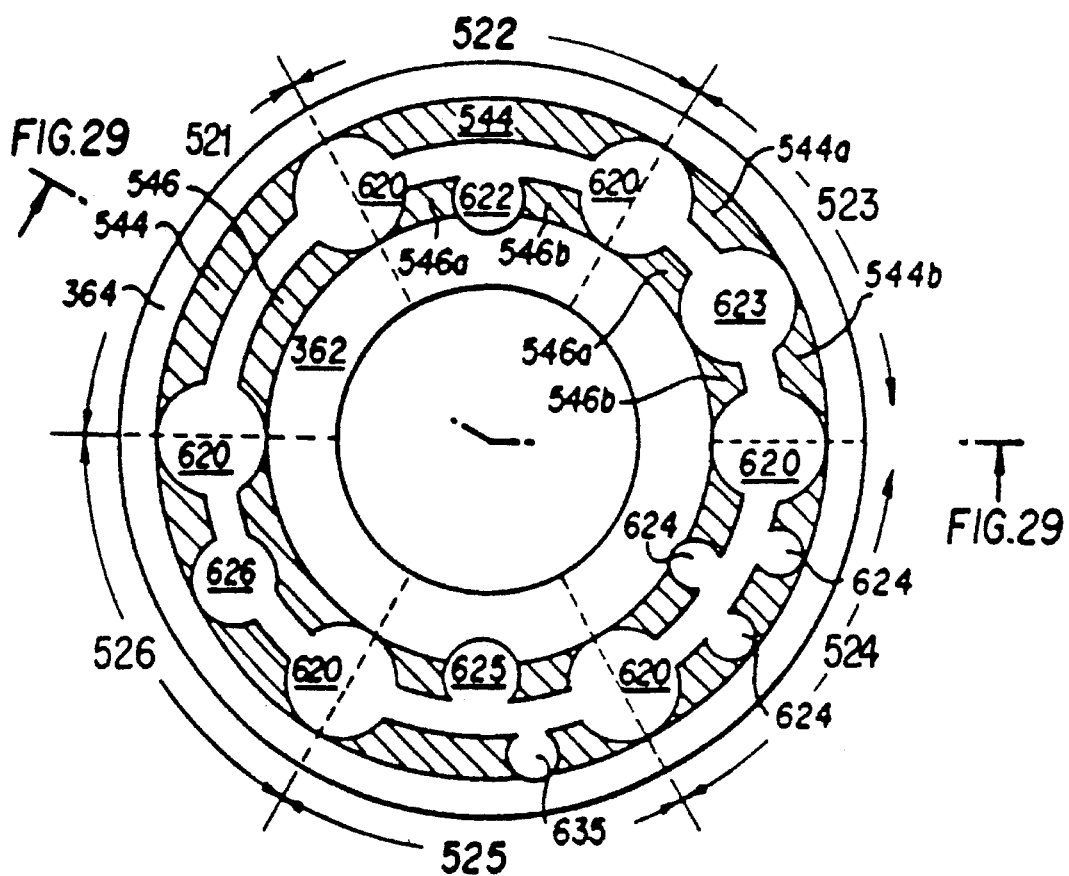
FIG. 30 is a top cross-section of the bearing construction of FIG. 29.

FIGS. 29–30 illustrates another embodiment of the bearing of the present invention. As shown in the drawings, this bearing includes a plurality of bearing pads 521–526 (location shown in phantom in FIG. 30). Each of the bearing pads 521–526 are unitary with, and supported on, a bearing pad support structure. Generally, the bearing pad support structure includes at least a primary support structure including an inner circumferential support beam 546 and an outer circumferential support beam 544, a secondary support portion including an inner peripheral membrane 362 and a tertiary support portion including an outer peripheral membrane 364 and an inner peripheral support beam 382 and an outer peripheral support beam 380. As best shown in FIG. 29, the circumferential support beams 544, 546 are defined in part by a deep circumferential channel extending from the bottom of the bearing to the bearing pad. The support beams are further defined by a plurality of holes or openings 620 disposed symmetrically about the bearing pad support structure which separate the beams 544, 546 from adjacent beams. Thus, for example, the bearing pad 521 is supported on a pair of beams 544 and 546 which beams have generally arcuate side walls. As mentioned earlier, the beam support structure also includes membranes 364, 362 and peripheral beams 380, 382.

Numerous modifications to the bearing support structure are possible. In order to illustrate a number of these possibilities, FIGS. 29 and 30 depict a different support structure for each of the bearing pads 521–526. As with the previously described embodiment of FIGS. 27–28, these various support structures are shown in a single bearing for the purpose of illustrating the present invention. In normal use, each of bearing pads 521–526 would have a similar, though not necessarily identical, support structure to assure uniform performance.

The support structure for bearing pad 522 differs from that of bearing pad 521 by virtue of the provision of a hole or opening 622 which extends through the inner circumferential beam 546 so as to divide the beam 546 into a plurality of beams 546a and 546b. By virtue of this construction, the pad 522 is supported by three vertically extending beams or ligaments 544, 546a and 546b.

The bearing pad 523 is supported by four vertically extending beams or ligaments 544a, 544b 546a and 546b. This structure is achieved by providing a hole or opening 623 which extends through both beam 544 and beam 546. The thinner beams which result from this modification would naturally have greater flexibility than the support structure for bearing pads 522 and 521.

The bearing pad 524 is supported by five relatively thin vertically extending beams or ligaments. This structure is achieved by providing a hole or opening 624 to divide the inner beam 546 into two beams and providing two holes 624 to divide the outer beam 544 into three beams.

The support structure for bearing pad 525 is similar to that for bearing pad 522 except that an additional opening 635 nonsymmetrically divides the outer beam 544 into two beams. By virtue of the non-symmetrical division of the outer beam 544, the bearing pad is biased in the direction of greater flexibility.

The support structure for bearing pad 526 is similar to that for bearing pad 522 except that the outer beam 544 is split rather than the inner beam 546. Further, the opening 626 is somewhat larger than the opening 622 such that a groove is formed on the outer periphery of the inner beam 546 so as to make the inner beam 546 somewhat more flexible.

Naturally, any combination of the support structures illustrated in FIGS. 29, 30 could be employed to achieve desired performance characteristics.

FIGS. 29A, 29B, 30A and 30B illustrate in detail a thrust bearing in which each of the bearing pads 521A of the support structure are very similar to that used to support bearing pad 521 in FIGS. 29 and 30. The bearing construction is different, however, insofar as the beams 544A and 546A are circumferentially narrower and vertically shorter than their counterparts in the bearing illustrated in FIGS. 29 and 30. Naturally, shorter beams are more rigid than the comparatively longer beams and narrow beams are less rigid than comparatively wider beams. Moreover, the beam 544A is radially narrower than the beam 546A; whereas in the bearing illustrated in FIGS. 29 and 30, the beams 544 and 546 have equal widths. The difference in radial thickness is compensated for since the large opening 620 which defines the circumferential extent of the beams 544A and 546A is arranged such that beam 544A is significantly wider in the circumferential direction than is beam 546A. Finally, it should be noted that the openings 620 are significantly larger than the corresponding openings 620 in the bearing construction of FIGS. 29 and 30. Naturally, the larger openings increases the flexibility of the support structure defined thereby.

FIG. 29C illustrates a bearing of the type shown in FIGS. 29A and 29B in a sealed bearing unit. As shown therein, the legs 380A, 382A of the bearing are secured to a static housing portion 2. The bearing pads 321A are adapted to support a rotating surface of the rotating housing portion 3. The bearing is surrounded by hydrodynamic fluid 4 and seals 7 seal the static 2 and rotating 3 housing portions with respect to one another. As described above, the static housing portion 2 is secured to and functions as a portion of the static shaft housing 10 and the rotatable housing portion 3 is secured to the shaft 5 and functions as an extension of the shaft 5. Thus, when the shaft 5 rotates, the housing portion 3 rotates relative to the housing portion 2 and the bearing connected thereto. In this way, the thrust of the shaft is supported by the bearing through the rotatable housing portion.

Figure 35:
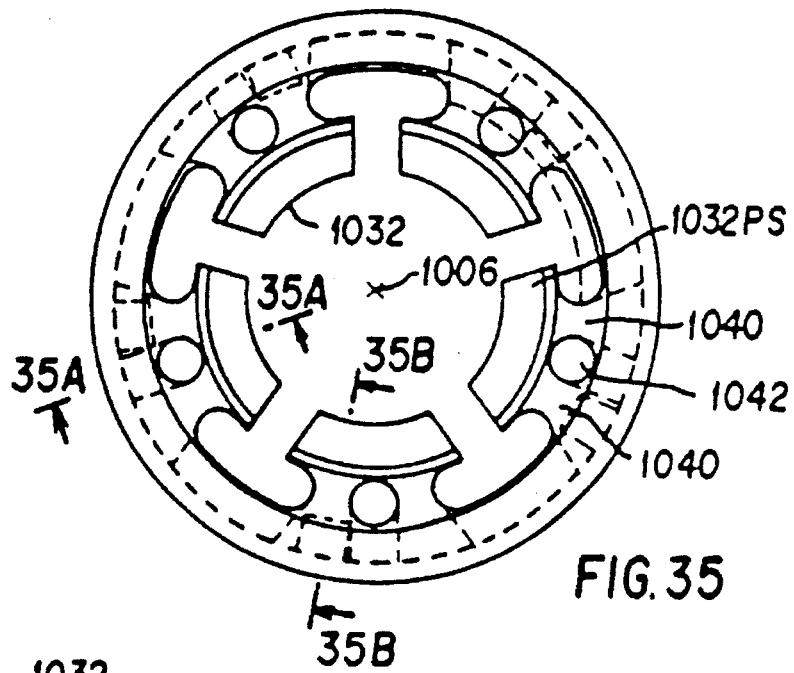
FIG. 35 is a side view of a combined radial and thrust bearing according to the present invention.
Figure 35A:
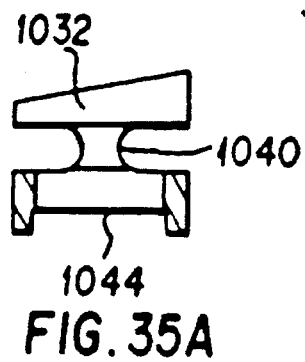
FIG. 35A is a cross-section of the bearing of FIG. 35.
Figure 35B:
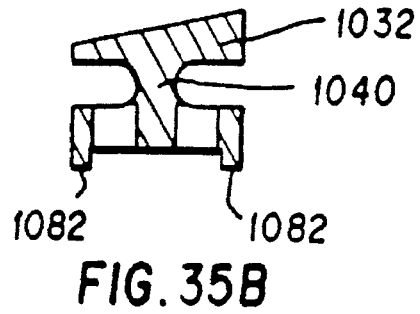
FIG. 35B is another cross-section of the bearing of FIG. 35.
Figure 36:
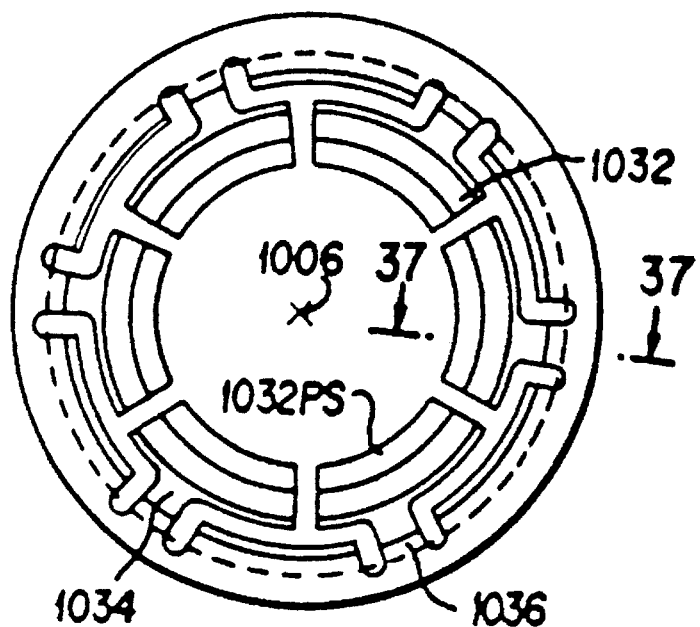
FIG. 36 is a side view of another combined radial and thrust bearing according to the present invention.

FIGS. 35–37 illustrates a combined thrust and radial hydrodynamic bearing in accordance with the present invention. The bearing illustrated in FIG. 35 is quite similar to the bearing illustrated in FIG. 34 and similar numerals are used to designate similar structure. Similarly, as viewed in the cross-section in FIG. 37, the bearing of FIGS. 36–37 is somewhat similar to the radial bearings illustrated in FIGS. 4 and 14P except that the bearing pad 1032 and the bearing pad support structure, which includes beams and/or membranes 1034, 1036 and 1038, are defined by proportionately larger slits and grooves. However, the radial-thrust bearings differ from radial-only bearings in that the bearing pad surface 1032ps is angled with respect to the major axis 1006. By virtue of its angled pad surface, the bearings of FIGS. 3537 support loads acting both along the major axis 1006 and radially from the axis 1006. A piezoelectric element 100 may be provided as shown to allow selective adjustments of the deflection characteristics of the bearing.

In order to be supported by the angled pad support face 1032ps, the shaft must be fitted with a runner which is angled at a angle complementary to the angle of 2 the pad support face. The portion of the axial load the bearing and the portion of the radial load taken by the bearing depends on the angle of the pad surface 1032ps. If the pad is angled at an angle $\propto$ with respect to the major axis 1006, the axial load applied to the bearing can be determined by the following equation:

Applied Axial Load=Total Axial Load (Sin$\propto$).

Similarly, the radial load applied to the bearing can be determined by the following equation:

Applied Radial Load=Total Radial Load (Cos$\propto$).

The support structure for the bearing shown in FIG. 35 is similar to the support structure for the bearing shown in FIG. 34.

The support structure for the bearing illustrated in FIGS. 36 and 37 includes a primary support structure for the spaced bearing pads 1032 having a beam 1034 which supports the bearing pad 1032, a tertiary support structure which comprises a pair of circumferential beams 1038 which may be continuous. The secondary support structure comprises a membrane 1036 or a network of beams 1036 for connecting beam 1034 to the beams 1038. As shown most clearly in FIG. 36, the support structure for each of the plurality of bearing pads 1032 is nonsymmetrical. Accordingly, the bearing illustrated in FIGS. 36 and 37 is unidirectional.

FIG. 37A illustrates a bearing of the type shown in FIG. 37 in a sealed bearing unit. As shown therein, the legs 1038 of the bearing are secured to a static housing portion 2. The bearing pads 1032 are adapted to support an inclined rotating surface of the rotating housing portion 3. The bearing is surrounded by hydrodynamic fluid 4 and seals 7 seal the static 2 and rotating 3 housing portions with respect to one another. As described above, the static housing portion 2 is secured to and functions as a portion of the static shaft housing and the rotatable housing portion 3 is secured to the shaft 5 and functions as an extension of the shaft 5. Thus, when the shaft 5 rotates the housing portion 3 rotates relative to the housing portion 2 and the bearing connected thereto. In this way the bearing supports the shaft both axially and radially through the inclined housing portion.

Generally, any of the general bearing constructions described in this application can be employed in the design of combined radial-thrust bearings of the type illustrated in FIGS. 36 and 37. Of course in order to achieve the combined radial and thrust bearing characteristic, the bearing pad surface must be angled at an angle between 0 and 90 degrees with respect to the major axis. Moreover, the need to accommodate both radial and axial loads necessarily will impact the design of the bearing pad support structure.

Figure 43:
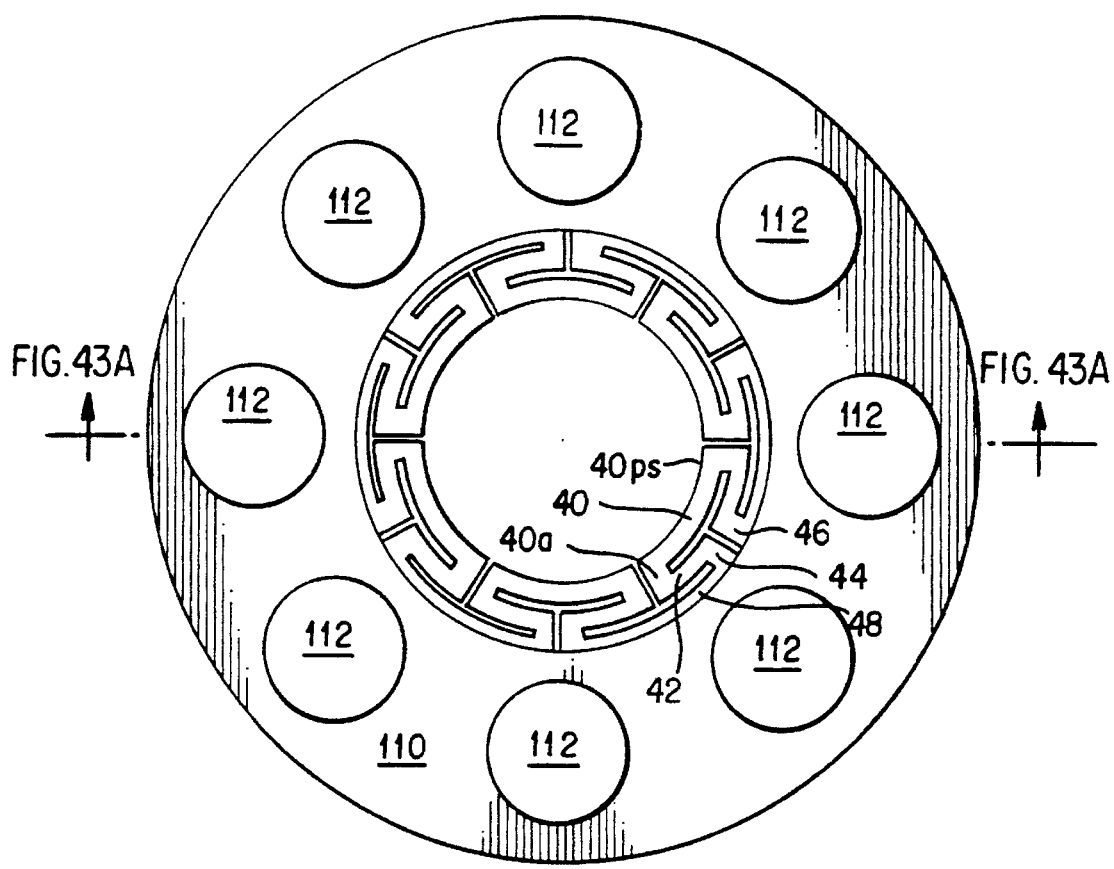
FIG. 43 is a side view of a combined radial-thrust bearing according to the present invention.
Figure 43A:
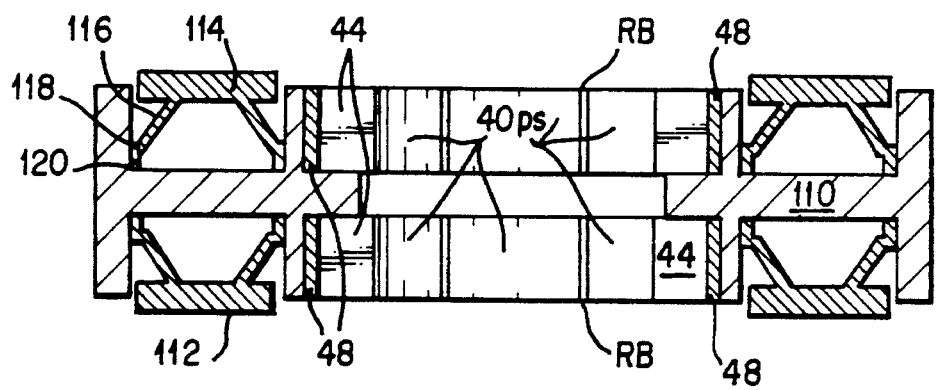
FIG. 43A is a cross-section of the bearing of FIG. 43.

Another form of combined radial-thrust bearing is shown in FIGS. 43 and 43A. As shown therein, the bearing is formed by assembling discrete bearing components. Generally, a combined radial-thrust bearing of this type includes a carrier having two axial faces, an inner periphery and an outer periphery adapted for mounting in a housing. At least one radial bearing RB is supported on, connected to, or integral with the inner periphery of the carrier to provide radial shaft support. A number of circumferentially spaced openings are formed on at least one of the two axial faces of the carrier. A plurality of bearing pads are located in these openings. In this way, a thrust face is provided on the bearing.

In the specific example illustrated in FIGS. 43 and 43A, the bearing includes two radial bearings RB of the type shown in FIG. 8 and discussed above. As noted above, this type of bearing provides bidirectional support. Of course, any of the hydrodynamic bearings of the present invention, unidirectional or bidirectional could be used. As shown, the radial bearings are separate elements supported by the carrier 110. The bearings could also be formed integrally with the carrier 110 or locked thereto. The thrust pads 112 can be of the type described in connection with FIG. 42 discussed below. Specifically, the pads include a pad 114, a primary support portion 116, a secondary support portion 118, and a tertiary support portion 120. The primary support portion 116 can be a plurality of inclined legs or a single hollow conically (or, more accurately, frustum) shaped element. Likewise, the secondary 118 and tertiary 120 support portions can be continuous or divided into individual members.

An important aspect of the present invention is the disclosure of machinable bearing shapes. In other words, bearing shapes which can be produced by machining a piece of heavy walled tubing or similar cylindrical journal using standardly available machining techniques. Such bearings are characterized by the fact that they are formed from a piece of heavy walled tubing or similar cylindrical journal through the provision of bores, slits and grooves. The advantage of such bearings is that it is easy to manufacture prototypes and to modify these prototypes after testing. Naturally, when the bearings are to be mass produced, using, for example, molding or casting techniques, different manufacturing considerations may dictate different shapes. It is important to recognize that changes in shape affect bearing performance.

Another manufacturing consideration is ease of molding. Naturally, most of the bearing constructions of the present invention are capable of being molded by some molding technique. However, only certain shapes can be injection molded in a simple two-piece mold, i.e., a mold which does not include cams. Another advantage of the bearings of the present invention is that the bearings can be constructed with easily moldable shapes which are defined as shapes which can be injection molded using a simple two-piece mold. An easily moldable shape generally is characterized by the absence of "hidden" cavities which require cams for molding. For instance, with respect to radial bearings, an easily moldable shape includes no radially extending grooves in the inner and outer diameter and a continuous axial cross section. The bearing shown in FIGS. 32, 32A and 328 is an example of an example of an easily moldable radial or journal bearing.

Similarly, easily moldable thrust bearings are characterized by the fact that they can be molded with a single seam line such that, for example, when viewed only from the top and bottom, all surfaces are visible.

Figure 38A:
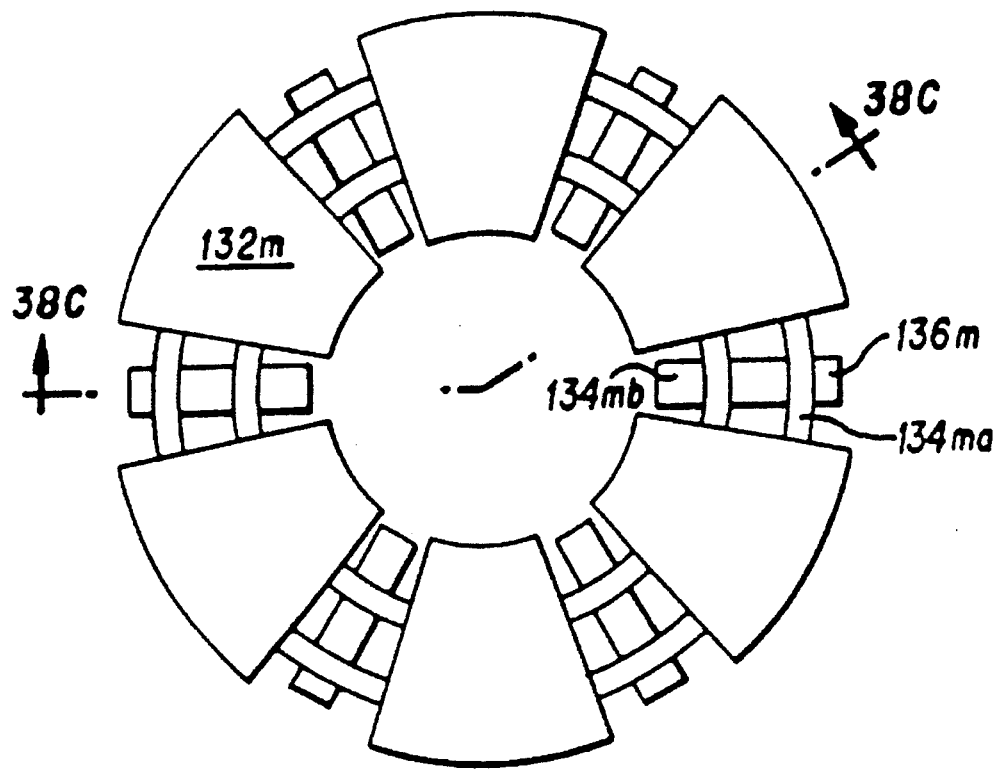
FIG. 38A is a top view of an easily moldable thrust bearing according to the present invention.
Figure 38B:
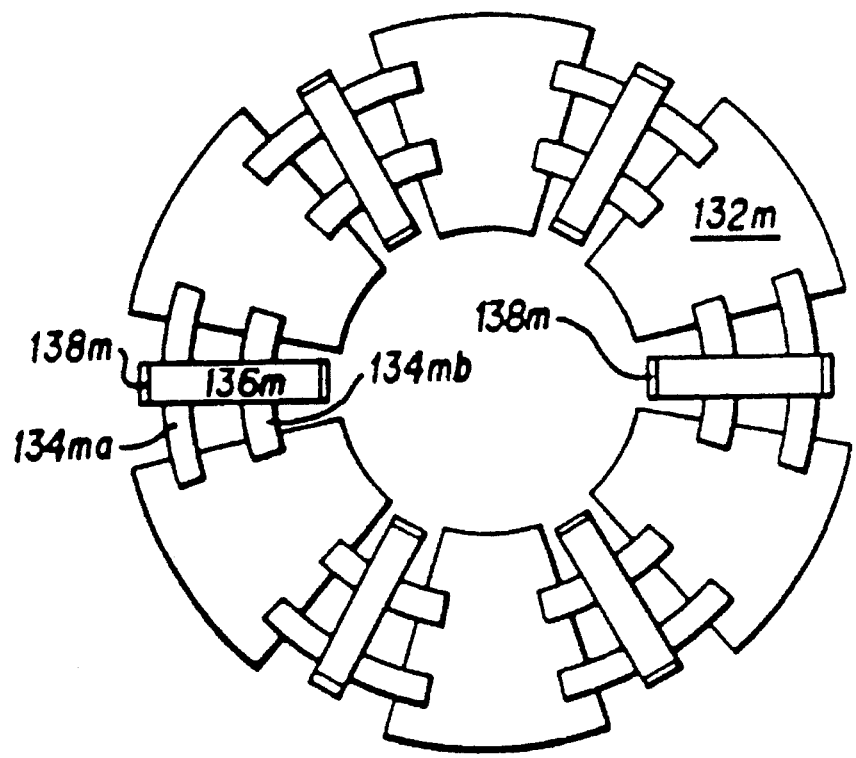
FIG. 38C is an exploded cross-section along the lines indicated in FIG. 38A.
FIG. 38D is a bottom view illustrating modifications of the bearing illustrated in FIGS. 38A–C.
FIG. 38E is FIG. 38A in a sealed bearing unit.
Figure 38C:
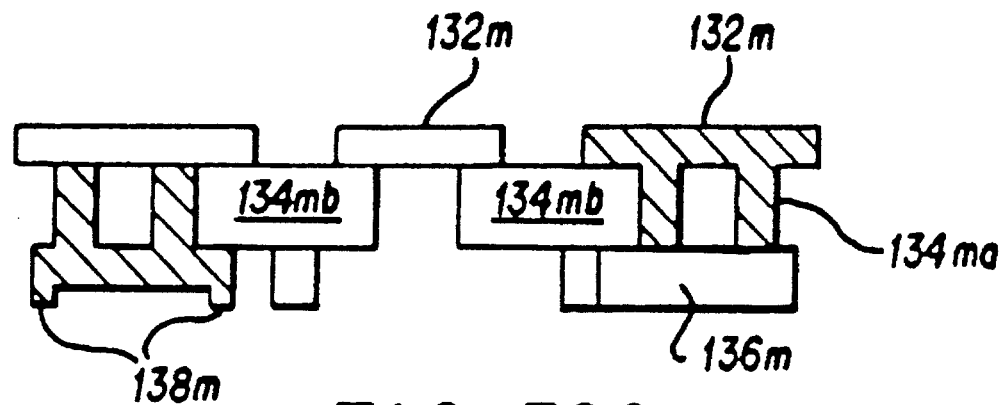

FIGS. 38A–38C illustrates an easily moldable thrust bearing. The bearing includes a plurality of circumferentially spaced bearing pads 132m and a support structure supporting each of the bearing pads 132m. The support structure includes a primary support portion which includes circumferential beams 134mb and 134ma, a secondary support portion which includes radially extending beam 136m and a tertiary support portion which includes the stub-like pair of beams 138m. It should be noted that in FIGS. 38A–38C the dimensions of the support structure are somewhat distorted to provide clarity. For instance, as shown in FIG. 38C, the circumferential beams 134ma and 134mb are shown as extremely thick. Such a beam structure would provide a very rigid support for the bearing pads 132*m* and in practice, such a rigid support would probably not be necessary or desirable.

Variants of the specific moldable beam structure illustrated are possible. For instance, either or both of the spaced circumferential beam segments 134*ma* or 134*mb* could be formed as a continuous circumferential beam element. Additionally, the secondary support portion could include a plurality of radially extending beams between each bearing pad 132*m*. Further, the primary support structure could be modified to include three or more circumferential beam segments connecting each pair of adjacent bearing pads and/or circumferential beam segments of different radial widths could be used. Further, the stub-like beam portions 138*m* could be provided along the radially extending edges of the beams 136 rather than the circumferentially extending ends. Finally, as with any bearing in accordance with the present invention, the structure could also be varied by varying the length or thickness of any of the elements in the support structure to modify the deflection characteristics of the support structure.

Figure 38D:
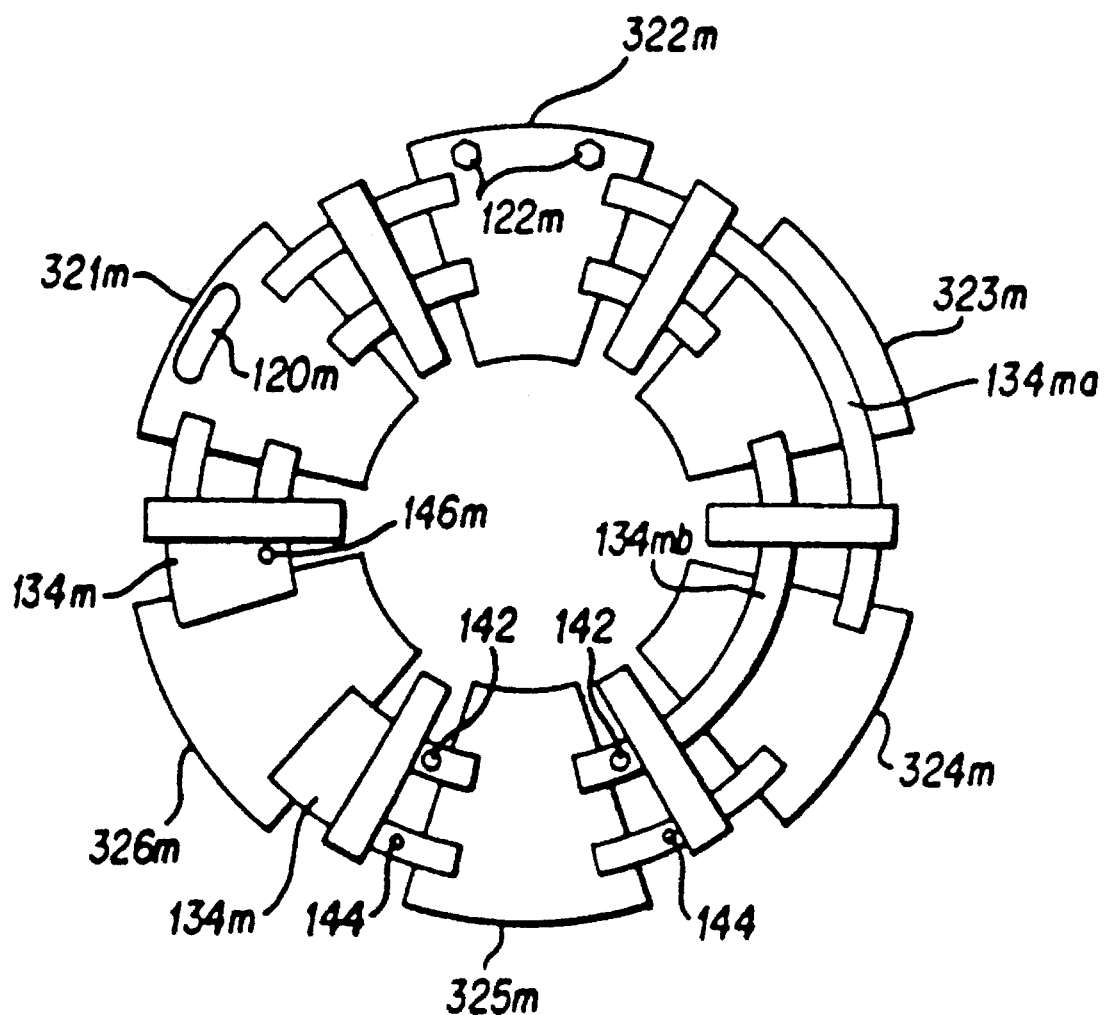

In order to illustrate a number of possible support structure constructions, FIG. 38D depicts a different support structure for each of the bearing pads 321*m*–326*m*. In particular, FIG. 38P is a bottom view with the modifications illustrated herein. It should be understood that these various support structures are shown in a single bearing for purposes of illustrating the present invention. In normal use, each of the bearing pads 321–326*m* would have a similar, though not necessarily identical, support structure to assure uniform performance.

The support for bearing pad 322*m* differs from that for the bearing pads 132*m* in that a oval shaped projection extends from the back of the bearing pad surface to provide a rigid support for the outer circumferential edge of the bearing pad 321*m*. By virtue of this construction, the bearing pad 321*m* would be extremely rigid at its outer circumferential end.

The support for bearing pad 322*m* is similar to that to 321*m* except that rather than a single large projection, two smaller projections 122*m* extend from the bottom of the bearing proximate the outer circumferential edge of the bearing pad. Like the projection 120*m*, these two projections 122*m* provide rigidity to the outer circumferential edge of the bearing pad 322*m*. However, this construction allows the bearing to deflect in the unsupported region between the projections.

The bearing pad 323*m* is supported by modified support structure which includes a continuous circumferential beam 134*ma* in the primary support portion. Similarly, the bearing pad 324*m* includes a continuous inner circumferential beam 134*mb*. The provision of such continuous beams increases the rigidity of the bearing support structure.

The support structure for bearing pad 325 is modified by the provision of large openings 142*m* in the inner beam 134*mb* and smaller openings 144 in the outer beam 134*ma*. The provisions of these openings increases the flexibility of the beams. Naturally, the larger openings increase the flexibility of the beams to a greater extent than the small openings 144. Variants of this support structure include the use of different sized openings or a different number of openings to bias the bearing pad 325*m* in a predetermined direction.

The bearing pad 326*m* is supported by a modified structure in which the primary support portion includes a membrane 134*m* rather than a pair of beams. In the illustrated example, one of the membranes is provided with a opening 146 to bias the bearing pad 326*m* in a predetermined direction. Of course, the provision of the opening 146*m* is not necessary and if desired, a number of openings could be provided.

As is evident from these drawings, the moldable bearings do not include any hidden cavities which would necessitate the use of a complex mold and/or a mold including a displaceable cam. In particular, since each surface of the bearing structure is directly visible in either the top view of FIG. 38A or the bottom view of FIG. 38B, the bearing can be simply molded using a two piece mold. Specifically, a first mold piece defines those surfaces which are directly visible only in the top view of FIG. 38A. The second mold piece defines those surfaces which are only visible in the bottom view of FIG. 38B. Surfaces having edges visible in both FIGS. 38A and 38B can be molded using either or both molds. In the illustrated bearing, easy moldability is achieved because the secondary and tertiary support portions are circumferentially located in the space between bearing pads. The modifications illustrated in FIG. 38D do not alter the easy moldability of the bearing.

More complex variants of the moldable thrust bearing illustrated in FIGS. 38A–38D are possible. In particular, any of the previously discussed modifications of the bearing structure which can be adapted to easy molding could be employed. For instance, the primary support beams could be continuous. Thus, the provision of an easily moldable bearing does not necessarily require a simple bearing construction. An example of a more complex bearing structure is illustrated in FIGS. 39A–39c.

Figure 39A:
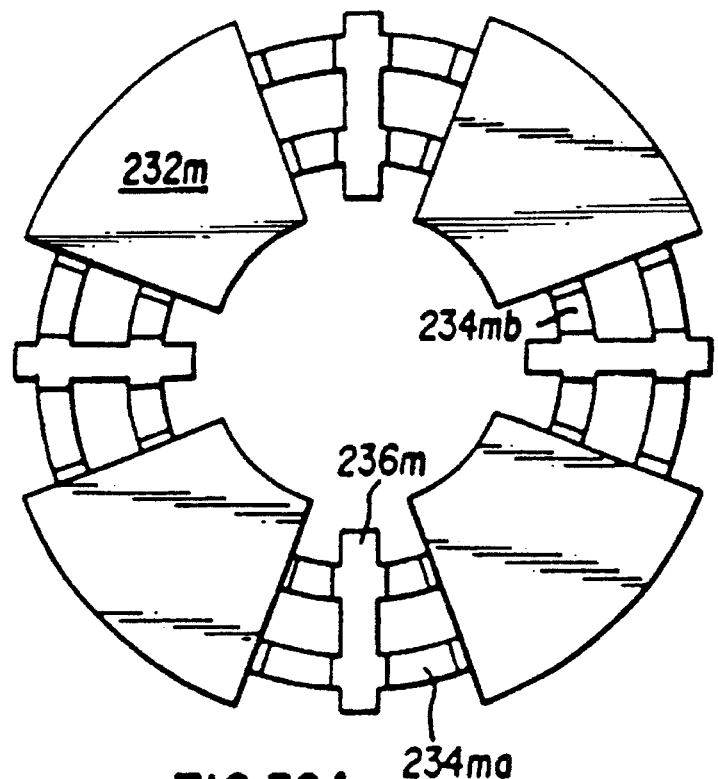
FIG. 39A is a top view of another easily moldable thrust bearing according to the present invention.
Figure 39B:
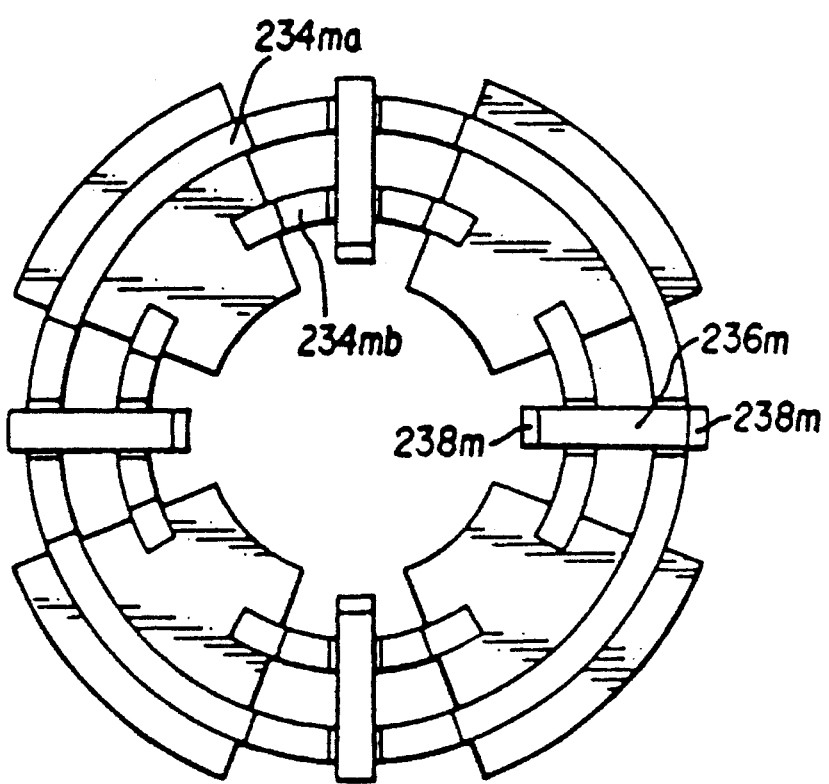
FIG. 39B is a bottom view of the bearing of FIG. 39A.
Figure 39C:
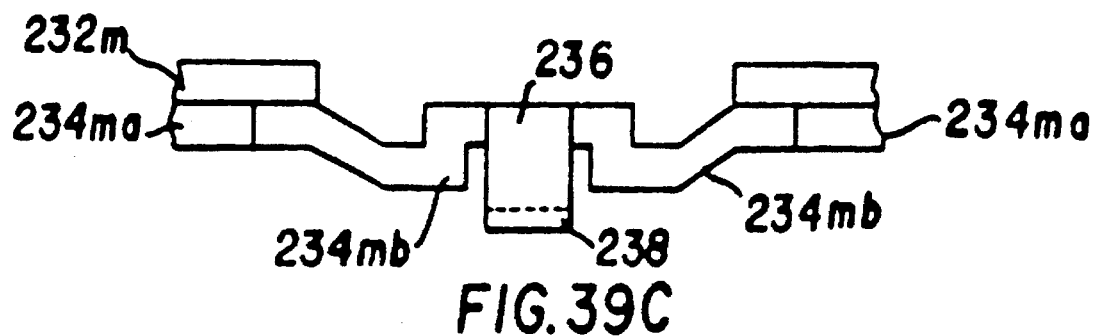
FIG. 39C is partial cross-section showing the support structure for the bearing pads in the bearing of FIGS. 39A and 39B.

As illustrated in FIGS. 39A–C, the bearing includes a plurality of circumferentially spaced bearing pads 232*m* supported by a bearing pad support structure. The secondary and tertiary portions of the support structure are similar to corresponding portions of the bearing support structure of FIG. 38. However, the bearing of FIG. 39 differs from the bearing of 38 in that in the bearing of FIG. 39 the primary support portion includes a plurality of complex beams 234. Specifically, each bearing pad is supported by a radially outer continuous complex circumferential beam 234*ma*. The pads are further supported by the plurality of spaced circumferential complex beams 234*mb*. The complex shapes of the continuous beam 234*ma* and the beam segments 234*mb* can be best appreciated with reference to FIG. 39C which shows, somewhat schematically, the profile of the complex beams 234. In operation, the beams 234*ma* and 234*mb* function as a beam network. Thus, it can be seen that numerous complex thrust bearing constructions can be provided while retaining the ability to mold the bearing with a simple two-piece mold, i.e., easy moldability. Naturally, each structure provides unique deflection characteristics which must be considered in designing the bearing for optimum wedge formation.

FIG. 38E illustrates a bearing of the type shown in FIGS. 38A–D in a sealed bearing unit. As shown therein, the bearing is secured to a static housing portion 2. The bearing pads 232*m* are adapted to support a rotating surface of the rotating housing portion 3. The bearing is surrounded by hydrodynamic fluid 4 and seals 7 seal the static 2 and rotating 3 housing portions with respect to one another. As described above, the static housing portion 2 is secured to and functions as a portion of the static shaft housing and the rotatable housing portion 3 is secured to the shaft 5 and functions as an extension of the shaft 5. Thus, when the shaft 5 rotates, the housing portion 3 rotates relative to the housing portion 2 and the bearing connected thereto. In this way thrust loads on the shaft are supported by the bearing through the rotating housing portion 3.

In certain gas or air lubricated deflection pad bearings, there are cases where loads or speeds exceed the capability of an air film. In these cases, it is necessary to introduce a liquid type lubricant into the converging wedge without providing a liquid reservoir or bath. FIGS. 40, 40A, 41 and 41A illustrate bearing constructions for achieving this purpose. In particular, these drawings illustrate a novel self lubricating deflection pad bearing in accordance with another important aspect of the present invention. The bearing is essentially a deflection pad bearing of the type described herein which has been modified to include lubricating plastic in its various openings.

The plastic employed In the bearing is a conventional castable porous plastic which is capable of absorbing lubricating liquid when soaked in such a liquid. One such plastic is sold under the trade name POREX. Generally, the porous plastic can be formed from various plastics by injecting air into the plastic material to form the pores. In particular, the liquid is absorbed into the porous plastic in a wick like manner and held in place by the plastic.

The lubricating deflection pad bearing is constructed by taking a conventional journal, thrust or combined radial and thrust deflection pad bearing of the type described above and casting or injecting the conventional porous plastic around and into the spaces between the deflection members. As a consequence of this construction, during operation, the movement of the shaft and the compression of the deflection members causes the lubricating liquid to leave the porous plastic be drawn into the leading edge of the converging wedge. The formation of the liquid filled wedge greatly Increases the load and speed capability of the bearing. After the liquid passes over the pad surface, it is reabsorbed by the porous plastic after leaving the trailing edge.

An important aspect of the present invention is the composite structure combining a standard bearing material with the porous plastic. By virtue of this composite, it is possible to take advantage of the unique characteristics of both materials. More specifically, conventional porous plastics alone make poor deflection pad bearing materials because the pores in the plastic are actual voids that are detrimental to the development of the very thin fluid film. On the other hand, conventional plastic or metal bearing materials not having the pores are incapable of absorbing lubricant to any great extent. However, through the use of both materials in the manner described, an effective self-lubricating hydrodynamic bearing can be obtained. Further, there are synergistic results from the combined use of standard bearing material and lubricant absorbing porous plastic. For example, the deflections of the bearing surface assist in forcing the liquid lubricant into the leading edge. Moreover, channelling or lubricant retaining de formation of the bearing surface assists in containing the liquid.

Figure 40:
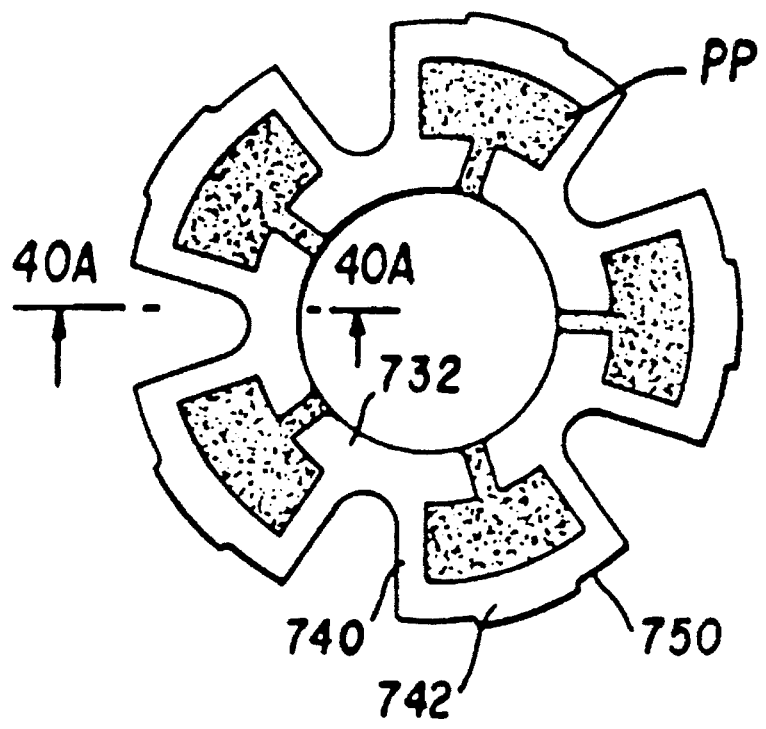
FIG. 40 is a side view of a self-lubricating bearing according to the present invention.
Figure 41:
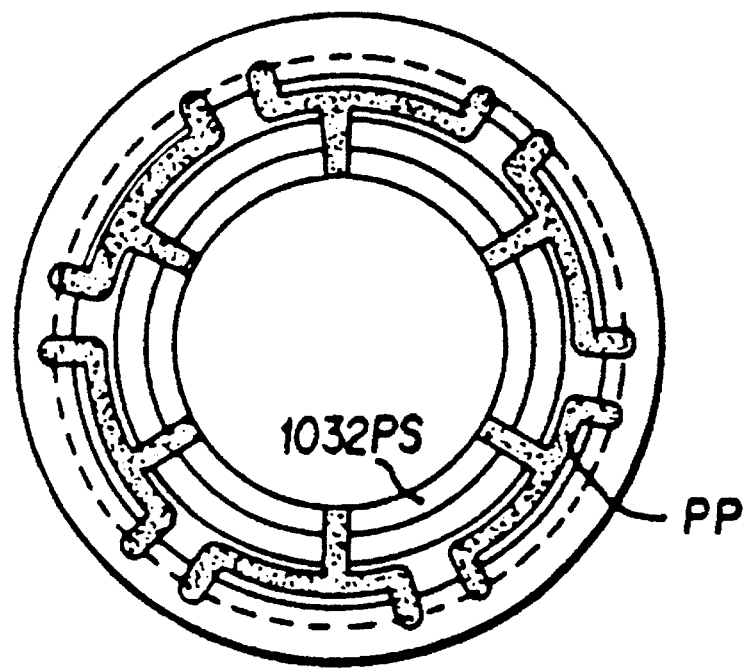
FIG. 41 is a side view of a self-lubricating combined radial and thrust bearing according to the present invention.

FIGS. 40 and 41 show two examples off the self lubricating deflection pad bearing of the present invention. In particular, these drawings show bearings similar to bearings described previously which have been modified to include the liquid absorbing porous plastic filled into the spaces between the deflection members. To some extent, the bearing acts as a skeletal portion and the porous plastic portion acts as a lubricant retaining and releasing sponge.

Figure 40A:
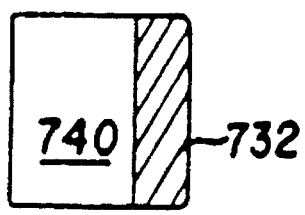
FIG. 40A is a cross-section of the bearing of FIG. 40.

In particular, FIGS. 40 and 40A show a selflubricating bearing having an underlying bearing structure which is essentially identical to the bearing shown in FIGS. 32 and 32A. However, the bearing structure of FIG. 40 is modified such that porous plastic fills the openings between the bearings and the openings within the support structure which are continuous with the spaces between the bearing pads 732. Naturally, the spaces under the bearing pads could be filled with porous plastic as well. However, unless there is communication between the porous plastic and the bearing pad surface, the provision of such porous plastic areas would be fruitless.

Figure 41A:
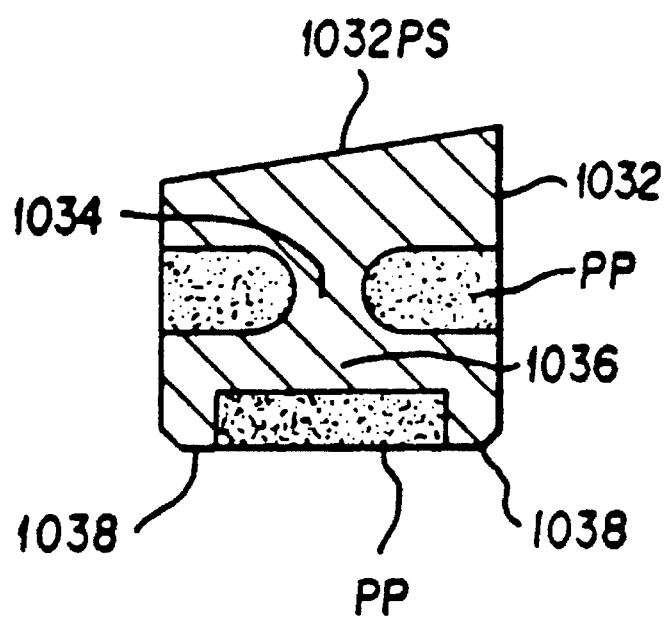
FIG. 41A is a cross-section of the bearing of FIG. 41.

Likewise, FIGS. 41 and 41A show a bearing having a construction virtually identical to the construction of the combined radial and thrust bearing shown in FIGS. 36 and 37. However, porous plastic is again injected into the interstices or spaces within the support structure between the end between the pads. Again, the injection of the porous plastic as illustrated results in a bearing having a continuous inner diameter. However, like the bearing of FIG. 40, the material characteristics across the inner diameter vary significantly.

Specifically, like the bearing of FIG. 40, the inner diameter of the bearing of FIG. 41 includes wedge supporting bearing pad surfaces and circumferentially spaced lubricant releasing and absorbing and retaining portions. In operation, the movement of the shaft and the compression of the deflection members causes the lubricating liquid to leave the porous plastic and to be drawn into the leading edge of the converging wedge. The formation of the liquid filled wedge greatly increases the load and speed capability of the bearings.

The manufacturer of the self-lubricating deflection pad bearing involves three general steps. First, the basic bearing or skeletal portion is formed standard bearing material. Second, the porous plastic is injected into the desired spaces in the bearing structure. For purposes of manufacturing convenience, the plastic is in; acted to the bearing without lubricant Finally, the bearing with the porous plastic injected into the desired spaces is loaded with liquid lubricant. To properly load the plastic with liquid lubricant, it is necessary to wick the lubricant in from one side. The merging in the liquid results in an unfilled internal portion. This is caused by not allowing the pores to vent from one side. In FIG. 40 the basic bearing structure is combined radial and thrust structure similar to that shown in FIG. 36. However, porous plastic fills the interstices within the support structure. The provision of the porous plastic yields a composite bearing having a continuous inner diameter surface. However, the deflection characteristics cross the surface very greatly. Specifically, the deflection pads which are formed of standard bearing materials such as metal or non-porous plastic is suited for deflection and formation of a fluid wedge. On the other hand, the porous plastic portions are suited for compression so as to release lubricant at the reading edge of the bearing pads and absorbing lubricant at the trailing edge of the bearing pads.

As noted with respect to each of the illustrative examples described above, the bearings of the present invention can be formed to provide for a wedge ratio of 1:2 to 1:5, have a deformable bearing surface the shape of which can be modified, allow six degrees of freedom of the pad, and provide a dash pot type damping action. The bearings are typically of a unitary construction.

By virtue of the wedge formed by deflection of the bearing pad and the ability of the pad to move with six degrees of freedom, the bearing of the present invention exhibits exceptional performance characteristics. Specifically, the bearing dimensions and deflection variables including number, size, shape, location and material characteristics of the elements defined in the unitary bearing can be tailored for any specific application to support a wide variety of loads. Of these variables, the shape of the support members is particularly important. The impact of shape of the support members on the deflection characteristics of the support structure can be appreciated when the variable formula for moment of inertia $bh^3/12$ (English units) (the main component of sectional modulus for rectangular section, $z=I/c=bh^2/6$) used in an example. Moreover, the ability of the pad to move with six degrees of freedom allows the bearing to compensate for and correct shaft misalignment. In this regard it is noted that the bearings of the present invention have a self correcting characteristic resulting from the tendency of the bearing to return to its non-deflected state due to the stiffness of the bearing. Of course, the stiffness of the bearing is primarily a function of the shape of the support structure, and to a lesser extent the other deflection variables including number, size, location, and material characteristics of the elements defined by the grooves and cuts or slits formed in the unitary element. Stiffer bearings have a greater self-correcting tendency but are less able to adjust for shaft misalignment.

Tests have shown that bearings incorporating the features of the present invention exhibit dramatically improved performance even in comparison to the structure disclosed in the present inventors prior U.S. Pat. No. 4,496,251. In a recent test the journal bearings of the present invention were utilized in a radial bearing with a radial envelope of 0.091" (2.31 mm). Inward deflections of the bearing pad were 0.0003" (0.0076 mm) which provides exceptional stability and bearing performance. A comparable displacement using the arrangement shown in the present inventor's prior U.S. Pat. No. 4,496,251 would have required a radial space of 0.30" (7.6 mm).

In conventional hydrodynamic journal bearings, it is typically necessary to provide a fluid-film clearance between the bearing pad surface and the shaft portion to be supported. This requires extremely close manufacturing tolerances which can present an obstacle to high volume production.

The bearings of the present invention can be designed to obviate the need for such close manufacturing tolerances. Specifically, by providing appropriate bores, grooves and cuts or slits, it is possible to define a bearing having virtually any desired performance characteristic. One such characteristic is the stiffness or spring characteristic of the bearing pad in the direction of load, i.e., in the radial direction (radial stiffness) with respect to journal bearings and in the axial direction (axial stiffness) with respect to thrust bearings. It is known in the bearing art that the fluid film between the shaft and the bearing may be modeled as a spring since it has a calculatable radial or axial fluid film stiffness or spring characteristic. This is true for both compressible and incompressible fluids but is particularly useful in regard to gas fluid lubricants. The fluid film stiffness and the bearing stiffness act in opposition to one another such that if the fluid film stiffness or spring characteristic exceeds the bearing stiffness or spring characteristic, the bearing will deflect in the direction of the fluid film stiffness (i.e., radial direction for journal bearings and axial direction for thrust bearings) until the stiffness of the fluid and the bearing are in equilibrium. Thus, it has been found that if a journal bearing is designed such that radial stiffness of the bearing is less than the radial stiffness of the fluid film, it is not necessary to provide a precise spacing between the shaft and the bearing because the radial stiffness of the fluid film will automatically and instantaneously, upon rotation of the shaft, cause appropriate radial deflection of the journal bearing. The virtually instantaneous wedge formation results in virtually instantaneous formation of the protective fluid film thereby preventing damage to wedge forming surface which typically occurs at low speeds during the formation of the fluid film.

The radial stiffness of the bearing is, of course, primarily a function of the section or flexure modulus of the support structure which depends on the shape of the support structure. The radially stiffness of the pad also depends on the length of the slits or cuts formed in the bearing. The same is true of thrust bearings except, naturally, the axial stiffness of the bearing is critical. Accordingly, with the present invention, it is possible to achieve high performance without the close manufacturing tolerances typically required of hydrodynamic bearings.

For example, the bearings of the present invention may be designed to have an interference fit when installed on the shaft such that as the bearing is forced on the shaft the pads deflect, slightly so as to form a converging wedge shape while in the stationary installed position. Contact between the bearing pad and shaft being at the trailing edge. At instantaneous start up, the fluid film enters the wedge and builds up fluid pressure causing separation of the shaft and pad. Thus, in accordance with another important aspect of this invention, the bearings of the present invention may be designed and dimensioned such that the trailing edge of the bearing is in contact with the shaft portion to be supported when the shaft is at rest.

The thrust bearings of the present invention can also be designed to provide a statically loaded wedge. In order to provide a statically loaded wedge, the support structure for the bearings is designed such that the bearing pads slope toward the shaft from the radially inner circumferential edge of the bearing pad to the radially outer circumferential edge of the bearing pad. Further, the support structure is designed such that the bearing pad slopes toward the shaft from the radially extending leading edge to the trailing edge. In this way, a statically loaded wedge approximating the optimum wedge is formed. Further, the pad is sloped toward the shaft at the outer circumferential edge so as to provide the desired fluid retaining characteristic. The stiffness of the support structure can also be designed such that an appropriate space inbetween the pads and shaft is established instantaneously upon rotation of the shaft.

Alternatively, the bearing may be designed such that the entire bearing pad contacts the shaft portion to be supported when the shaft is at rest. This aspect of the present invention is particularly useful in high volume production of the bearings and with bearings using gas lubricating fluids because it allows a much larger variation of machining tolerances. In one example, a 0.003 inch variation can be designed to have an insignificant impact on the wedge whereas conventionally machining of known gas bearings require 0.00000x tolerance which can only be attained through the use of sophisticated and expensive machining techniques such as micro inch machining via etching.

In accordance with another aspect of the present invention, hydrodynamic radial bearings constructed along the lines of the previously discussed hydrodynamic bearings can be constructed so as to be adapted to be secured to the rotating shaft for movement with the shaft or relative to a static support surface in the housing. The general configuration of bearings adapted to be mounted to the rotating shaft is similar to that of the general bearings discussed above, but with a radially inverted construction. Because of the inverse orientation of support, there are naturally differences in the construction. For instance, the runner pad portions of the bearings which rotate with the shaft are supported on a radially inward support structure. The support structure supports the bearing pads for deflection radially inward and outward to establish a hydrodynamic wedge with respect to the smooth portion of the housing. As the bearing rotates with the shaft, centrifugal force acts on the bearing pads tending to force the bearing pads outward toward the smooth surface of the housing.

Figure 44:
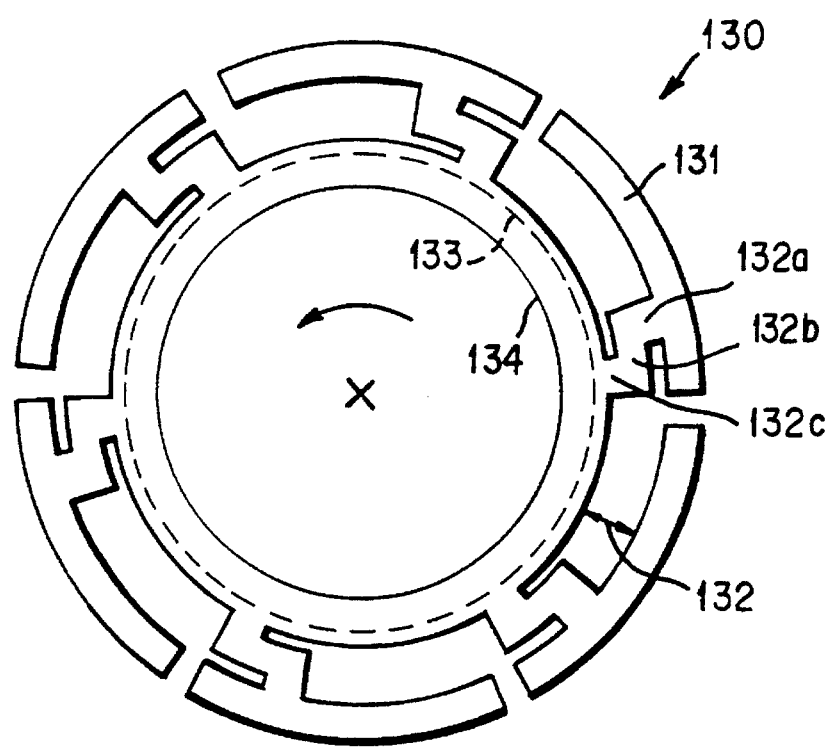
FIG. 44 is a cross-section of a bearing adapted to be mounted to the shaft for rotation with the shaft relative to the housing.

An example of one such bearing construction is shown in FIG. 44. This bearing is basically a radially inverted version of the bearing of FIGS. 4–6. The bearing 130 includes an outer diameter which is substantially cylindrical, but divided into a plurality of circumferential bearing pads 131. The bearing pads shown are relatively thick for two reasons. First, the thickness inhibits deformation of the bearing pad 131. Second, the thickness increases the mass of the bearing pads 131 so that, as the shaft rotates, the centrifugal force tending to pull the bearing pads 131 outward is increased. Because of the tendency of the pads 131 to deflect outward, the bearings can be dimensioned so as to have a clearance with the housing. Of course, if desired, the pads 131 could be thinner so as to allow deformation of the pad and/or to limit the effect of centrifugal force.

The foregoing considerations relate to any bearing of the present invention which is designed to be mounted to the shaft. The difference between the various bearings of this type resides in the support structures used to support the bearing pads. Generally, any of the previously described radial bearing support structures can be adapted for use as a support structure for the bearing pads 131. However, there are differences owing to the inverse orientation of the supports. In the bearing construction shown in FIG. 44, the pads 131 are supported on a primary support portion 132 which includes a plurality of first stub-like or radial beams 132a, circumferential beams 132b, and second stub-like or radial beams 132c. The primary support portion 132 and the bearing pads 131 are supported on a continuous membrane 133 which functions as a secondary support portion. As shown, the membrane 133 is very thin in the radial direction (and thus flexible in this direction) and stretches between support beams or legs 134 which function as a tertiary support portion. As with the bearing of FIGS. 4–6, the membrane 133 could be divided into a plurality of axially extending beams by providing radial cuts through the membrane. In the embodiment shown in FIGS. 43A and 43B, the support beams or legs 134 are continuous cylindrical members and are relatively rigid such that the thin membrane 133 is supported in a trampoline-like fashion. As with the other bearings described heretofore, the support legs could have a different construction.

The construction of the bearing shown in FIG. 43 is designed for unidirectional support. Specifically, the arrangement of the support structure depicted in FIG. 44 supports the pads for proper deflection only when the bearing is rotated in the direction indicated. Upon such rotation, the leading edge (the edge furthest from the support structure) deflects inward away from the housing and the trailing edge deflects outward toward the housing so as to form a hydrodynamic wedge between the bearing pads and housing.

Figure 45:
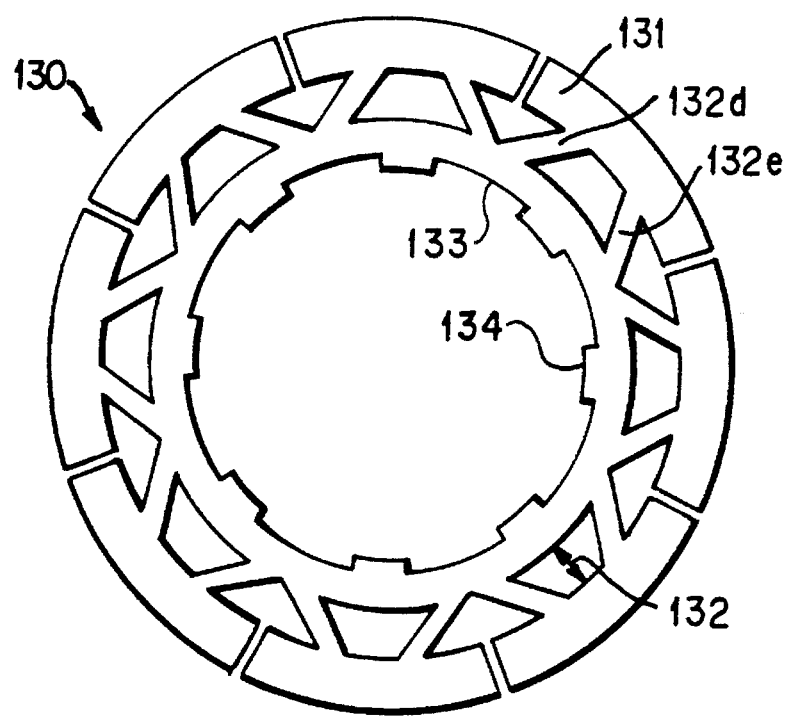
FIG. 45 is a cross-section of another bearing which is adapted to be mounted to the shaft.

Another bearing which is adapted to be mounted for rotation with the shaft is shown in FIG. 45. This bearing is the radially inverted version of the bearing depicted in FIG. 32. The bearing is similar to that shown in connection with FIG. 44. The difference between the two constructions resides mainly in the construction of the support structure. For instance, the construction of FIG. 45, includes axially extending beams or leg portions 134 rather than the continuous circumferential legs of the bearing of FIG. 44. Also, the primary support includes a symmetrical arrangement of angled beams 132d and 132e. By virtue of the symmetrical construction of this bearing, it is bidirectional. The bearing is also easily moldable because it has no "hidden" openings.

Upon rotation of the bearing with respect to the housing, the support structure deflects so that a hydrodynamic wedge is formed between the pad and housing.

In a similar matter, any of the general bearing constructions illustrated above can be adapted for use as a bearing mounted to the shaft rotation with respect to a fixed surface. Generally, it is only necessary that the structure be inverted along the lines discussed above.

Generally, any of the bearings described above or any combination of such bearings can be enclosed in a sealed housing of the type disclosed herein. Normally, in designing a sealed bearing assembly each bearing will have its housing or base portion secured to the static portions of the housing and the pads will be located so as to support a surface which is rotatably secured to the shaft. Naturally, other types of hydrodynamic bearings can be enclosed within the sealed housing. For instance, it is believed that the bearing pads disclosed in U.S. Pat. No. 4,676,668 are particularly well suited for use in a sealed bearing enclosure.

FIG. 42 shows a construction in which the static housing portion 2 functions as the carrier for individual pads 420. The surfaces of the pads 420 are adapted to support a planar surface of the rotatable housing portion 3. Again, the rotatable housing portion 3 rotates with the shaft 5 relative to the static housing portion 2. In this way, the pads 420 support thrust loads acting on the shaft through the rotating housing portion.

In small quantities, the bearings disclosed herein are preferably constructed by electrical discharge machining or laser cutting methods. The double lines shown in the drawings are the actual paths of the wire or beam which is typically 0.002–0.060" (0.50–1.52 mm) in diameter. The lubricant that flows into the electrical discharge machined paths, acts as a fluid dampener that reduces any vibration or instability at resonant frequencies. In the situations described above where a continuous cylindrical membrane is formed, the damping takes the form of a dash pot that exhibits high damping characteristics. A significant consideration in the design is that the support structure length and direction be oriented to provide the inward deflection shown in FIG. 3. Also minute deflections of the pads themselves in the direction of load as shown in FIG. 9, result in eccentricity changes which further improve bearing performance. It is noted that in Faires, Design of Machine Elements the distance between the center of the bearing and the center of the shaft is called the eccentricity of the bearing. This terminology is well known to those skilled in bearing design. With the novel approach of tuning or modifying the stiffness of the bearing configuration or structure and particularly the beam to suit a particular bearing application, optimum performance is readily obtained. Recent computer analysis has demonstrated that virtually any stiffness or deflection may be accomplished.

As noted above, when manufacturing low volumes or prototypes of the bearings of the present invention, the bearings are preferably constructed by electrical discharge machining or laser cutting methods. Such small volumes or prototypes are usually constructed of metal. However, when higher volume production of a particular bearing is contemplated, other methods of manufacture such as injection molding, casting, powdered metal die casting and extrusion are more economical. In connection with such manufacturing methods, it may be more economical to employ plastics, ceramics, powdered metals or composites to form the bearings of the present invention. It is believed that methods such as injection molding, casting, powdered metal die casting with sintering and extrusion are sufficiently well known that the processes need not be detailed herein. It is also believed that once a prototype bearing is constructed, the method of producing a mold or the like for mass production of the bearing is well known to those skilled in the molding and casting art. Moreover, it is to be understood that only certain types of the bearings of the present invention are adapted to be made in high volumes through extrusion. Generally, these are the bearings that are formed only through the provision of circumferential grooves and radial and circumferential cuts or slits which extend axially throughout the entire bearing. In ocher words, those bearings having a constant or otherwise extrudable cross-section.

In accordance with another aspect of the present invention, a novel investment casting method has been found to be particularly useful in the manufacture of intermediate quantities, e.g., less than 5,000 bearings. In accordance with this method of manufacture, the first step of the investment casting procedure is manufacture of a prototype bearing. As discussed above and detailed below, the prototype can be manufactured in any number of ways, but is preferably manufactured by machining a piece of heavy walled tubing or similar cylindrical journal. In larger bearings, the cylindrical journal typically is machined using a lathe for forming face and circumferential grooves, and a mill for forming axial and radial bores. In machining smaller cylindrical journals, techniques such as water-jet cutting, laser and wire electrical discharge techniques are generally more suitable. However, in either application the journals are typically turned and milled to form the larger grooves.

After the prototype bearing is formed, it may be desirable to test prototype to confirm that the bearing functions in the predicted manner. As a result of such testing, it may be necessary to modify and refine the prototype to obtain the desired results.

Once a satisfactory prototype is obtained, a rubber mold of the prototype is formed. Typically, this step involves encasing the prototype in molten rubber and allowing the rubber to harden so as to form a rubber mold of the prototype. The rubber encasing the prototype is then split and the prototype is removed to yield an open rubber mold.

Once the rubber mold is obtained, it is used to form a wax casting. This step typically involves pouring molten wax into the rubber mold and allowing the wax to harden to form a wax casting of the bearing.

After the wax casting is obtained, it is used to form a plaster mold. This step typically involves encasing the wax casting and plaster, allowing the plaster to harden around the-wax casting so as to form a plaster mold.

The plaster mold can then be used to form a bearing. Specifically, molten bearing material, such as bronze, is poured into the plaster mold so as to melt and displace the wax casting from the mold. Thus, the plaster mold is filled with molten bearing material and the melted wax is removed from the plaster mold.

After the molten bearing material is allowed to harden, the plaster mold is removed from around the bearing and a bearing is obtained.

Because this method of manufacture involves the sacrifice of a wax casting, it is known as investment casting or sacrificial casting.

Despite the fact that the investment or sacrificial casting method described above involves sacrifice of a wax casting and the production of both rubber and plaster molds, and is quite labor intensive, it has proven to be cost effective when intermediate quantities, e.g., less than 5,000 units, of a particular bearing are required. The cost effectiveness of this procedure for lower quantity bearing requirements is due to the fact that the molds used in this method are far less expensive to produce than the complex mold required for injection molding or powdered metal casting.

As noted above, the first step in the investment casting method, indeed in any method, of producing bearings in accordance with the present invention is the production of a prototype bearing. In accordance with another aspect of the present invention, the relatively complex journal and thrust bearings of the present invention can be formed using simple manufacturing techniques. Similar techniques are used for both thrust and journal bearings.

With the foregoing in mind, it is believed sufficient to describe the method of making a single journal bearing through the use of electrical discharge manufacturing and machining. It is believed that a description of such manufacture demonstrates the ease with which the relatively complex bearing shapes of the present invention can be achieved.

Figure 12A:
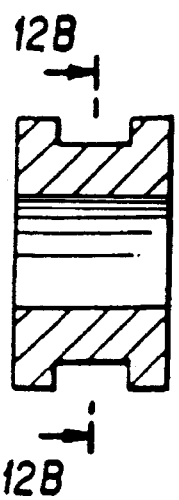
FIGS. 12A and 12B are cross sectional views of a machined journal or blank.
Figure 12B:
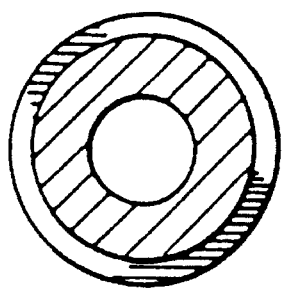
Figure 14A:
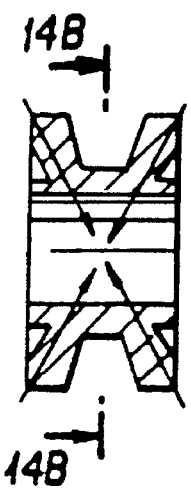
FIGS. 14A and 14B are cross sectional views of a modified machined journal or blank.
Figure 14B:
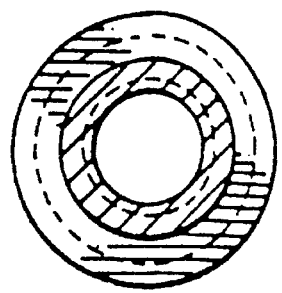

Each bearing is initially in the form of a cylindrical blank having a cylindrical bore as shown in FIGS. 11A and 11B. The blank is then machined to provide a radial lubricating fluid groove as shown in FIGS. 12A and 120. For certain applications, it is desirable to further machine the blank to include facing grooves which are preferably symmetrically disposed on the radial faces of the bearings as shown in FIGS. 13 and 13B. The provision of such facing grooves ultimately results in a bearing which is easily torsionally deflected. While the groove shown in FIGS. 13A and 130 are cylindrical, it is possible to provide tapered grooves as shown in FIGS. 14A and 14B. As will become evident below, this yields a bearing which exhibits improved deflection characteristics by virtue of the angled alignment of the support beams. In this context, it should be noted that it is preferable that the support beams as viewed in FIG. 14A are tapered along lines which converge at a point proximate the center line of the shaft. This ensures that flexibility occurs about the shaft center line by establishing a center of action for the entire system such that the pads may adjust to shaft misalignment. In essence, the tapering of the support beams causes the bearing to act in a manner similar to a spherical bearing by concentrating the support forces on a single point about which the shaft may pivot in all directions to correct any misalignment. The arrows in FIG. 14A illustrate the lines of action of the deflection.

Bearings having cross sections of the type shown in FIGS. 12A and 14A are particularly effective at retaining the hydrodynamic fluid. This is because the bearing pad is supported proximate the axial ends of the bearing pad and the central portion of the bearing pad is not directly supported. By virtue of this construction, the bearing pad is supported so as to deform under load to form a fluid retaining concave pocket, i.e. the central portion of the bearing pad deflects radially outward. This greatly decreases fluid leakage. Naturally, the degree of pocket formation depends of the relative dimensions of the bearing pad and support structure. A larger fluid retaining pocket could be obtained by providing a thinner bearing pad surface and supporting the pad surface at the extreme axial ends of the bearing pad.

Figure 14C:
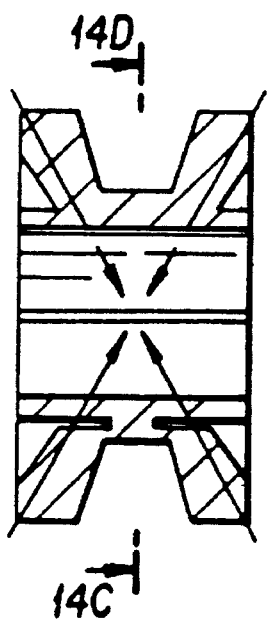
FIGS. 14C and 14D are cross sectional views of a bearing constructed from the modified machined journal or blank FIGS. 14A and 14B.
Figure 14D:
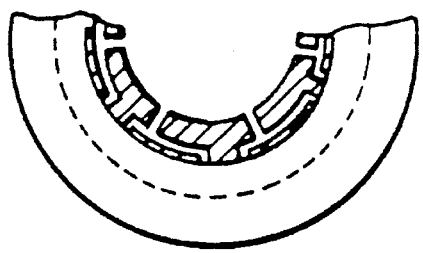

After the cylindrical blank is properly machined as shown in FIGS. 12A and 120, FIGS. 13A and 13B, or FIGS. 14A and 14B radial and/or circumferential slits or grooves are formed along the radial face of the machined blank to define the bearing pads, the beam supports and the housing. FIGS. 14C and 14D illustrate such grooves formed in the machined blank of FIGS. 14A and 140. When manufacturing low volumes of the bearings or prototypes of the bearings for use in the construction of a mold, the cuts or slits are preferably formed through electrical discharge manufacturing or through the use of a laser. The machining of the cylindrical blanks to achieve the configurations illustrated in FIGS. 12A and 12B, FIGS. 13A and 13B, FIGS. 14A and 148 or a similar shape can be done through conventional machine tools such as lathe or the like.

Although the foregoing discussion is specifically directed to journal bearings, the principles apply just as well to thrust bearings. For instance, the thrust bearing shown in FIGS. 15–18 can be formed by machining a section of heavy walled tubing to provide radially inner and outer grooves, facing grooves, axial bores, radial cuts and chamfers so as to define bearing pads and support structure.

The performance characteristics of the bearings of the present invention results from the relative shape, size, location and material characteristics of the bearing pads and the beam supports defined by the bores and cuts or slits formed in the machined blank. These parameters are largely defined by the dimensions and location of the radial circumferential bores, cuts or slits formed in the bearing in conjunction with the shape of the machined blank in which the bores or slits are formed to yield the bearing.

As noted above, while the construction of the bearings of the present invention is most easily understood by reference to the machining process, larger quantities are preferably manufactured through the investment casting method of the present invention, and even larger scale production of the bearings contemplated by the present invention could be more economically performed through injection molding, casting, powdered metal, die casting, extrusion or the like.

In extruding a large number of bearings from a pipe-like cylindrical blank, radial lubricating fluid grooves as shown in FIGS. 12A and 120 can be provided along the length of the pipe-like cylindrical blank prior to extrusion. However, if facing grooves were desired in the bearing, these can be individually defined after slicing the individual bearings from the extruded and machined blank. For this reason, extrusion might not be a preferred method of producing bearings which require facing grooves to enhance torsional flexibility.

What is claimed is:

1. A unitary member for supporting a rotating shaft, the member comprising a plurality of shaft support pads each of the shaft support pads having a shaft supporting surface and a supported surface; a pad support structure for supporting the pads in a housing, the shaft support structure supporting each of the shaft support pads at the supported surface such that there is an open space between every point on the shaft surface and the housing; at least one piezoelectric element, and a current supply means for supplying current to the piezoelectric element so as to cause changes in the shape of the piezoelectric element; the piezoelectric element being located such that changes in its shape cause changes in the orientation of at least one of the shaft support pads and the support structure.

2. The unitary member of claim 1 wherein the pad support structure comprises a primary support port ion, a secondary support portion and a tertiary support portion.

3. A one-piece hydrodynamic bearing for supporting a shaft, the bearing comprising: a plurality of circumferentially evenly spaced bearing pads, the bearing pads comprising edges including at least a leading edge, a trailing edge, and a radially inner edge that extends circumferentially from the leading edge to the trailing edge, a bearing shaft support face extending between the bearing pad edges and having a radially innermost portion, and a pad support surface; the bearing pads being supported at the pad support surface by a support structure which includes a plurality of beam members arranged such that a single beam is connected to each pad at the pad support surface at a location that is spaced radially outward from the radially inner edge of the bearing pad such that said single beam is located radially outward from the radially innermost portion of the bearing pad shaft support face., the support structure supporting the bearing pads such that each bearing pad has a predetermined stiffness, a fluid film located between said bearing pad face and the shaft, the fluid film having a characteristic stiffness, wherein the stiffness of the fluid film is greater than the stiffness of the bearing pad such that said fluid film causes the leading edge of the bearing pads to deflect away from the shaft upon rotation of said shaft.

4. The hydrodynamic bearing of claim 3 wherein the bearing further comprises at least one piezoelectric element in contact with the support surface of each of the bearing pads, and a current supply means for supplying current to the piezoelectric element so as to cause changes in the shape of the piezoelectric element, the piezoelectric element being located such that the changes in its shape cause changes in the orientation of the pad it contacts.

5. The bearing of claim 3, wherein the bearing is a thrust bearing and the bearing shaft support face is planar.

6. The bearing of claim 5, wherein the support structure includes a single stub-like beam supporting each bearing pad; a single horizontal beam supporting each stub-like beam, each said horizontal beam including first and second ends, the beams supporting the stub-like beams at one of the first and second ends and being supported in a cantilever fashion at its other end.

7. The bearing of claim 3, wherein the support structure supports the pads from movement with six degrees of freedom.

8. The bearing of claim 3, wherein the bearing is a radial bearing and the bearing shaft support face is curved.

9. The bearing of claim 8, wherein the support structure includes a single beam connected to the pad support surface of each bearing pad, the single beam extending radially outward from the pad support surface and having first and second ends, the first end of the beam being connected to the pad support surface.

10. The bearing of claim 9, further comprising a plurality of circumferentially extending beams having first and second ends, the second end of each of the radially outwardly extending beams being supported on one of the ends of the circumferential beam and the other end of the circumferential beam being supported in a cantilever fashion.

11. The bearing of claim 10, further comprising a piezoelectric element located between a pad support surface of each of the bearing pads and a horizontal beam and further comprising a current supply means for selectively supplying current to the piezoelectric elements so as to cause changes in the shape of the piezoelectric elements, whereby such changes in the shape of the piezoelectric elements cause changes in the orientation of the pads.

12. The bearing of claim 11, wherein the support structure supports the pads for movement with six degrees of freedom.

13. The bearing of claim 8, further comprising at least one piezoelectric element, and a current supply means for supplying current to the piezoelectric element so as to cause changes in the shape of the piezoelectric element, the piezoelectric element being located such that changes in its shape causes changes in the orientation of at least one of the bearing pads and the support structures.

14. The bearing of claim 3, wherein the bearing is a combined radial-thrust bearing and the pads have a conical shape.

15. The bearing of claim 14, wherein the support structure comprises a single beam supporting each bearing pad, the single beam having first and second ends, the first end being connected to the pad support surface.

16. The bearing of claim 15, wherein the second end of each of the beams connected to the bearing pads is supported on a single membrane.

17. The bearing of claim 16, further comprising a piezoelectric element located between the pad support surface and the membrane, and a current supply means for supplying current to the piezoelectric element so as to cause changes in the shape of the piezoelectric element, the piezoelectric element being located such that changes in its shape cause changes in the orientation of at least one of the pads and the support structure.

18. The bearing of claim 16, wherein the support structure supports the pads for movement with six degrees of freedom.

19. A hydrodynamic bearing for supporting a shaft, the bearing having an inner periphery and an outer periphery and comprising a plurality of circumferentially spaced bearing pads and a support structure for supporting the bearing pads; each of the bearing pads including a leading edge, a trailing edge and a pad face extending between the leading edge and said trailing edge, the pad face being shaped so as to support a portion of the shaft; and the support structure including support members which support the bearing pads such that under the action of friction and pressure resulting from rotation of the shaft, the pad surface moves such that a wedge is formed between the shaft and the pad surface, wherein each of the bearing pads is directly connected to only one support member of the support structure; at least one piezoelectric element and a current supply means for supplying current to the piezoelectric element so as to cause changers in the shape of the piezoelectric element, the piezoelectric element being located such that changes in its shape cause changes in the orientation of at least one of the shaft support pads and the support structure.

20. A one-piece hydrodynamic bearing for supporting a shaft, the bearing comprising: a plurality of circumferentially spaced bearing pads, the bearing pads comprising a leading edge, a trailing edge, a bearing pad shaft support face extending between said leading edge and said trailing edge, and a pad support surface; the bearing pads being supported on the support surface by a support structure which includes a plurality of beam members arranged such that a single beam connects each pad to the support structure, the support structure supporting the bearing pads such that each bearing pad has a predetermined stiffness, a fluid film located between said bearing pad face and the shaft, the fluid film having a characteristic stiffness, wherein the stiffness of the fluid film is greater than the stiffness of the bearing pad such that said fluid film causes the bearing pads to deflect away from the shaft upon rotation of said shaft; wherein the bearing is a thrust bearing and the bearing shaft support face is planar; wherein the support structure includes a single stub-like beam supporting each bearing pad; a single horizontal beam supporting each stub-like beam, each said horizontal beam including first and second ends, the beams supporting the stub-like beams at one of the first and second ends and being supported in a cantilever fashion at its other end; and wherein each horizontal beam is supported by an inclined beam.

21. The bearing of claim 20, wherein each inclined beam is supported on a horizontal member.

* * * * *